US011502994B2

(12) United States Patent
Vemulpali

(10) Patent No.: US 11,502,994 B2
(45) Date of Patent: Nov. 15, 2022

(54) INTELLIGENT SERVICE LAYER FOR SEPARATING APPLICATION FROM PHYSICAL NETWORKS AND EXTENDING SERVICE LAYER INTELLIGENCE OVER IP ACROSS THE INTERNET, CLOUD, AND EDGE NETWORKS

(71) Applicant: Sri Ram Kishore Vemulpali, San Jose, CA (US)

(72) Inventor: Sri Ram Kishore Vemulpali, San Jose, CA (US)

( * ) Notice: Subject to any disclaimer, the term of this patent is extended or adjusted under 35 U.S.C. 154(b) by 56 days.

(21) Appl. No.: 17/106,538

(22) Filed: Nov. 30, 2020

(65) Prior Publication Data

US 2021/0168125 A1 Jun. 3, 2021

Related U.S. Application Data

(60) Provisional application No. 62/942,034, filed on Nov. 29, 2019.

(51) Int. Cl.
*H04L 29/06* (2006.01)
*H04L 9/40* (2022.01)
(Continued)

(52) U.S. Cl.
CPC ...... *H04L 63/0236* (2013.01); *G06F 9/45533* (2013.01); *H04L 9/30* (2013.01);
(Continued)

(58) Field of Classification Search
CPC .................................................. H04L 63/0236
See application file for complete search history.

(56) References Cited

U.S. PATENT DOCUMENTS

2002/0178365 A1* 11/2002 Yamaguchi ............. H04L 63/02
713/182
2008/0076393 A1 3/2008 Khetawat et al.
(Continued)

FOREIGN PATENT DOCUMENTS

WO PCT/US2020/062554 11/2020

OTHER PUBLICATIONS

International Search Report and Written Opinion of PCT/US2020/062544, dated Mar. 10, 2021, Vemulpali, Sri Sam Kishore.
(Continued)

*Primary Examiner* — Bradley W Holder
(74) *Attorney, Agent, or Firm* — Makoui Law, PC; Ali Makoui

(57) ABSTRACT

A method of separating identity IPs for identification of applications from the locator IPs for identifying the route is provided. A virtual service layer (VSL) protocol stack uses the IP addresses assigned by network administrators to the application endpoints to support the TCP/IP stack as the identity IP addresses that are not published to the underlay network for routing. On the other hand, the VSL stack uses the IP addresses assigned by the underlay network to the VSL enabled endpoints and VSL enabled routers as the locator IP addresses for routing packets. The VSL stack formats application flow packets with identity headers as identity packet and encapsulates identity packet with the locator header to route the packet. The separation of the identity and locator identifications are used to eliminate the network middleboxes and provide firewall, load balancing, connectivity, SD-WAN, and WAN-optimization, as a part of the communication protocol.

11 Claims, 63 Drawing Sheets

(51) Int. Cl.
  *G06F 9/455* (2018.01)
  *H04L 9/30* (2006.01)
  *H04L 9/32* (2006.01)
  *H04L 61/5007* (2022.01)
  *H04L 101/622* (2022.01)

(52) U.S. Cl.
  CPC ........ *H04L 9/3236* (2013.01); *H04L 61/5007* (2022.05); *H04L 63/0442* (2013.01); *H04L 63/062* (2013.01); *H04L 63/029* (2013.01); *H04L 63/0272* (2013.01); *H04L 2101/622* (2022.05)

(56) References Cited

U.S. PATENT DOCUMENTS

| | | |
|---|---|---|
| 2012/0269053 A1 | 10/2012 | Yu et al. |
| 2014/0241247 A1 | 8/2014 | Kempf et al. |
| 2014/0293829 A1* | 10/2014 | Visuri ............ H04W 64/003 370/254 |
| 2015/0379282 A1 | 12/2015 | Thota et al. |
| 2017/0099137 A1* | 4/2017 | Pang .................. H04L 9/0825 |
| 2018/0219879 A1* | 8/2018 | Pierce ............... H04L 63/1416 |

OTHER PUBLICATIONS

Manning, B, "Registering New BGP attribute Types," *Network Working Group, RFC Series (ISSN 2070-1721), Request for Comments (RFC)* 2042, Jan. 1997, pp. 1-2.

Sangli S., et al., "BGP Extended Communities Attribute," Network Working Group, *RFC Series (ISSN 2070-1721), Request for Comments (RFC)* 4360, Feb. 2006, pp. 1-9.

Moskowitz, R., et al., "Host Identity Protocol (HIP) Architecture," Network Working Group, *RFC Series (ISSN 2070-1721), Request for Comments (RFC)* 4423, May 2006, pp. 1-24.

Farinacci, D., et al., "The Locator/ID Separation Protocol (LISP)," Internet Engineering Task Force (Ietf), *RFC Series (ISSN 2070-1721), Request for Comments (RFC)* 6830, Jan. 2013, pp. 1-24.

Mahalingam, M., et al., "Virtual extensible Local Area Network (VXLAN): A Framework for Overlying Virtualized Layer 2 Networks over Layer 3 Networks," *RFC Series (ISSN 2070-1721), Independent Submission, Request for Comments (RFC)* 7348, Aug. 2014, pp. 1-18.

* cited by examiner

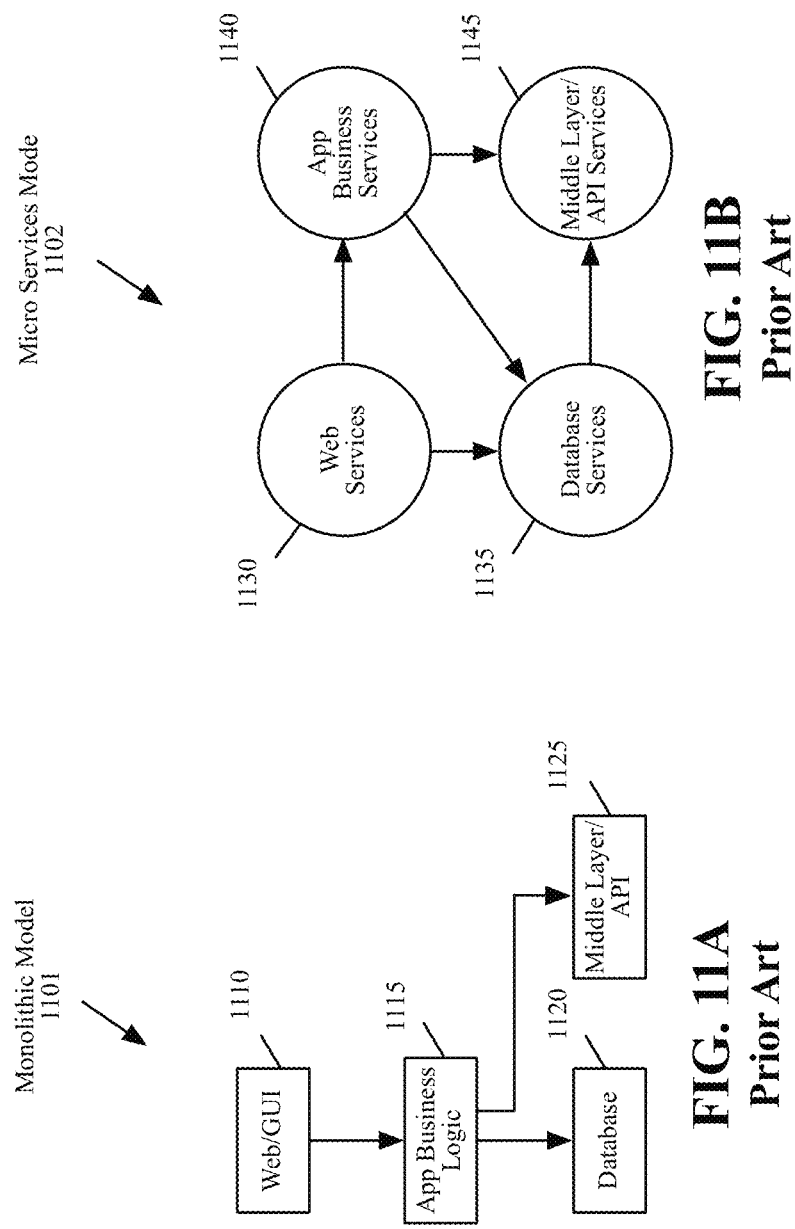

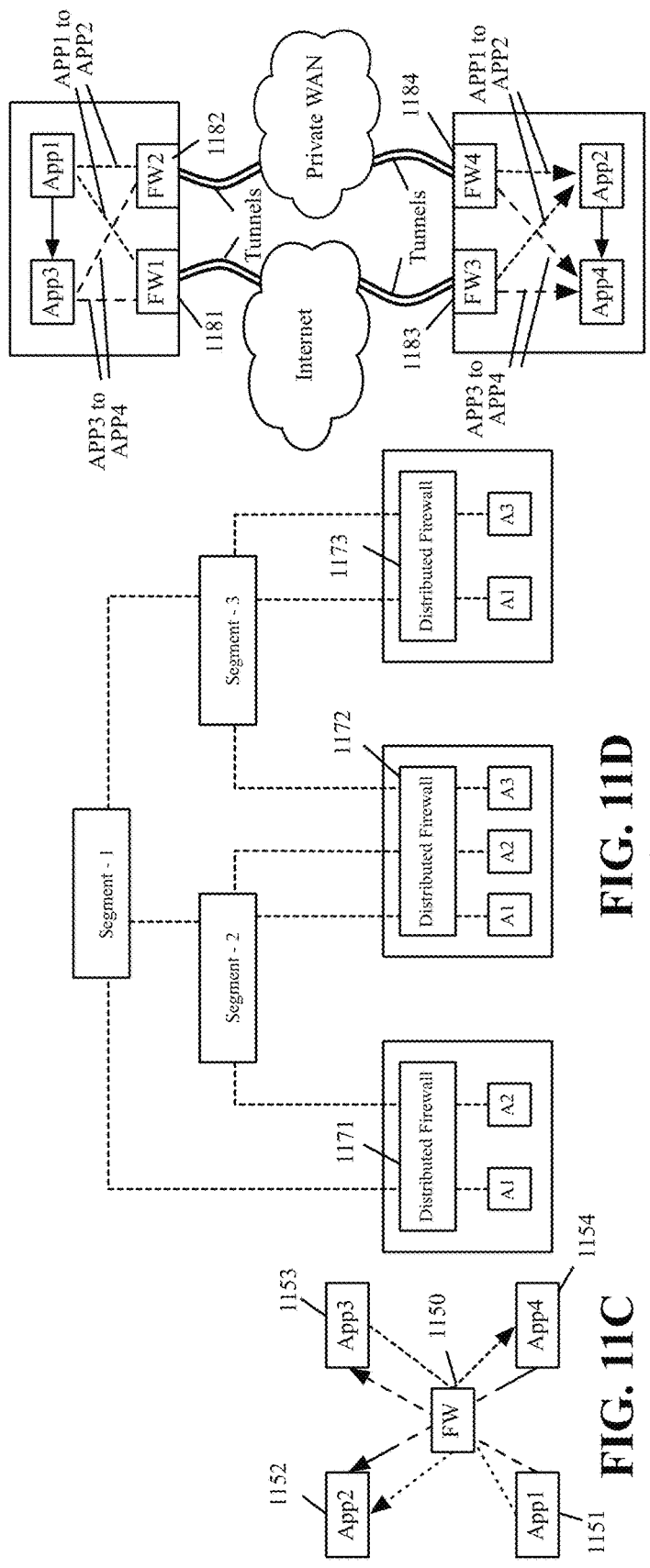

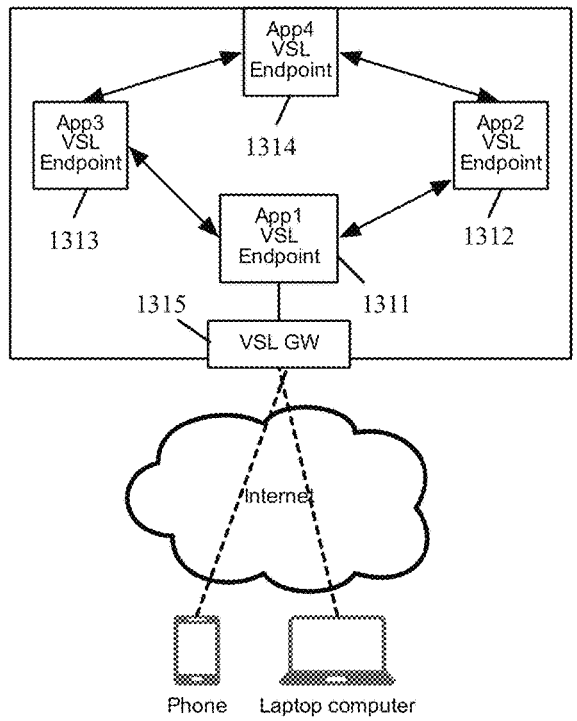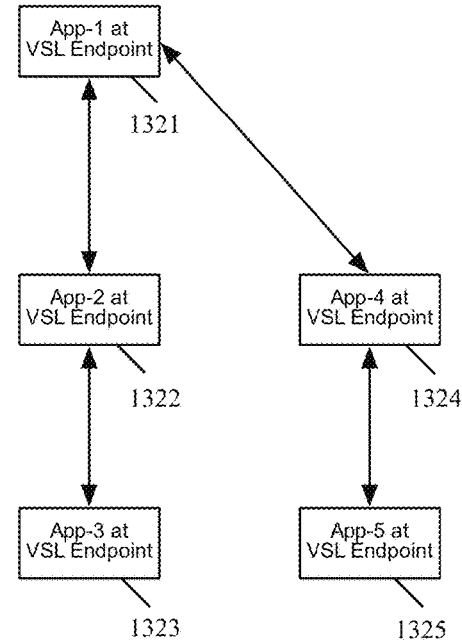
FIG. 13A  FIG. 13B
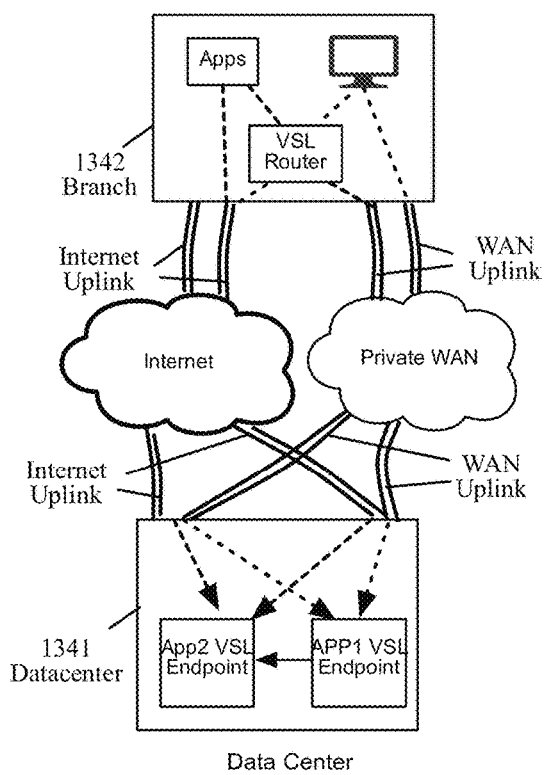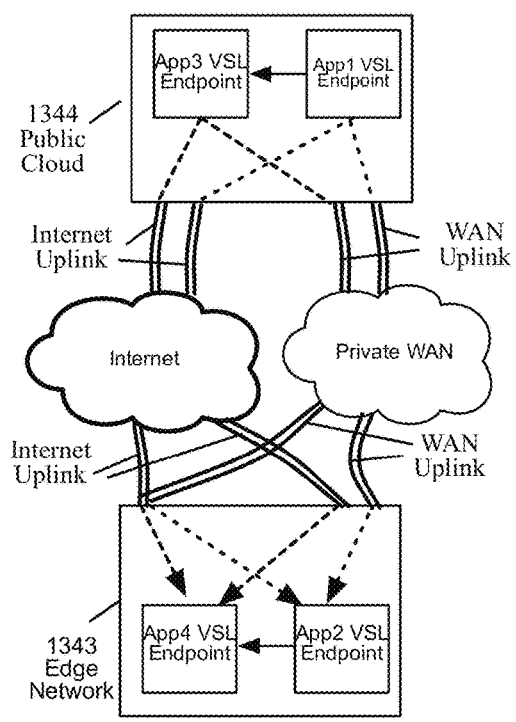
FIG. 13C  FIG. 13D

Service Semantic Configuration Table 1510

| Service ID | App ID | Transport ID | Role | Service Type | Phrase | Identity IP/Subnet | Name | Cluster ID | Infra VRF | Cap |
|---|---|---|---|---|---|---|---|---|---|---|
| 1000 | 3 | 5 | C | Client | dddd | 10.10.0.0/16 | app-1 | 100,200 | | |
| 1000 | 80 | 5 | P | Server | dddd | 10.10.10.1 | app-2 | | | 200 |
| 1000 | 4 | 4 | C | Client | dddd | 11.11.0.0/16 | app-3 | 300,400 | | |
| 1000 | 8080 | 4 | P | Server | dddd | 11.11.11.1 | app-4 | | | 200 |
| 1000 | 5 | 5 | C | Client | dddd | 10.10.0.0/16 | app-5 | 100,200 | | |

FIG. 15A

Service Cluster Configuration Table 1540

| Service ID | App ID | Cluster ID | Priority | ESI |
|---|---|---|---|---|
| 1000 | 80 | 100 | 1 | 1 |
| 1000 | 80 | 200 | 2 | 2 |
| 1000 | 8080 | 300 | 1 | 1 |
| 1000 | 8080 | 400 | 2 | 2 |
| 1000 | 8080 | 500 | 3 | 3 |

FIG. 15B

Service Path Configuration Table 1550

| ESI | Network ID | Priority | Public IP/Network GW | Next Hop | Edge Router | DSCP | Funcs |
|---|---|---|---|---|---|---|---|
| 1 | 321 | 1 | 20.20.20.1 | 172.16.12.1 | 172.16.12.2 | 40 | 0x7 |
| 2 | 321 | 2 | 100.100.0.0/16 | 192.168.13.1 | 172.16.12.2 | 64 | 0x8 |
| 3 | 421 | -1 | | | 121.10.10.1 | | |

FIG. 15C

Service Semantic Configuration Table 1610

| Service ID 1511 | App ID 1512 | Transport ID 1513 | Role 1514 | Service Type 1515 | Phrase 1516 | Identity IP/Subnet 1517 | Name 1518 | Cluster ID 1519 | Infra VRF 1520 | Cap 1521 |
|---|---|---|---|---|---|---|---|---|---|---|
| 1000 | 800 | 5 | P | Generic | dddd | 10.10.0.0/16 | app-1 | 100,200 | | 200 |
| 1000 | 80 | 5 | P | Generic | dddd | 20.20.0.0/16 | app-2 | 300,400 | | 100 |
| 1000 | 8080 | 5 | P | Generic | dddd | 11.11.0.0/16 | app-3 | 500,600 | | 100 |
| 1000 | 5401 | 4 | P | Server | dddd | 30.30.30.1 | app-4 | | | 50 |
| 1000 | 4 | 4 | C | Client | dddd | 30.30.0.0/16 | app-5 | 700,800 | | |

FIG. 16A

Service Cluster Configuration Table 1640

| Service ID 1541 | App ID 1542 | Cluster ID 1543 | Priority 1544 | ESI 1545 |
|---|---|---|---|---|
| 1000 | 800 | 100 | 1 | 1 |
| 1000 | 800 | 200 | 2 | 2 |
| 1000 | 8080 | 500 | 1 | 1 |
| 1000 | 8080 | 600 | 2 | 2 |
| 1000 | 80 | 300 | 1 | 1 |
| 1000 | 80 | 400 | 2 | 2 |

FIG. 16B

Service Path Configuration Table 1650

| ESI 1551 | Network ID 1552 | Priority 1553 | Public IP/Network GW 1554 | Next Hop 1555 | Edge Router 1556 | DSCP 1557 | Funcs 1558 |
|---|---|---|---|---|---|---|---|
| 1 | 321 | 1 | 20.20.20.1 | 172.16.12.1 | 172.16.12.2 | 40 | 0x7 |
| 2 | 321 | 2 | 100.100.0.0/16 | 192.168.13.1 | 172.16.12.2 | 64 | 0x8 |
| 3 | 421 | -1 | | 121.10.10.1 | | | |

FIG. 16C

Service Semantic Configuration Table 1710

| Service ID | App ID | Transport ID | Role | Service Type | Phrase | Identity IP/ Subnet | Name | Cluster ID | Infra VRF | Cap |
|---|---|---|---|---|---|---|---|---|---|---|
| 1000 | 3 | 5 | C | Broadcast | dddd | 10.10.0.0/16 | app-1 | 100,200 | | |
| 1000 | 80 | 5 | P | Repo | dddd | 10.10.10.1 | app-2 | | | 200 |
| 1000 | 80 | 5 | P | Repo | dddd | 10.10.10.2 | app-3 | | | 200 |

FIG. 17A

Service Cluster Configuration Table 1740

| Service ID | App ID | Cluster ID | Priority | ESI |
|---|---|---|---|---|
| 1000 | 80 | 100 | 1 | 1 |
| 1000 | 80 | 200 | 2 | 2 |

FIG. 17B

Service Path Configuration Table 1750

| ESI | Network ID | Priority | Public IP/ Network GW | Next Hop | Edge Router | DSCP | Funcs |
|---|---|---|---|---|---|---|---|
| 1 | 321 | 1 | 20.20.20.1 | 172.16.12.1 | 172.16.12.2 | 40 | 0x7 |
| 2 | 321 | 2 | 100.100.0.0/16 | 192.168.13.1 | 172.16.12.2 | 64 | 0x8 |
| 3 | 421 | -1 | | | 121.10.10.1 | | |

FIG. 17C

Service Semantic Configuration Table 1810

| Service ID | App ID | Transport ID | Role | Service Type | Phrase | Identity IP/Subnet | Name | Cluster ID | Infra VRF | Cap |
|---|---|---|---|---|---|---|---|---|---|---|
| 1000 | 3 | 5 | C | Client | dddd | 10.10.0.0/16 | app-1 | 100,200 | | |
| 1000 | 80 | 5 | P | Server | dddd | 10.10.10.1 | app-2 | | | 200 |
| 1000 | 4 | 4 | C | Client | dddd | 11.11.0.0/16 | app-3 | 300,400 | | |
| 1000 | 8080 | 4 | P | Server | dddd | 11.11.11.1 | app-4 | | | 200 |
| 1000 | 5 | 5 | C | Client | dddd | 10.10.0.0/16 | app-5 | 100,200 | | |

Service Cluster Configuration Table 1840

| Service ID | App ID | Cluster ID | Priority | ESI |
|---|---|---|---|---|
| 1000 | 80 | 100 | 1 | 1 |
| 1000 | 80 | 200 | 2 | 2 |
| 1000 | 8080 | 300 | 1 | 1 |
| 1000 | 8080 | 400 | 2 | 2 |
| 1000 | 8080 | 500 | 3 | 3 |

Service Path Configuration Table 1850

| ESI | Network ID | Priority | Reachable IP | Next Hop | Edge Router | DSCP | Funcs |
|---|---|---|---|---|---|---|---|
| 1 | 321 | 1 | 20.20.20.1 | 172.16.12.1 | 172.16.12.2 | 40 | 0x8 |
| 2 | 321 | 2 | 100.100.0.0/16 | 192.168.13.1 | 172.16.12.2 | 64 | 0x7 |
| 3 | 421 | -1 | | | 121.10.10.1 | | |
| 4 | 321 | -1 | | | 172.16.12.2 | | |
| 5 | 421 | 0 | | | | 56 | |

Service Semantic Configuration Table 2010

| Service ID | App ID | Transport ID | Role | Service Type | Phrase | Identity IP/ Subnet | Name | Cluster ID | Infra VRF | Cap |
|---|---|---|---|---|---|---|---|---|---|---|
| 1000 | 3 | 5 | C | Client | dddd | 10.10.0.0/16 | app-1 | 100,200 | | |
| 1000 | 80 | 5 | P | Server | dddd | 10.10.10.1 | app-2 | | | 200 |
| 1000 | 4 | 4 | C | Client | dddd | 11.11.0.0/16 | app-3 | 300,400 | | |
| 1000 | 8080 | 4 | P | Server | dddd | 11.11.11.1 | app-4 | | | 200 |
| 1000 | 5 | 5 | C | Client | dddd | 10.10.0.0/16 | app-5 | 100,200 | | |

FIG. 20B

| Service ID 1511 | App ID 1512 | Transport ID 1513 | VLANs 3308 | VLAN Type 3309 | Identity IP/Subnet 1517 | Name 1518 |
|---|---|---|---|---|---|---|
| 1000 | 3 | 5 | 0 | None | 10.10.0.0/16 | app-1 |
| 1000 | 80 | 5 | 0 | None | 10.10.10.1 | app-2 |
| 1000 | 4 | 4 | 0 | None | 11.11.0.0/16 | app-3 |
| 1000 | 8080 | 4 | 0 | None | 11.11.11.1 | app-4 |
| 1000 | 5 | 5 | 0 | None | 10.10.0.0/16 | app-5 |

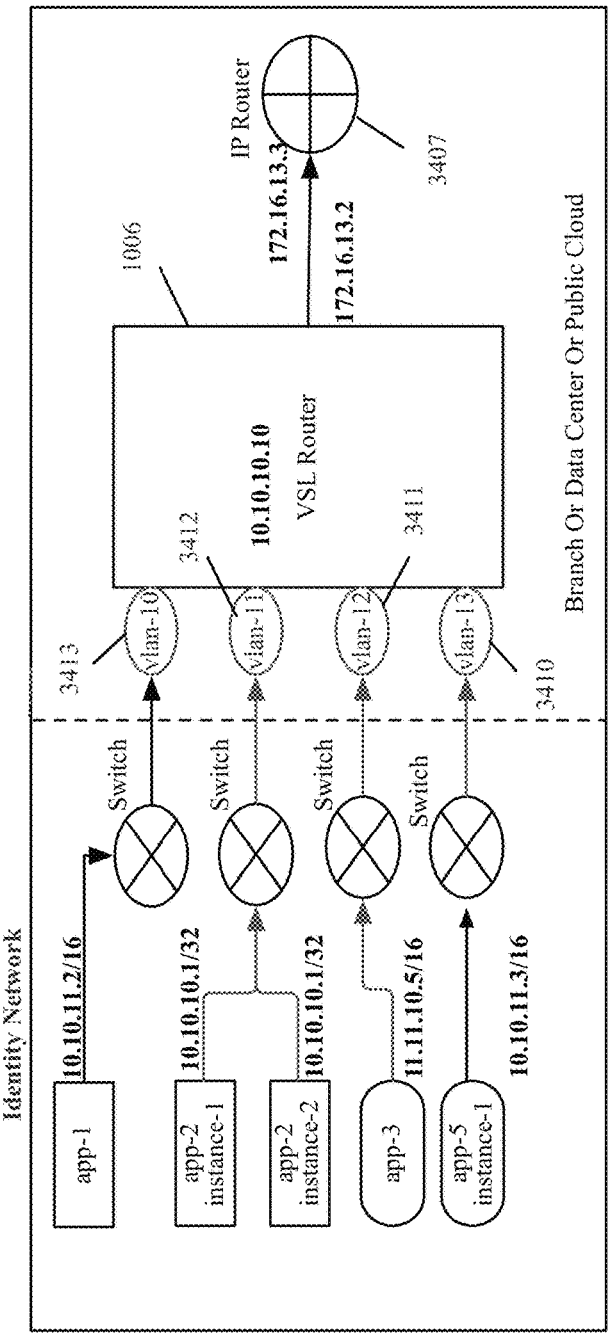

| | | |
|---|---|---|
| 3501 | MP_REACH_NLRI | AFI=25 SAFI=70 |
| 3502 | Next Hop | 172.16.13.2 |
| 3503 | Route Type | 2 |
| 3504 | Route Distinguisher | AS:4195304 |
| 3505 | Ethernet Segment Identifier | 0 |
| 3506 | Ethernet Tag | 0 |
| 3507 | MAC Address Length | 48-bits |
| 3508 | MAC Address | MAC-2 |
| 3509 | IP Address Length | 32 |
| 3510 | IP Address | 11.11.11.1 |
| 3511 | MPLS Label | 0x4003E8 |
| 3512 | Extended Route Target | AS:4195304 |
| 3513 | Router MAC Extended Community | NA |
| 3514 | Extended Community MAC mobility | MAC-2 |
| 3515 | Tunnel Encapsulation | VXLAN |
| 3516 | VSL-RLOC | NAT-IP:Port |
| 3517 | VSL-LLOC | 172.16.13.2 |
| 3518 | VSL-Capacity | 200 |
| 3519 | VSL-Key | 0x12346 |
| 3520 | VSL-Session-Key | 0x5678 |
| 3521 | VSL-Flags | |

3534
Container App-4
VSL EP Identity Route

FIG. 35C

| | | |
|---|---|---|
| 3501 | MP_REACH_NLRI | AFI=25 SAFI=70 |
| 3502 | Next Hop | 172.16.13.2 |
| 3503 | Route Type | 2 |
| 3504 | Route Distinguisher | AS:4195304 |
| 3505 | Ethernet Segment Identifier | 0 |
| 3506 | Ethernet Tag | 0 |
| 3507 | MAC Address Length | 48-bits |
| 3522 | MAC Address | MAC-3 |
| 3509 | IP Address Length | 32 |
| 3510 | IP Address | 11.11.11.1 |
| 3511 | MPLS Label | 0x4003E8 |
| 3512 | Extended Route Target | AS:4195304 |
| 3513 | Router MAC Extended Community | NA |
| 3523 | Extended Community MAC mobility | MAC-3 |
| 3515 | Tunnel Encapsulation | VXLAN |
| 3516 | VSL-RLOC | NAT-IP:Port |
| 3517 | VSL-LLOC | 172.16.13.2 |
| 3518 | VSL-Capacity | 200 |
| 3519 | VSL-Key | 0x12346 |
| 3520 | VSL-Session-Key | 0x5678 |
| 3521 | VSL-Flags | 0x0 |

3535
App-4
VSL EP Identity Route

FIG. 35D

| | | |
|---|---|---|
| 3501 | MP_REACH_NLRI | AFI=25 SAFI=70 |
| 3502 | Next Hop | 172.16.13.2 |
| 3503 | Route Type | 2 |
| 3524 | Route Distinguisher | AS:5243880 |
| 3505 | Ethernet Segment Identifier | 0 |
| 3506 | Ethernet Tag | 0 |
| 3507 | MAC Address Length | 48-bits |
| 3525 | MAC Address | MAC-1 |
| 3509 | IP Address Length | 32 |
| 3526 | IP Address | 10.10.10.1 |
| 3527 | MPLS Label | 0x5003E8 |
| 3528 | Extended Route Target | AS:5243880 |
| 3513 | Router MAC Extended Community | NA |
| 3529 | Extended Community MAC mobility | MAC-1 |
| 3515 | Tunnel Encapsulation | VXLAN |
| 3516 | VSL-RLOC | NAT-IP:Port |
| 3517 | VSL-LLOC | 172.16.13.2 |
| 3530 | VSL-Capacity | 100 |
| 3531 | VSL-Key | 0x12345 |
| 3532 | VSL-Session-Key | 0x3456 |
| 3533 | VSL-Flags | 0x0 |

3536
VM App-2
VSL EP Identity Route

FIG. 35E

| | | |
|---|---|---|
| 3602 | MP_REACH_NLRI | AFI=25 SAFI=70 |
| 3603 | Next Hop | 172.16.13.2 |
| 3604 | Route Type | 2 |
| 3605 | Route Distinguisher | AS:5243880 |
| 3606 | Ethernet Segment Identifier | 0 |
| 3607 | Ethernet Tag | Vlan-11 |
| 3608 | MAC Address Length | 48-bits |
| 3609 | MAC Address | MAC-1 |
| 3610 | IP Address Length | 16 |
| 3611 | IP Address | 12.12.10.11 |
| 3612 | MPLS Label | 0x5003E8 |
| 3613 | Extended Route Target | AS:5243880 |
| 3614 | Router MAC Extended Community | NA |
| 3615 | Extended Community MAC mobility | MAC-1 |
| 3616 | Tunnel Encapsulation | VXLAN |
| 3617 | VSL-RLOC | NAT-IP:Port |
| 3618 | VSL-LLOC | 172.16.13.2 |
| 3619 | VSL-Capacity | 100 |
| 3620 | VSL-Key | 0x12345 |
| 3621 | VSL-Session-Key | 0x5678 |
| | VSL-Flags | 0x0 |

| | | |
|---|---|---|
| 3602 | MP_REACH_NLRI | AFI=25 SAFI=70 |
| 3603 | Next Hop | 172.16.13.2 |
| 3604 | Route Type | 2 |
| 3605 | Route Distinguisher | AS:5243880 |
| 3606 | Ethernet Segment Identifier | 0 |
| 3607 | Ethernet Tag | Vlan-11 |
| 3622 | MAC Address Length | 48-bits |
| 3609 | MAC Address | MAC-2 |
| 3623 | IP Address Length | 16 |
| 3611 | IP Address | 12.12.10.10 |
| 3612 | MPLS Label | 0x5003E8 |
| 3613 | Extended Route Target | AS:5243880 |
| 3624 | Router MAC Extended Community | NA |
| 3615 | Extended Community MAC mobility | MAC-2 |
| 3616 | Tunnel Encapsulation | VXLAN |
| 3617 | VSL-RLOC | NAT-IP:Port |
| 3618 | VSL-LLOC | 172.16.13.2 |
| 3619 | VSL-Capacity | 100 |
| 3620 | VSL-Key | 0x12345 |
| 3621 | VSL-Session-Key | 0x5678 |
| | VSL-Flags | 0x0 |

INTELLIGENT SERVICE LAYER FOR SEPARATING APPLICATION FROM PHYSICAL NETWORKS AND EXTENDING SERVICE LAYER INTELLIGENCE OVER IP ACROSS THE INTERNET, CLOUD, AND EDGE NETWORKS

CLAIM OF BENEFIT TO PRIOR APPLICATIONS

This application claims the benefit of U.S. Provisional Patent Application Ser. No. 62/942,034, filed on Nov. 29, 2019. The contents of U.S. Provisional Patent Application No. 62/942,034 are hereby incorporated by reference.

FIELD OF THE INVENTION

The present invention is related to enterprise/service provider application networking for applications deployed in data centers, branches, public and private clouds, and edge networks. Particularly the invention relates to connectivity and security of centralized and distributed applications. The invention is applicable to applications and networks.

BACKGROUND

The present state of the art of networking solutions add application intelligence to networks in the form of policies, middlebox functions, and service topologies. To manage and maintain this intelligence, software-defined networking (SDN) architectures enabled DevOps to simplify operations to deploy and manage centralized services in branches, datacenters, and clouds. The present state of the art of security and connectivity of services is provisioned by DevOps tools by automating configuration of middleboxes based on topologies of services. Network security is provisioned by deriving necessary policies/rules based on services topology and access control list (ACL) configured to prevent unauthorized access to data and services. Zero trust security enables identity-based authorization to access services and data for distributed workloads and workforce. Connectivity of distributed workloads is achieved by provisioning middlebox solutions.

Connectivity of Services

Internet Protocol ("IP") is a standard protocol to connect endpoints based on given unique address. An endpoint is referred to any device located at an end point on a network. IP was designed to route the packets ("datagrams") from one endpoint to another endpoint across switches and routers. The Internet was built based on IP, where any two devices can communicate over the Internet with unique IP addresses. The Internet was designed based on an end-to-end principle, where the maintenance of state and intelligence resides at the edges. In other words, the Internet connecting networks retain no state or application intelligence in its core network. Application specific intelligence was maintained at the edges (i.e., the perimeters) of networks to allow the core of the Internet to be generic (agnostic to any application) and simple in functionality. This enables the Internet to be efficient in forwarding packets with simplicity.

The Internet does not guarantee the delivery of packets to the endpoints, given the limited resources like buffers and bandwidth at switches and routers, neither it guarantees the prevention from imposter or eaves drop of packets. In other words, the Internet does not provide security and reliability of packets in communication between two endpoints. Transmission Control Protocol (TCP/IP) was introduced at the endpoints to provide reliability of communication over the Internet. Firewalls, Internet Protocol Security (IPSec), and intrusion detection and prevention are deployed at the edge of networks to secure end devices connected to the Internet.

The Internet does not understand application traffic (series of packets that belong to a specific application), to apply the required treatment to packets, appropriate to meet requirements of the applications. Edge services, such as, wide area network (WAN) optimization, deep packet inspection (DPI), and software-defined WAN (SD-WAN) tunneling services are deployed to provide the required treatment to application traffic for application performance.

In the present state of the art of networking (data center, virtual networks, cloud networks, etc.), services are deployed under different virtual local area networks (VLANs), subnets, and virtual private clouds (VPCs) to segregate distinct services, forming different topologies. The IP addresses assigned to service act as identity in network. As per IP protocol, the IP address provides semantics to route the packets to the destination location. Therefore, the IP address acts as the identity and the locator of service in network. In order for the middleboxes to identify application flows and apply the required functions to those services, identity of application has to be configured on these middleboxes and route traffic to the middleboxes to apply those functions.

Software/hardware based middleboxes (proxies, load balancers, firewalls, WAN optimizations, virtual private networks (VPNs) and tunneling services) are deployed at the edge of networks (such as VPC, data center, branches, overlay networks (network virtualization)) has to be configured for services and devices hosted in the respective networks. These configurations are done by network administrators (admins) or DevOps, based on the architecture of deployed solutions. The configurations has to be derived based on static or dynamic topology of services and networks. DevOps tools and SDN based controllers help programing the derived configurations to the respective middle boxes.

Presently, the services are deployed by assigning one or more public IP addresses (accessible through the Internet) with a service domain name system (DNS) name. External users' communication from the Internet to the services (north to south bound traffic) has to be inspected and processed by the middleboxes, such as, perimeter firewall, Intrusion Detection and Prevention (IDS/IPS), VPNs, and load balancers, to forward traffic to the front end facing servers and applications. The Internal users' communication from the internal networks (such as, branches, WANs, etc.) to the services has to be processed by VPNs, proxies (SD-WANs, WAN-optimization, etc.), firewalls, and load balancers in order to forward traffic to the services deployed in data centers. Both internal and external users are authenticated and authorized to allow access to the network services and resources, thus connectivity to services is provided through the middleboxes for the users from Internet and from the private networks.

For distributed applications, such as, n-tiered architectures (e.g., service-oriented architecture (SOA), web applications) and micro services, network connectivity of static and dynamic workloads is achieved through the middleboxes. Traffic between these applications (east-west flows, i.e., workloads deployed within a data center) has to be processed by the firewall and load balancers. The firewall is used to facilitate and restrict communication between applications. The load balancer is used to distribute traffic between tier workloads. For sparsely distributed applications across data centers and clouds (where data centers and clouds are connected by the Internet and/or private direct connect/multi-protocol label switching (MPLS)), communication between the workloads is achieved by redirecting traffic through the middleboxes. Traffic from the data center/cloud has to egress as south bound traffic through VPNs, proxies and ingress as north bound traffic to the data center/cloud through middleboxes as mentioned above.

The SDN is a very powerful paradigm that emerged to solve scaling problems of network. The basic principle of SDN states that network should not have any intelligence and all intelligence should reside in a controller (a centralized entity that has knowledge of the network, intelligence that dictates what the network should do). This led to various architectures for various aspects of networking. Some of the notable architectures are Cisco's Application Centric Infrastructure, VMWare's NSX, SD-WAN, AWS, and most of vendor products adopted this architecture. In all these architectures, the controller provides connectivity to various aspects of networking, most notably to servers and workloads of a service. The controller maintains topology of endpoints and based on policies defined by user and other information, derives relevant information and configures/programs the software/hardware-based switches/routers to provide connectivity to endpoints. The middleboxes that provides network functions for services are inserted as the endpoints in network. The controller configures/programs the middleboxes to apply these functions on service traffic. In other words, the present state of the art of networking solutions tries to view application in network constructs.

The enterprises, the Layer 2/Layer 3 (L2/L3) networks that are geographically distributed, are connected by private WANs. The service providers sell WAN services to the enterprises by selling bandwidth and service level agreements (SLAs) of WAN. The present state of the art technology Layer 2 VPN/Layer 3 VPN (L2VPN/L3VPN) is used to connect the enterprise networks distributed geographically. VLAN, MPLS, virtual extensible LAN (VXLAN), and other datapath network virtualization technologies are employed by providers to connect the L2/L3 networks. As the Internet is becoming inexpensive, service providers and enterprises are moving to the Internet by using SD-WAN solutions to create full mesh of networks to connect the L2/L3 networks distributed geographically. Moreover, for services, applications, device endpoints distributed across branches, datacenters, clouds, and edge networks, the SD-WAN solutions are used to provide connectivity by building tunnels between branches, clouds, datacenter networks over the Internet and private WAN. The SD-WAN solutions create encrypted and non-encrypted tunnels over the Internet between branches, datacenters, clouds, and edge networks creating full mesh of tunnels. The tunnels are chosen by application flows based on policies and forwards the flows over the Internet and private WAN. Path selection is employed on application flows to choose tunnels based on application type and tunnel/path metrics loss, latency, and jitter. All these policies are orchestrated (automation of configuration) based on topology and location of networks by the centralized controller.

With the dawn of virtualizations across compute, storage, and network, the new service models, such as, infrastructure as a service, platform as a service, software as a service, and on-premises virtualization evolved. Based on the need and problem at hand, enterprises use combination of these services, such that the application scales based on the need, and the cost of owning infrastructure, platforms, and software reduces. As the enterprises use "as a service" services, their infrastructure and services are distributed across and they have to connect and secure their networks, applications, and improve performance of applications. Therefore, enterprises deploy perimeter services at the edge of branches, datacenters, public clouds, and VPCs. These perimeter services include firewalls, IDS/IPS, WAN optimization, VPNs, load balancers, DPI, tunnel proxies, and application performance gateways. The perimeter services evolved out of centralized architectures, where applications are deployed in one location, such as the datacenter and accessed from branches and the Internet. With the dawn of digital transformation, edge networks, edge computing, Internet of things (IoT), mobile devices are evolving to access from anywhere. The needs of the enterprises are changing as their work force and applications are distributed across the private and public clouds, and various devices that are distributed across the Internet are accessing the enterprise applications. Given this new era of distributed endpoints, the centralized architectures and methods are still used to connect and secure networks and applications.

Security of Services

The IP protocol by design was implemented to provide connectivity to networks, infrastructure, devices, and services. Providing security to connecting endpoints is not part of the IP protocol. In the IP, as long as there is a path or reachability to the endpoints, connectivity can be established. In other words, any endpoint can talk to any other endpoint without any restrictions. Since the Internet is built on the IP, in order to provide security to networks, devices, infrastructure, and services, various solutions are implemented and deployed at the edge of the networks. Security solutions such as firewalls (stateful/stateless), IDC/IPC, VPNs, IPSec, micro segmentation, and zero trust all address various aspects of network and service access.

The present state of the art of network security solutions are implemented on top of the IP. In other words, once the IP establishes reachability and connectivity of the endpoints, security solutions are implemented on top of connectivity. The common principle that runs among all security solutions is to intercept ingress/egress connections based on some policy. Security solutions implemented at various layers, uses policies derived based on network and services topology. These policies impose either PERMIT or DENY actions on the traffic based on tuple information read from various layers of flow/packet. The policies act as rules to block/allow path of connectivity to an endpoint. The security solutions have to derive/configure all possible policies to block/allow all paths of connectivity to the endpoints. These policies are updated incrementally based on new services deployed and should be backward compatible with the existing policies.

Software/hardware-based firewalls (stateful/stateless) are deployed at the edge of the physical/overlay networks, VPCs, and branches to provide protection from malicious attacks from the Internet. The firewalls deployed within the data center, VPCs, and overlay networks implement micro segmentation. Micro segmentation helps compartmentalize services and limits the communication between services conditioned on dependence of each other. Micro segmentation minimizes lateral movement of malicious attacks/breach and malware/virus in the internal network. Based on the dynamic nature of the workloads, micro segmentation policies have to be derived to block/allow path of connectivity to the endpoints. As more endpoints are added/deployed, more granular policies need to be derived. For a given N endpoints and G granularity of rules, N×N×G policies are needed to implement micro segmentation.

Organizations employ various security techniques for protecting data in transmission and connectivity to applications. VPN and IPSec provide authentication of endpoint/user to connect to the network to access applications and encrypt/tokenize data in transit for confidentiality and integrity. Both VPNs/IPSec are deployed at the edge of the networks to authenticate incoming connections and encrypt/decrypt data ingressing/egressing network. The VPNs/IPSec establish tunnels between branches, data centers, and/or public clouds for secure transmission of data between distributed workforce and application workloads. The underlying principle of VPNs/IPSec is to intercept connectivity to authenticate and establish tunnels between user endpoints and services, and between networks.

All security solutions described above address various aspects of security with respect to applications and networking. Each solution has to be inserted into the topology of the network and services inline/offline with traffic. Based on the topology, these security solutions have to be configured with relevant configuration. The relevant configurations are derived based on topological insertion of security solutions described above in the network for services. As services are extended on to different networks and topology changes, configurations have to be updated constantly and should not be disrupting the existing configuration. The present state of the art of the SDN solutions, described above, senses by monitoring dynamic changes to topology of services and extension of new services to networks and derives new/delta configuration/rules/policies and updates the security solutions. This method of automating the configuration and programming policies is zero touch configuration. The recent breaches across the networks revealed automation of configuration is not filling gaps of errors.

The present IDS/IPS technology monitors the traffic for certain patterns, code signatures, events, and activities, and alarms networks administrators if any anomaly is seen. Most of the time, these events, patterns, and activities are known blocklist rules, as future anomalies are discovered they will be added to the blocked list. The detection of most anomalies results in false positives. Moreover, once an attacker attempts a novel breach these current block listed patterns cannot detect the breach. For security operators to detect a novel breach takes on average 45-70 days, which will be devasting to enterprises.

The present state of the enterprise workforce is distributed across various global regions. The centralized deployment of applications and access to these applications by distributed workforce is protected by perimeter firewalls (firewalls, IDS/IPS, malware protection), handling few egresses/ingress points to network with simple blocklists and allowed rules. With the dawn of new technologies, access to these applications from various devices, and data generation from various devices is increasing data size, data variety, and footprint. The enterprises are deploying applications near the workforce by adopting new distributed application architectures in branches, public clouds, and on premise. In other words, the organizations are creating connected environments. Moreover, data is given access to, and is shared, across various partners and supply chains. With all this shift and connected environments, the network attack/breach terrain is increasing and is becoming distributed. The organizations employ security solutions to protect their data, and applications as mentioned above, in these new connected environments. The organizations are realizing the perimeter view of the firewall based on the physical objects, systems, matching code signatures, activities, events, allowed list/blocked list rules, defense in depth, and multi-layered security is not sufficient to tackle today's sophisticated attack methods.

With the dawn of the new concept, zero trust, which brings forth the concept of not trusting internal and external endpoints to access a service, every endpoint, whether it is internal or external to the enterprise network, should be verified and authenticated to access services. This new concept enforces strict security by deriving identity of endpoint internal/external and credentials of the user. The identity of endpoint is derived based on various attributes of device, managed software, location, and more depending on the administrators. These attributes coupled with user credentials enforce restricted access to services and networks. This method of zero trust, however, does not eliminate the attack surface of networks, it only imposes one or two more layers of security to get access to networks.

Network Virtualization

Network virtualization is a concept of creating logical/virtual networks that decouples the virtual networks from the underlying network hardware to ensure the network can quickly integrate/change with services. Virtual networks implement network connectivity of services by deploying network constructs in software. Network constructs, such as, the middleboxes, routers, switches, are incorporated in the logical networks of virtualized environments. Traditionally, network connectivity of services has been delivered by hardware solutions from Layer 2-Layer 7 (L2-L7). The virtual networks, on other hand, spin up these services on demand based on the need to provide connectivity. To connect overlay networks distributed across private and public clouds, VPN gateways, and SD-WANs are deployed. This flexibility of bringing up network for services and connection, increases the complexity of managing the overlay networks.

Network virtualization creates overlay networks by decoupling from the underlay network and connecting them by tunneling protocols. The application traffic is encapsulated into tunneling protocols, such as, VXLAN, Generic Routing Encapsulation (NVGRE), Generic Networking Virtualization Encapsulation (Geneve), etc., to forward traffic between the overlay networks through the underlay network. Traffic passing through the underlay network may have no visibility of the application traffic due to abstraction introduced by the tunneling protocols. This results in contention for bandwidth between application traffic and unable to prioritize application flows. This results in inefficiency where elephant flows (long lived) get advantage over mouse flows (short lived). Moreover, the existing tools do not provide visibility of application traffic at the underlay network, causing network operators to deploy new tools constantly.

With network virtualization, the overlay networks are created across data centers, public clouds, and branches. As the overlay networks are increasing in numbers and distributed, connecting the overlay networks requires tunneling solutions, such as, SD-WAN and VPN gateways to establish tunnels between the networks. The overlay networks are connected by implementing various tunneling policies. As networks are connected by tunnels with layered approach, debugging problems of connectivity is becoming complex and nightmare.

BRIEF DESCRIPTION OF THE DRAWINGS

The various embodiments of the present intelligent service layer for separating application from physical networks and extending service layer intelligence over IP across the Internet, cloud and edge networks now will be discussed in detail with an emphasis on highlighting the advantageous features. These embodiments depict the novel and non-obvious intelligent service layer for separating application from physical networks and extending service layer intelligence over IP across the Internet, cloud and edge networks shown in the accompanying drawings, which are for illustrative purposes only. These drawings include the following figures, in which like numerals indicate like parts:

FIGS. 11A-11G illustrate application models and their deployments within and across networks, according to prior art;

FIGS. 13A-13D and 14A-14B are functional diagrams illustrating the VSL deployed solutions, according to various aspects of the present disclosure;

FIGS. 15A-15C illustrate the semantic configuration of application declaration of type client and server, grouping applications into cluster, and transport paths to be used to reach those clusters, according to various aspects of the present disclosure;

FIGS. 16A-16C illustrate the semantic configuration of application declaration of type generic, grouping applications into cluster, and transport paths to be used to reach those clusters, according to various aspects of the present disclosure;

FIGS. 17A-17C illustrate the semantic configuration of application declaration of type broadcast and repo, grouping applications into cluster, and transport paths to be used to reach clusters, according to various aspects of the present disclosure;

FIGS. 18A-18C illustrate the semantic configuration of application declaration deployed across networks, according to various aspects of the present disclosure;

FIG. 20B illustrates the semantic configuration of services deployed on the VSL stack, according to various aspects of the present disclosure;

FIG. 34A is a functional diagram illustrating an example application endpoint deployment behind the VSL router, where a single application is deployed in an L2 domain tagged with the specific VLAN, according to various aspects of the present disclosure;

FIG. 34B illustrates the semantic configuration associated with the example of FIG. 34A, according to various aspects of the present disclosure;

FIGS. 37A-37B illustrate the VSL data plane tables that implement packet forwarding to/from the application endpoints deployed at the VSL endpoints/the VSL routers, according to various aspects of the present disclosure;

DETAILED DESCRIPTION

Figure 1:
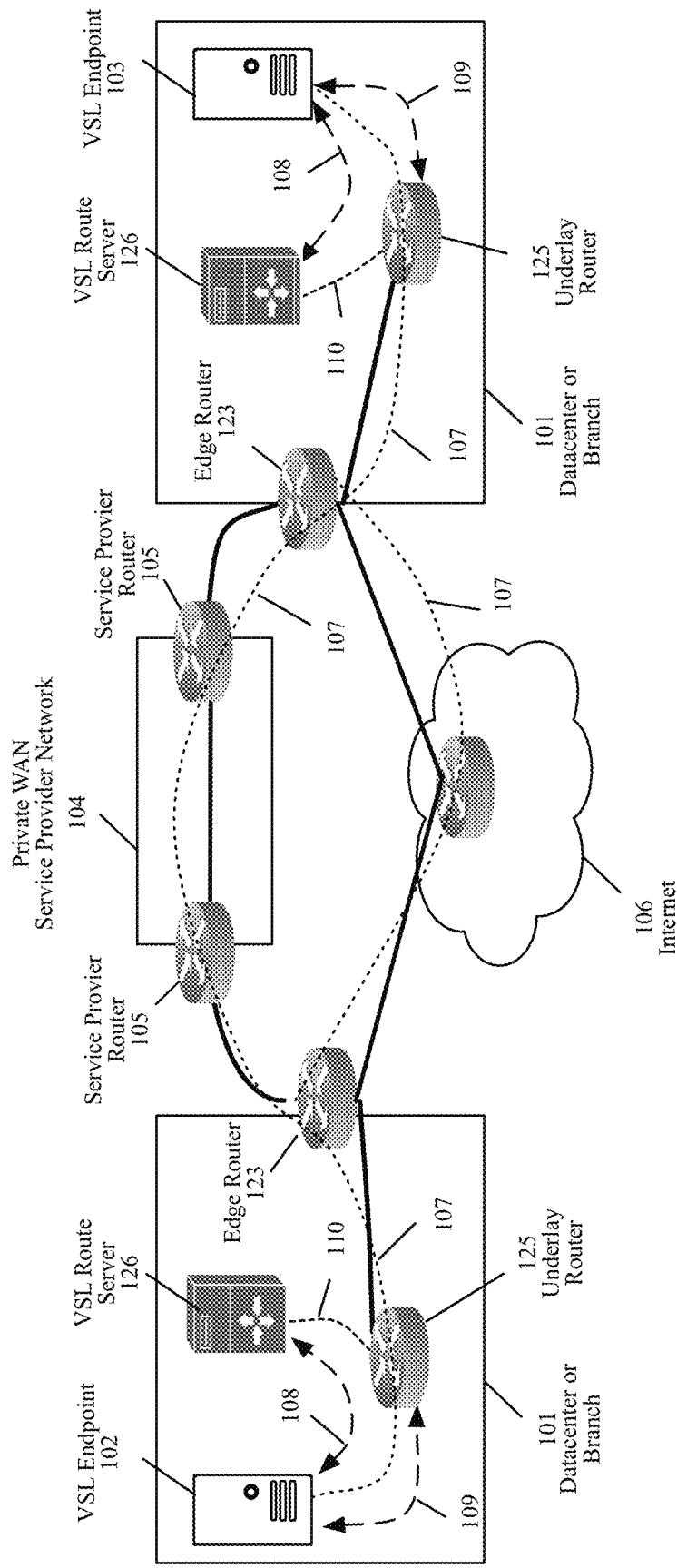
FIG. 1 is a functional diagram illustrating application deployment where the middleboxes that provide perimeter services are removed, and the middleboxes services are moved, in the form of a novel stack/protocol, to the host machines where the edge applications are deployed, according to various aspects of the present disclosure.

The present embodiments provide a novel approach to connectivity and security for services. The approach provides an intelligent service layer, referred herein, as Virtual Service Layer (VSL) that separates application from the physical network and extends the service layer intelligence over IP across the Internet, cloud, branches, datacenters, and edge networks. The approach uses two main principles "end-to-end" and "separation of identification (ID) and locator from IP."

Applying these principles on the network functions/ middleboxes such as, for example, and without limitations, firewall (both stateful and stateless), load balancers, WAN optimization, IDS/IPS, proxies, VPNs, SD-WANs, and/or any tunneling services enables a novel way of building these functions at the edge. An edge is a point in network that is very close to (or near) the applications/services/data deployed on compute, storage, and any end devices. The terms close or near herein defines that there is no intermediate hop to process packets. The services/endpoints handover the packets directly to the VSL, i.e., the VSL receives packet in pristine state from the services/endpoints. The VSL provides a novel way of building network intelligence stack at the edge for services along with network functions. The approach brings novelty to application networking with respect to the services and the endpoints that access the services.

One aspect of the present embodiments includes the realization that the existing standard IP routing protocols exchange route information including IP addresses and L2 media access control (MAC) addresses to provide location information of networks, infrastructures, and endpoints across the next hop routers. The route information is distributed across networks by routers based on policies and semantics of the networks, creating reachability path to source networks, infrastructures, and endpoints. Thus, source endpoints reachability information is visible and available to any network endpoint (edge network, applications, edge devices, client endpoints) to communicate and establish connectivity.

The present embodiments, as described in detail below, solve the above-mentioned problem by providing the VSL protocol. The VSL protocol implemented on top of IP protocol is part of the VSL endpoints and the VSL routers which are deployed behind the IP routers. The VSL protocol implements all required semantics of the routing protocol to peer with the next hops and exchange route information. The VSL router is a standalone network node with the VSL stack. The VSL endpoints may be servers, storage devices, edge devices, mobile devices, IoT devices, virtual machines (VMs), containers, hypervisors, user devices with the VSL stack. For the endpoints, the VSL protocol generates VSL route information, the location information of the endpoints to the next hop IP routers in network. The VSL route information may be appended with the VSL attributes to carry application specific information, marked with transitive and optional properties, to enable the routers that cannot interpret VSL attributes to forward the attributes to the next hop routers. The VSL routes are distributed across networks creating reachability paths as received by the other routers and forwarded to the next hops. Once the VSL route information is received by the VSL protocol, the VSL protocol interprets the attribute values to understand identities of the endpoints at the location given in the route information. The VSL protocol has intelligence to understand the contextual information of the endpoints and reveals reachability location/address of the remote endpoints to only those endpoints based on the contextual relation defined by semantic configuration. The semantic configuration allows users/administrators to define contextual information about the endpoints identities and the relation between the endpoints as consumers and providers (or producers). A provider is an endpoint/application that provides service. A consumer is an endpoint/application that receives and/or consumes a service. An endpoint/application may be defined to be both a provider and a consumer. The VSL protocol, by semantic configuration, only lets consumers reach and communicate and establish connectivity to only providers. Thus, the VSL protocol provides reachability of location/address of the endpoints only to the few endpoints which have the same context with consumer and provider relation, which is referred to herein as the "VSL contextual reachability" intelligence.

Another aspect of the present embodiments includes the realization that the existing IP routing protocols exchange route information (prefixes/IP addresses) of networks, infrastructure, and endpoints across the next hop routers. Once the route information is distributed and populated across networks, branches, data centers, clouds, and the endpoints, every endpoint across these networks may communicate each other. Thus, the IP networks are designed to provide reachability path to any endpoints connected to network. To secure the networks and endpoints, firewalls are deployed to limit the reachability and connectivity to the endpoints in the networks. The standard IP networking architectures by design establish reachability and connectivity to all endpoints across networks and secure the endpoints by deploying firewalls in the network and programming the firewall rules to intercept reachability and connectivity to the endpoints. Thus, the standard designs and architectures implement security on top of reachability by intercepting connectivity between endpoints.

The present embodiments, as described in detail below, solve the above-mentioned problem by providing a novel approach for bringing security as part of connectivity. The VSL implements connectivity on top of security by bringing intelligence to protocol stack with the VSL contextual reachability intelligence, described above, and authentication of endpoints identities. The VSL protocol implements authentication of the endpoint when exchanging route information. The VSL implements new attributes as part of the network layer reachability information (NLRI) that holds the authenticating information, which is generated as part of the contextual information. The VSL protocol at the consumer/receiver endpoint, once receives the route information, validates the route information by extracting the authenticating information from the route information and comparing it with the locally generated authenticating information, which is part of the same contextual information as given in the route information. The authenticating information may include a public key, which is part of the asymmetric keys generated by the VSL protocol based on the contextual information. The asymmetric keys generated would be identical across the VSL endpoints and the VSL routers based on contextual information from semantic configuration. Thus, for any given contextual information, the asymmetric keys generated would be the same across the VSL endpoints and the VSL routers. Only when the authenticating step is successful, the VSL protocol may consume the route information, and only then the location/address of the remote endpoint given in the route information may become visible. Once the location/address is visible to the consuming endpoint, the consuming endpoint establishes session locally which is used for connectivity to the remote endpoint. The reachability information to an endpoint is not available to any endpoint in network at the IP layer, unless the receiver is authenticated. Thus, the visibility and reachability of the endpoints in the IP networking is enabled by the VSL contextual reachability and the VSL authentication of endpoints. This novel way of revealing the reachability information to only the authenticated endpoints based on the VSL protocol reachability intelligence is referred herein as the "VSL contextual visibility." The method of creating the reachability and visibility between the endpoints at IP layer enables secure connectivity between the endpoints. Thus, the VSL implements connectivity on top of security.

Another aspect of the present embodiments includes the realization that the present state of the art of deployment of services, applications, and devices in the IP networks that are distributed across branches, data centers, private/public clouds and edge networks are secured by the firewalls. In spite of the deployment of the firewalls, the network breaches are still endemic, and business are damaged by hackers stealing important assets. In order to restrict and isolate breaches to only segments of the networks and services, the enterprises employ segmentation by separating applications and services, by relevancy of dependency and isolate the networks by departments. The firewall rules are derived based on the topological deployment of services, applications, networks and programs into the firewalls creating paths to only segments of the networks based on relevancy, thus enabling segmentation. As applications, services, and endpoints are getting distributed across the branches, datacenters, clouds, and edge networks, the segmentation is not scaling, and breaches are increasing. The number of rules and granularity of rules to be derived is increasing as more endpoints are distributed and added. As the number of rules and the granularity of rules increase, neither the breaches are decreasing, nor the efficiency of the hardware/software caches is increasing in firewalls to support magnitude of rules.

The present embodiments, as described in detail below, solve the above-mentioned problems. The VSL protocol's "VSL contextual reachability intelligence," described above, implements isolation of the endpoints without reachability across the endpoints and creates reachability only to those endpoints based on dependency given in the contextual relation defined in the semantic configuration. The "VSL contextual visibility intelligence," described above, establishes strict isolation of the endpoints by creating "unique visibility session" between only those endpoints based on the contextual relation given in the semantic configuration. The connectivity between the endpoints may only be established between those endpoints based on the unique visibility session. Communication within the unique visibility session authenticates the packets by message authentication codes and employs encryption of the packets for confidentiality and security. Symmetric keys are derived within the unique visibility session to generate message authentication codes on packets and encrypt packet data. The unique visibility session always mirrors from producer to consumers. Thus, the VSL protocol creates a novel concept, referred herein as the "VSL Reachability Gap." The VSL is bringing first of its kind of powerful security concept to the IP layer for the endpoints distributed across the networks. This method of creating the "VSL Reachability/Visibility Gap" eliminates the need for rules to be derived and programmed in firewalls.

Another aspect of the present embodiments includes the realization that the present state of art of enterprise L2/L3 networks distributed geographically are connected by service providers using L2VPN/L3VPN. Datapath Network virtualization technologies are employed by providers to connect L2/L3 networks. As the Internet is becoming inexpensive, service providers and enterprises are moving to Internet by using SD-WAN solutions to create full mesh of networks to connect services, applications, device endpoints distributed across branches, datacenters, clouds, and edge networks. SD-WAN solutions creates encrypted and non-encrypted tunnels over Internet between branches, datacenters, clouds, and edge networks creating full mesh of tunnels. Tunnels are chosen by application flows based on policies and forwards the flows over Internet. Path selection is employed on application flows to choose tunnel based on application type and tunnel/path metrics loss, latency, and jitter. All these policies are orchestrated (automation of configuration) based on the topology and location of networks by a centralized controller. Tunneling technologies hide application from transporting/underlay networks obscuring the application visibility to the underlay networks. Full mesh of tunnels limits scalability as more locations to connect are increasing. SD-WAN, IP-VPNs, and tunneling gateways connecting networks across do not provide complete and holistic security.

The present embodiments, as described in detail below, solve the above-mentioned problems. The VSL protocol connects endpoints distributed across the branches, datacenter, clouds, and edge networks over the Internet without any need of the IP-VPN, SD-WAN, and tunneling proxy gateways. The VSL route servers are deployed at the points of presence (POPs) and at the respective network locations and peer with each other to exchange routes of endpoints. Each VSL route server represents a single network in a plurality of networks connected over the Internet. For networks connected over a private WAN, a single VSL route server represents one autonomous system network. The VSL route servers peering over the Internet is called external peering and peering over private WAN is called internal peering. The VSL endpoints/VSL routers residing behind the network address translation (NAT) devices peer with the VSL route servers to emit the VSL route of application endpoints location. The VSL route servers facilitate session traversal utilities for NAT (STUN) protocol to the VSL endpoints/VSL routers behind the NAT device to discover the external public IP and port representing the internal VSL endpoint/ VSL router. Once the public IP address and port is discovered, the VSL endpoint/VSL router updates the reachability information in the VSL route representing the VSL endpoint/ VSL router behind NAT, in order for the external endpoints to connect to the endpoints behind NAT to use the correct public IP address and port. The VSL route servers modify the VSL route based on peering over the Internet or private WAN of the enterprise/service provider to retain the external or internal reachability information of the VSL endpoint/ VSL router. With the VSL contextual reachability and visibility intelligence, the VSL endpoints/VSL routers consume the VSL route, establish the reachability path for connectivity using the public IP address over the Internet, and the internal IP address over the private WAN. The VSL enables the endpoints to establish connectivity at the layer 4 (L4 layer), in order that the transport network may have visibility of application. Thus, the VSL learns reachability path to the endpoints distributed across the networks connected by the Internet and private WAN creating a flat networking, referred herein as the "VSL Flat Networking." This removes the need for using tunneling solutions to connect the endpoints distributed across the networks over the Internet.

Another aspect of the present embodiments includes the realization that the middleboxes, such as, WAN optimizers, SD-WAN, and other tunneling solutions provide path selection depending on the WAN and the Internet uplinks available. The L2/L3 networks distributed geographically are connected by private the WAN and/or the Internet by provisioning one or more uplinks. These middleboxes, based on path metrics and application flow identified, chose a path for the flow. The path selection capability is achieved by these middleboxes deployed at the edge of the network.

The present embodiments, as described in detail below, solve the above-mentioned problems. The VSL endpoints/ VSL routers may select a path for a connection by destination prefix in both disjoint and non-disjoint cases. In the disjoint cases, the VSL route servers peers with the edge routers to program static routes, which maps certain public IP addresses and prefixes to the Internet uplinks. For the private WAN uplinks, the static routes are programmed to map certain private IP addresses and prefixes WAN uplinks. The VSL endpoint route information emitted by the VSL endpoints/VSL routers carry application context as part of route attributes. Based on path uplinks configuration given in semantic configuration defined for services, the VSL route servers extract and group prefixes of same context from the VSL routes and based on the path configuration, create matrix of static routes mapping between the IP addresses/ prefixes and the paths uplinks with priority. By giving priority to the routes, if any uplink is down next route with priority takes over to forward traffic on secondary uplink. The VSL endpoints/VSL routers derive path metrics loss, jitter, and latency and generate report to the VSL route servers. The VSL route servers, based on aggregate reports from all endpoints within that network, changes the priority of the static routes with respect to the uplinks. In the non-disjoint case, where uplinks are attached directly to VSL endpoint/VSL router, the VSL endpoints/VSL routers may select uplinks based on the destination IP address at the edge of network. Thus, the VSL enables the "VSL Path Selection" with standard routers at edge networks without a need for the middle boxes.

Another aspect of the present embodiments includes the realization that the Internet was built on the IP protocol, where the IP address acts as the locator to route the packets to destination endpoints. The principles that govern building of the Internet protocol makes the Internet to scale to millions of endpoints, as the endpoints can plug into the Internet and can communicate with any other endpoint using its IP address called locator. The enterprises use the Internet Protocol in their networks across branches, datacenters, and public clouds to deploy applications. Here, the IP address represents two aspects, one as the locator to route the packets and the other as the identity of applications in the network. In order to derive the identity of applications in the network, subnets are assigned to applications building topologies, so that policies may be employed at the routers using prefixes. This forces the network administrators to update the networks when new services and applications deployed.

The present embodiments, as described in detail below, solve the above-mentioned problems. The VSL stack introduces a novel concept of separating the identity from the locator, so that the networks may remain untouched when new applications and services are deployed. The VSL stack uses the IP addresses assigned by network administrators to the application endpoints to support the TCP/IP stack as the identity IP addresses that are not published to the underlay network for routing. Different applications are assigned different identities while the same application instances distributed across use the same identity. On the other hand, the VSL stack uses the IP addresses assigned the network fabric (the underlay network) to the VSL endpoints and VSL routers by the dynamic host configuration protocol (DHCP) as the locator IP addresses for routing packets. The VSL stack formats application flow packets with identity headers as identity packet and encapsulates identity packet with locator header to route the packet. The identity header comprises of the application L4 header and the L3 identity IP header. The locator header comprises of the L4 header and the L3 locator IP header. The network that allocates IP addresses to the VSL endpoints/VSL routers is referred to as the "locator network." The separation of the identity aspect for identification of applications from the locator aspect for identifying the route is referred to as the VSL "Separation of Identity from Locator." In the present embodiments, the VSL endpoints and the endpoints behind the VSL router implement the "identity network."

Another aspect of the present embodiments includes the realization the Internet was built on the IP protocol, which scales to millions of endpoints with simplicity of plug and play. The IP protocol was built on governing principle called end-to-end, which states that all the intelligence of applications should not reside in network. The network should be unintelligent and agnostic to any application, and the intelligence should reside at the edge. The edge of a network comprises of middleboxes, the networks function with intelligence to understand application traffic to secure and meet performance of applications. Whereas enterprises employ the IP protocol in their networks for their applications, and maintain application intelligence and network functions in the network. This imposes enterprises to define topologies of applications for security and connectivity depending on how applications are spread out across enterprise networks. This method of deploying network functions and maintaining application intelligence in the network contradicts end-to-end principle and devoid properties of simplicity and scalability of the Internet.

The present embodiments, as described in detail below, solve the above-mentioned problems by bringing "end-to-end principle" to the enterprise networks, by implementing network functions and application intelligence at the edge of the endpoints. The endpoints comprise of computing devices, servers, storage devices, edge devices, mobile devices, IoT devices, VMs, containers, hypervisors, user devices, etc. Combined with the VSL separation of the identity from the locator and the VSL end-to-end principle, the VSL moves the network functions and intelligence near to the endpoints, making the enterprise networks agnostic to any applications. This brings the Internet properties of scalability and simplicity to the enterprise networks, removing the necessity of defining topologies for applications. The VSL stack based on application identity applies required network functions for security and performance of application. Thus, the VSL brings end-to-end principle to the enterprise networking by implementing the network functions and application intelligence with its VSL reachability and visibility intelligence, referred herein as the "VSL End-to-End Intelligence."

Another aspect of the present embodiments includes the realization that from the dawn of networking, information technology (IT) administrators configure network elements/nodes, such as, switches, routers, and middleboxes to bring up the network infrastructure. As new services and applications are deployed, the network IT administrators have to update the configuration across all network nodes to support new applications. These methods of deriving configuration manually based on topology of application deployments and updating network elements maintaining backward compatible with existing applications and networks is decreasing efficiency by disrupting networks and creating security holes. The administrators started adapting to automation solutions to minimize manual errors. The notable solutions are the SDN, which implements zero touch configuration, where the controller derives configuration on the fly based on changes for new deployments and configures/programs network elements. As the endpoints and applications are distributed across various public and private clouds and edge networks, orchestrating disparate networks and interacting with various SDN controllers are becoming complex and leaving security holes, and are sometimes infeasible. Moreover, the middleboxes have to be configured for services deployed to provide security and improve performance of applications. Configuring the middleboxes is becoming complex when services are distributed across networks.

The present embodiments, as described in detail below, solve the above-mentioned problems by bringing a novel concept referred herein as "zero configuration," where there is no need for configuring the network elements for new application deployments in branches, datacenters, private and public clouds. Using the VSL "separation of identity from locator," decouples the network fabric and application endpoints (applications, compute, storage, and devices), and enables the network to be agnostic of applications, and devoid of topologies. The network, therefore, need not to be touched for new application deployments. Similarly, zero configuration is extended to the middleboxes by employing the VSL end-to-end intelligence at the edge. By moving the network functions to the edge, the VSL intelligence has context of application by its identity, therefore the VSL may activate the required functions for that application flow without the loss of any functionality with respect to security and performance of applications. The VSL, therefore, brings "Zero Configuration" to application networking across branches, datacenters, clouds, and edge networks.

Another aspect of the present embodiments includes the realization that, from the inception of networking, all networking architectures were designed for centralized infrastructure and applications. All infrastructure and applications are co-located in one place and perimeter firewalls are built around the edge of the network to secure and give access. For performance of applications, perimeter services are deployed at edge of networks, and tunneling gateways are deployed to let endpoints from the Internet to connect to applications by giving access to network securely. These perimeter services are called the middleboxes. As applications are distributed across the networks, these perimeter firewalls and services are deployed at the edge of the networks with increasing complexity. With the dawn of digital transformation as more endpoints are accessing applications, and applications are distributed across public clouds, private clouds, and edge networks, building these perimeter firewalls and services are getting complex and create security holes.

The present embodiments, as described in detail below, solve the above-mentioned problems by providing a novel way of bringing perimeter firewalls and services functionality to the applications and infrastructure by moving these services near the applications. With the VSL "end-to-end intelligence," the VSL stack brings enterprises novel ways of deploying the perimeter services and removing complexity of maintaining them in network. Rather than maintaining the middleboxes in and at the edge of the network, the enterprises may deploy the VSL stack at near/edge of the compute, storage and edge devices. For edge deployments, the VSL stack may be a superset of the TCP/IP stack at the operating system (OS) level. For near deployments, the VSL router is deployed between the router and the applications (one of the examples of near deployments would be the top of rack switch or the virtual software VSL router). Thus, the VSL dissolves the need for perimeter services by providing what is herein referred to as the "VTL/IP Edge Networking or VSL Endpoint Services." With the VSL reachability and visibility intelligence, the VSL stack derives application context of a flow in the datapath and based on semantic configuration definition of application, the respective functions are applied on the flow.

Another aspect of the present embodiments includes the realization that the present state of the art of security employs various methods to secure the networks and applications. The edge firewalls and IDS/IPS are deployed at the edge of network for centralized applications, and distributed Firewalls and zero trust security are implemented for distributed applications and work force. For all these existing methods, rules and policies are derived based on the topology of applications deployment and the rules are programmed to the firewalls. The method of deriving rules and programming to firewalls cannot fill all open gaps, as application changes and endpoints are in constant move. To keep up with changing the network and applications, automation of rules deriving either by detecting the change or by analytics can overwhelm the rules to be programmed and cannot guarantee the elimination of attack terrain.

The present embodiments, as described in detail below, solve the above-mentioned problems by bringing a novel approach of eliminating the attack surface by employing the "VSL reachability/visibility gap" between the endpoints without any firewall rules. The reachability to an endpoint and visibility of the endpoint create a strict network path at the IP layer between only those endpoints. Thus, the VSL dissolves the rule-based systems of security, referred herein as the "Non-Rule-Based Security."

Another aspect of the present embodiments includes the realization that the applications in the IP network are deployed under subnets, creating topologies and employing classless inter domain routing. The IP assigned to application instances will represent as identity and locator of the application in the network. This makes the applications to bind to the network and become inflexible and cumbersome to create topologies under various subnets.

The present embodiments, as described in detail below, solve the above-mentioned problems by employing the "separation of identity from locator" to assign IP identity or subnet identity to each application. So that all instances of the same application may have the same IP identity or subnet identity. This decouples the application from the network and eliminates the cumbersome creation of the topology. To create such identity, the VSL imposes requirements on the network based on deployment. The endpoints should configure default route to the Gateway IP address of VSL router/VSL stack and disable the ARP reply on IP identity and/or subnet identity. The VSL sends gratuitous address resolution protocol (ARP) to resolve MAC of default route Gateway IP at the endpoints. Thus, the VSL assign IP identity or subnet Identity to each instance of the same application, this is referred herein as the "VSL Identity Network."

Another aspect of the present embodiments includes the realization that the present state of the art of network virtualization enables the decoupling of the application networking from the underlay by spinning up the network constructs on demand as the overlay network. As the new applications are built and deployed, the network virtualization can spin up the network for applications, minimizing the time to market. As more and more overlay networks are created and distributed, connecting them and debugging the operational problems become more complex and will cause applications to be unavailable.

The present embodiments, as described in detail below, solve the above-mentioned problems. The VSL employs the "VSL Identity Network," the "VSL Endpoint Services," and the "VSL End-to-End Intelligence" to implement network virtualization. The "VSL Identity Network" separates application from underlay network. The "VSL End-to-End Intelligence" and the "VSL Endpoint Services" enable network functions based on the application requirement at the edge and forwards the traffic. Thus, The VSL removes the need for complex overlay networks and simplifies network virtualization, this is referred to herein as the "VSL Network Virtualization."

The remaining detailed description describes the present embodiments with reference to the drawings. In the drawings, reference numbers label elements of the present embodiments. These reference numbers are reproduced below in connection with the discussion of the corresponding drawing features.

FIG. 1 is a functional diagram illustrating application deployment where the middleboxes that provide perimeter services are removed and the middleboxes' services are moved, in the form of a novel stack/protocol, to the hosts where the edge applications are deployed, according to various aspects of the present disclosure. With reference to FIG. 1, the branches/datacenters 101 may be connected by one or more private WANs 104 and/or by the Internet 106. The endpoints 102-103, referred herein as the VSL endpoints, may be deployed across the branches/datacenters. The VSL endpoints 102-103, may be network nodes, such as, physical host machines that include a VSL protocol stack, referred herein as the VSL stack.

It should be noted that a network node is a physical or virtual device that is attached to a network and is capable of creating, receiving, or transmitting information over a communication channel. A host, or an endpoint, is a physical electronic device, such as a desktop computer, a laptop computer, a mobile device, a workstation, tablet, an IoT device, or other types of computing device, that may convert user information into signals or may receive signals. A host may act as a client and/or as a server.

The VSL stack includes a set of programs that provide the VSL's networking functions. The VSL stack implements a control plane and a data plane (or datapath) of the VSL. The VSL control plane implements the intelligence of understanding the applications, converting the information into route information, and emitting the route information to the next hop routers. The VSL control plane is architected with the protocols to facilitate signaling, routing, and addressing. The VSL data plane is architected with the protocols to process the applications packets to connect the application endpoints to each other and transfer data from one endpoint in the network to another.

The VSL route server 126 may be a similar to a Boarder Gateway Protocol (BGP) route reflector with the extended functionality of incorporating and interpreting the VSL specific route attributes and the identity of application. A route reflector may advertise routes learned from an internal peer to the peers without requiring all internal peers to be fully meshed with each other.

A route server is a server that exchanges route information with the routers and other route servers over the BGP control plane. A route server is used to exchange route information for the endpoints that communicate through the Internet. A VSL route server is a route server with the capability of understanding both the BGP control plane route semantics and the VSL attributes, such as, the VSL attributes below with reference to FIGS. 35C, 35E, and 36C-36D.

One or more applications may be deployed on the VSL endpoint hosts 102-103, which are located in the branches 101 or datacenters 101. The VSL control plane in the hosts 102-103 may peer (as shown by the arrows 109) with the underlay routers 125 to exchange routing information through the private WANs 104. The VSL control plane may peer (as shown by the arrows 108) with the VSL route servers 136 to exchange routing information through the Internet 106.

The application endpoint routes may be created and emitted by the VSL control plane deployed in the VSL endpoint hosts 102-103 to create reachability paths 107 over the private WANs 104 and/or the Internet 106. For the private WAN paths, the endpoint routes may be leaked between the branches/datacenters 101 from/to the edge routers 123 through the service provider routers 105. For the Internet paths, the endpoint routes may be leaked between the VSL route servers 126 peered (as shown by 110) over the Internet 106 after finding Network Address Translated (NATed) IP address and the port representing the internal VSL endpoints 102-103.

The VSL control plane brings application intelligence to the IP protocol, where the VSL control plane may derive the identity of application endpoints and may learn route information of remote application endpoints that are of interest to the local application endpoints. The VSL control plane may take the service definition that defines the semantic configuration of applications to derive the application identities and relations. The VSL stack may use the application intelligence and may apply the necessary network functions to secure and optimize the application traffic The VSL control plane may implement the endpoint security by generating endpoint routes for each application endpoint and may only reveal the application endpoint route to those applications at the VSL endpoints that are the right candidates to communicate. The Application endpoints that do not have any semantic relation may not learn the route of the other application endpoint resulting in non-addressability and reachability. Any communication from any other endpoint that is not recognized as the right candidate to communicate drops the packets, thus VSL endpoint implements security at the IP layer and thereby eliminates the need for firewall middleboxes.

The VSL control plane may learn the capacity of service application endpoint (server apps) instances from the endpoint routes. Based on the available capacity, the VSL stack may select the endpoint for given flow dynamically at the source VSL endpoint by using the endpoint identities. This capacity of a service is typically reserved for the source application endpoint by negotiating between the source VSL endpoint and the destination VSL endpoint. Thus, the VSL endpoint implements application workload balancing and thereby eliminates the need for load balancer middleboxes.

The VSL endpoint may apply WAN optimization (WAN-Opt) functions based on the service path configuration. WAN optimization functions are collection of techniques for increasing data transfer efficiencies across the networks. As a VSL endpoint learns the relevant remote application endpoints for the local applications deployed at the VSL endpoint, the VSL endpoint may derive path semantics of the remote endpoints and may learn which network functions to apply to application traffic end-to-end at VSL endpoints. Thus, the VSL endpoint eliminates the need for WAN optimization middleboxes.

The TCP optimization (TCP-Opt) is applied on the TCP flows based on the path configuration for given application endpoint end-to-end. Forward error correction may be applied on the User Datagram Protocol (UDP) flows based on the path configuration for given application endpoint end-to-end. Encryption may be applied on the TCP/UDP flows based on the path configuration for given application endpoint end-to-end. The encryption session key may be communicated by the source VSL endpoint as part of the endpoint route to the receiving VSL endpoint. As part of the source session, key encryption and decryption may be applied end-to-end. The VSL endpoints 102-103 may employ path selection at the source based on the information given in the endpoint route. A VSL endpoint may be reached from the private WAN 104 and/or the Internet 106. Therefore, the application endpoint routes may be received from the private WAN 104 and/or from the Internet 106 through the VSL route servers 126. Based on the priority and other metrics, the VSL endpoint may chose a path by the destination locator address. The VSL endpoint may establish reachability to application endpoints distributed across networks over the Internet 106 and the private WANs 104 by learning the route of the endpoint through the VSL route servers 126 and/or through the underlay routers 125, without the need to establish tunnels.

Figure 2:
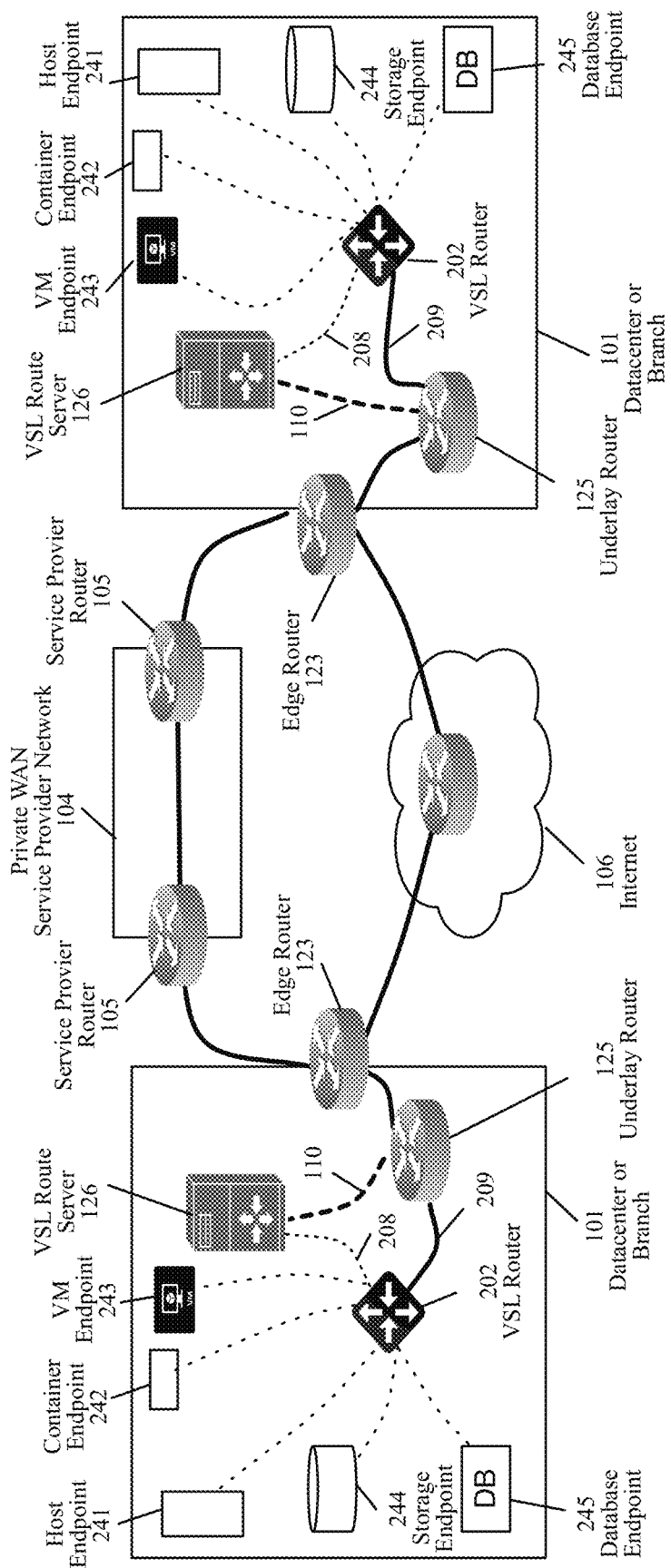
FIG. 2 is a functional diagram illustrating application deployment where the middleboxes that provide perimeter services are removed by moving the middleboxes services to a VSL router that includes a novel stack/protocol and is located near the application endpoints, according to various aspects of the present disclosure.

FIG. 2 is a functional diagram illustrating application deployment where the middleboxes that provide perimeter services are removed by moving the middleboxes services to a VSL router that includes a novel stack/protocol and is located near the application endpoints, according to various aspects of the present disclosure. With reference to FIG. 2, the branches/datacenters 101 may be connected by the private WANs 104 and/or the Internet 106. The application endpoints 241245 may be deployed behind the VSL routers 202. The application endpoints may include, for example, and without limitations, host endpoints 241, container endpoints 242, VM endpoints 243, storage endpoints 244, database endpoints 245, distributed across datacenters/branches 101. The VSL routers 202 discover the application endpoints 241-245 and enable connectivity between them.

A network node with the VSL stack is referred herein as a VSL router. A VSL router, in some embodiments, may be located between an underlay IP router and the hosts. The control plane of the VSL router 202 may peer (as shown by the arrows 209) with the underlay routers 125 to exchange route information through the private WANs 104. The control plane of the VSL router 202 may peer with the VSL route server 126 (as shown by the arrows 208) to exchange route information through the Internet 106. Application endpoint routes may be created and emitted by the VSL router 202 to create reachability paths over the private WANs 104 and the Internet 106. For private WAN paths, the endpoint routes may be leaked between the branches/datacenters 101 from/to edge routers 123 through the service provider routers 105. For the Internet paths, the endpoint routes may be leaked between the VSL routers 202 through the VSL route servers 126 peered (as shown by the arrows 110) over the Internet 106, after finding the NATed IP address and the port representing the internal IP address of VSL router 202.

For the endpoints 241-245 behind the VSL router 202, the VSL router 202 acts as an L3 gateway and an L2 proxy (ARP proxy). After the endpoint routes are exchanged, communication across the VSL routers (where the applications 241-245 are deployed in hosts and behind the VSL routers 202) happens as stated above with reference to FIG. 1. Moreover, the application endpoints at the VSL endpoint may communicate with the application endpoints at VSL router.

Figure 3:
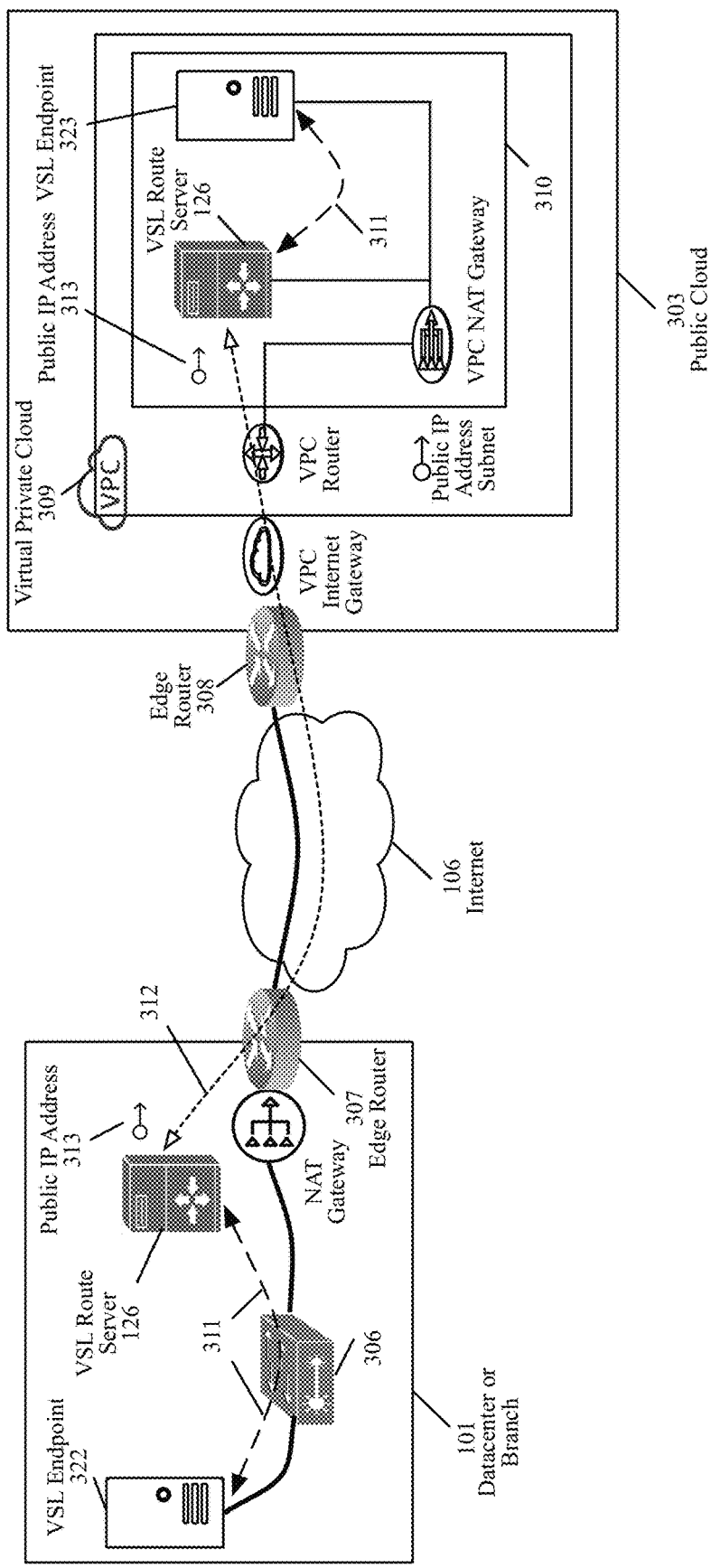
FIG. 3 is a functional diagram illustrating application deployment where the middleboxes that provide perimeter services are removed from within and across the public clouds and the corresponding services are moved near to the applications using a novel stack/protocol, according to various aspects of the present disclosure.

FIG. 3 is a functional diagram illustrating application deployment where the middleboxes that provide perimeter services are removed from within and across the public clouds and the corresponding services are moved near to the applications using a novel stack/protocol, according to various aspects of the present disclosure. With reference to FIG. 3, the branches/datacenters 101 may be connected to the public clouds 303 over the Internet 106.

The VSL endpoints 322-323 at the branch/datacenter 102 and at the public cloud 303 may peer (as shown by the arrows 311) with the VSL route servers 126. The VSL route servers 126 may be assigned the public IP address 313 at the branch/datacenter 101 and at the public cloud 303 to peer (as shown by the arrow 312) over the Internet 106. The VSL route servers 126 may exchange route information over the Internet 106 after finding the NATed public IP address of the VSL endpoints 322-323 at the corresponding branch/datacenter and VPC. After the endpoint routes are exchanged, communication across the VSL endpoints (where applications are deployed in VSL hosts and behind the VSL routers) may happen as described above. The VPC NAT gateway, the VPC router, and the VPC Internet gateway are used to deploy the VPC 309. The NAT gateway in the datacenter provides a mapping of the internal IP addresses to public IP addresses.

Figure 5:
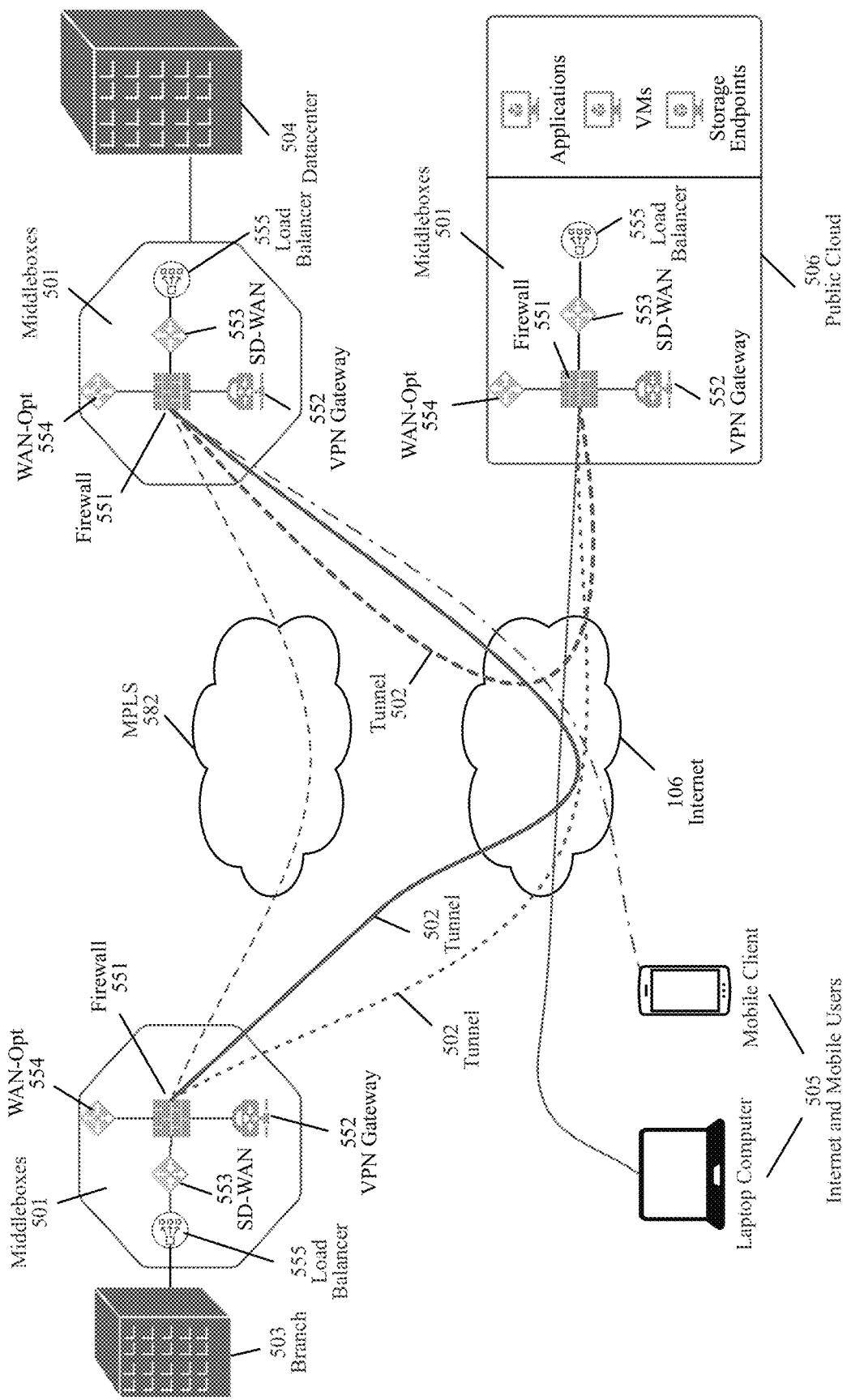
FIG. 5 is a functional diagram illustrating the perimeter architecture according to prior art.
Figure 6:
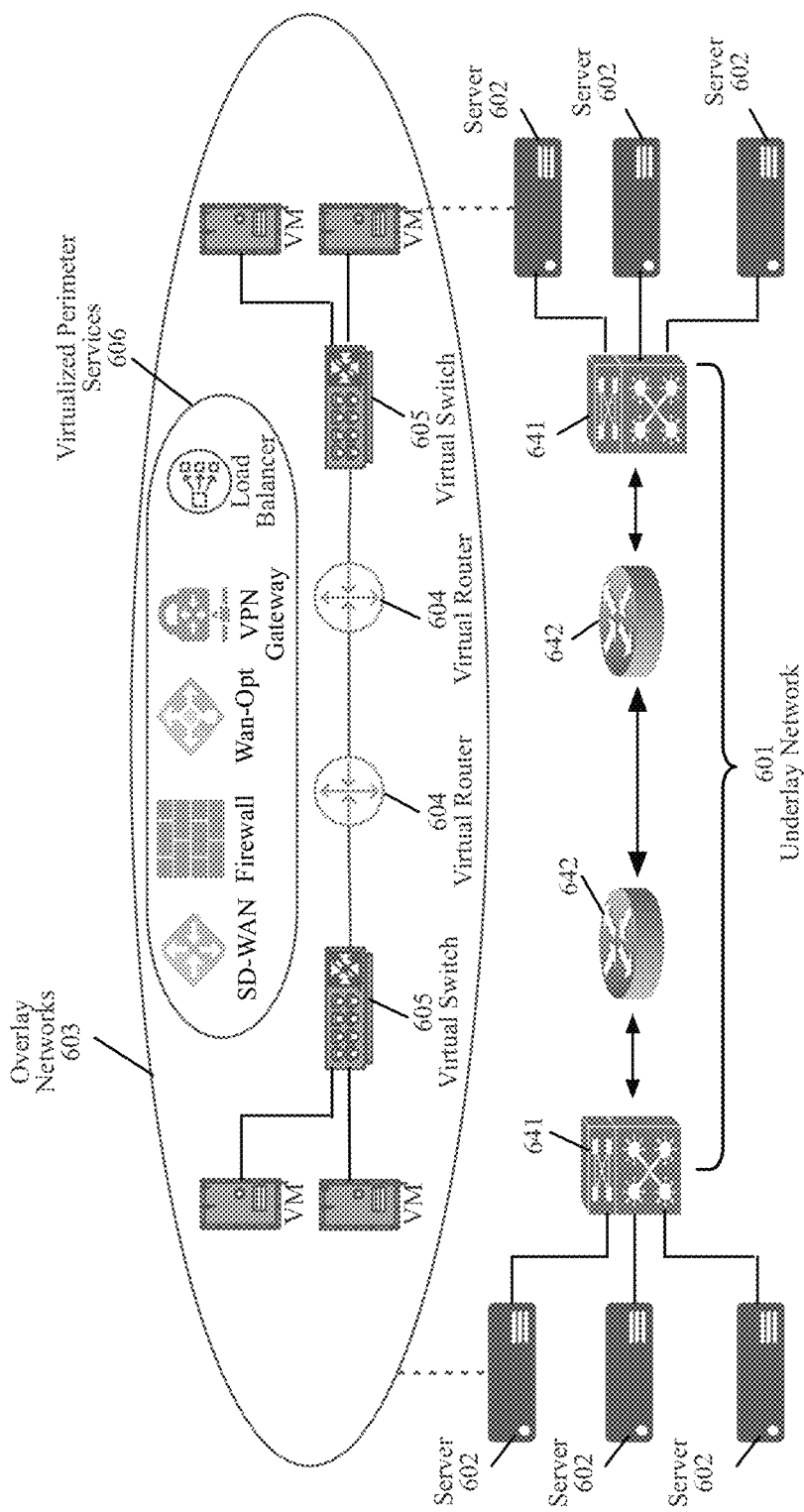
FIG. 6 is a functional diagram illustrating a virtualization network architecture using, according to prior art.

As described above with reference to FIGS. 1-3, the present embodiments deploy a novel virtual service layer that is implemented at the IP layer and is deployed near the endpoints in the networks. The present embodiments eliminate the need for middleboxes that are deployed at different positions in the network to provide services such as firewall, load balancing, WAN optimization, VPN, etc. FIGS. 5 and 6 illustrates the example of middleboxes as deployed in the prior art.

Figure 4:
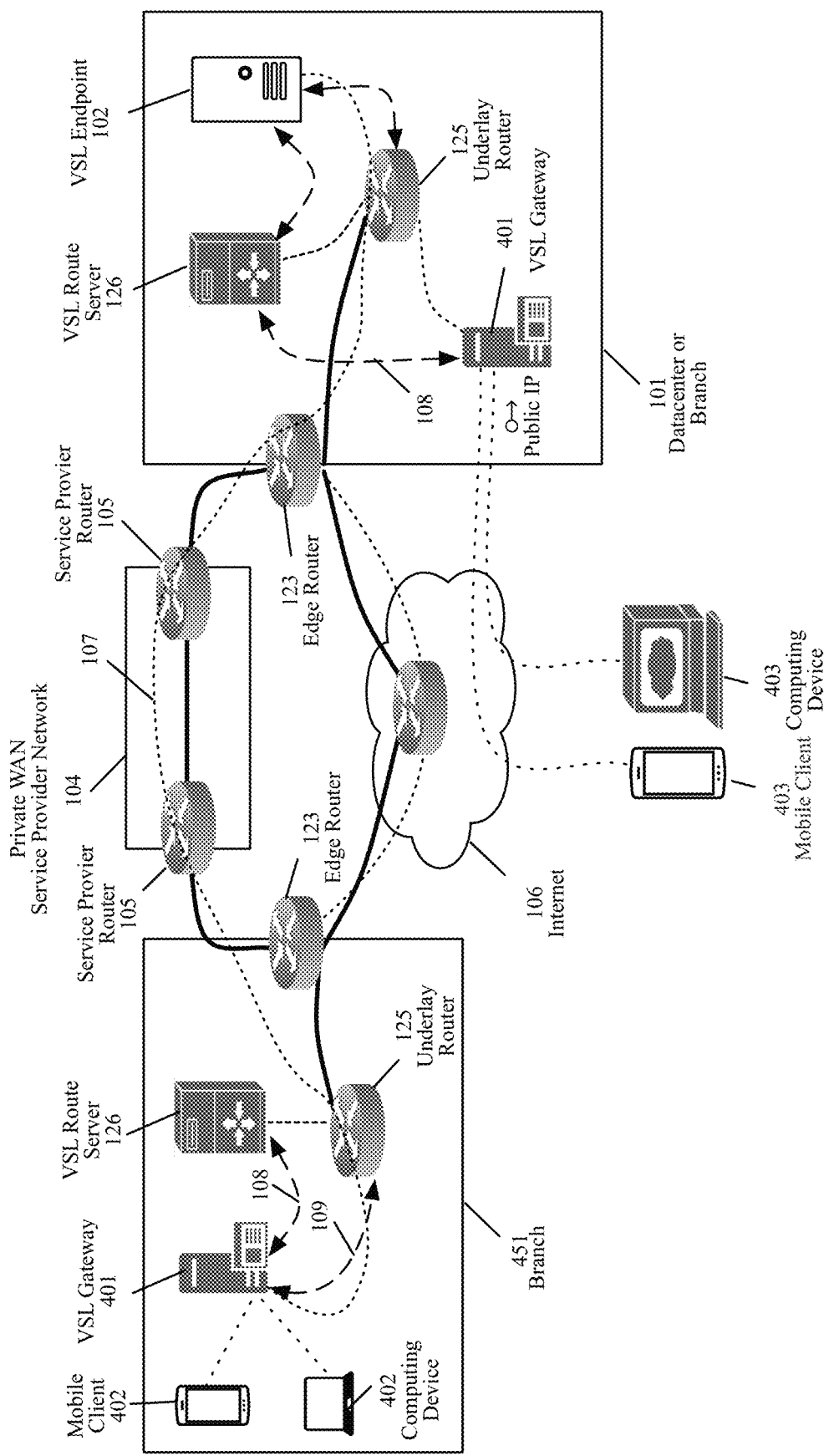
FIG. 4 is a functional diagram illustrating application deployment facing the Internet users, where the middleboxes that provide perimeter services are removed and the middleboxes intelligence is moved to the VSL endpoints and the VSL gateway, according to various aspects of the present disclosure.

FIG. 4 is a functional diagram illustrating application deployment facing the Internet users, where the middleboxes that provide perimeter services are removed and the middleboxes intelligence is moved to the VSL endpoints and the VSL gateway, according to various aspects of the present disclosure. A network node with the VSL stack and the standard BGP routing capability is referred herein as a VSL gateway. The VSL gateway, in some embodiments, may be deployed facing the non-VSL network nodes (e.g., the endpoints without the VSL capabilities or the redistribution points without the VSL capabilities), which may be located on the Internet or in the local network.

With reference to FIG. 4, the VSL gateway 401 is a network node deployed facing the non-VSL endpoints 402-403 in the locator network. A non-VSL endpoint 402-403 is an endpoint that does not have the VSL stack deployed nor is located in the identity network. The VSL gateway 401 provides connectivity between the applications that are deployed at the VSL endpoint 102 and/or the VSL router 202 (FIG. 2) and the application deployed in the non-VSL endpoints 402-403.

With further reference to FIG. 4, the branch 451 and the branch/datacenter 101 may be connected over the private WAN 104 and/or over the Internet 106. The non-VSL endpoints 402-403 are connecting from branch 451 and the Internet 106 to access the services deployed at the VSL endpoints 102. The VSL gateway 401 peers (as shown by the arrow 109) with underlay router 125 and peers (as shown by the arrow 108) with the VSL Route server 126, and receives application endpoint route information from the VSL endpoint 102.

The VSL gateway 401 may receive route information of only application endpoints which are frontend applications i.e., the customer facing applications. The VSL gateway 401 may publish the virtual IP address of the frontend applications to attract traffic from the users (e.g., from the non-VSL endpoints 402-403). The VSL gateway 401 may implement functionality of the standard firewall and connection tracking to identify any malicious traffic from non-VSL endpoints 402-403. In order to protect applications and networks, the VSL gateway, for backward compatibility, may implement standard firewall functionality facing non-VSL endpoints. The communication between the VSL gateway 401 and the VSL endpoints 102 and the VSL routers is similar to what was described above with reference to FIGS. 1-3.

FIG. 5 is a functional diagram illustrating the perimeter architecture according to prior art. With reference to FIG. 5, the branch 503 and the datacenter 504 may be connected by the private WAN (e.g., an MPLS WAN) 582 and the Internet 106 uplinks. Applications and Data may be distributed across the datacenters 504 and the public clouds 506. The branches 503, the datacenters 504, and the public clouds 506 may be stitched by tunneling solutions over the Internet forming a complex connection of tunnels 502.

The perimeter services 501 may be deployed at the edges of the branch 503, the datacenter 504, and the public cloud 506 to secure and apply network functions on application traffic. The perimeter services 501 may include firewall 551, VPN gateway 552, SD-WAN 553, WAN-Opt 554, load balancers 555, etc., the so called middleboxes. Traffic entering and leaving the network may be processed by the perimeter services provided by the middleboxes 501. As new applications are deployed, the middleboxes 501 has to be programmed with new configurations based on the topology of the applications deployed at the datacenters 504, the public clouds 506, and the branches 503. The mobile devices 505 (e.g., mobile devices with web browsers) may access the services from the Internet 106 connecting to applications deployed either in the datacenters 504 or the public cloud 506. In contrast to the middleboxes 501 that are spread at the edge of the network, the present embodiments, as described above, provide similar services by using a protocol that is implemented by deploying a VSL control plane and a VSL stack at, or close to, the endpoints in the network.

FIG. 6 is a functional diagram illustrating a virtualization network architecture using, according to prior art. With reference to FIG. 6, the overlay networks 603 may be built to separate applications from the underlay network's 601 infrastructure 641-642 to spin up applications quickly and scale faster. The overlay networks 603 may be built using virtualized network constructs, such as, the virtual switch 605, the virtual router 604, and/or the virtualized perimeter services 606 for the applications that are deployed in the overlay networks 603. All these virtual network constructs are built in software and are deployed on the servers 602, with the virtual switches 605 connecting the virtual constructs.

The overlay network constructs 604-606 may be deployed across the servers in the same underlay network connected by the virtual switches. Software Defined Networking (SDN) orchestrates the overlay network constructs 604-606 on demand by deriving the required configuration based on the topology for application connectivity. In contrast to the architecture of FIG. 6, the present embodiments, as described above, provide similar services by using the protocol that is implemented by deploying the VSL control plane and the VSL stack at, or close to, the endpoints in the network, thereby avoiding the need for the overlay networks 606.

Figures 7A, 7B:
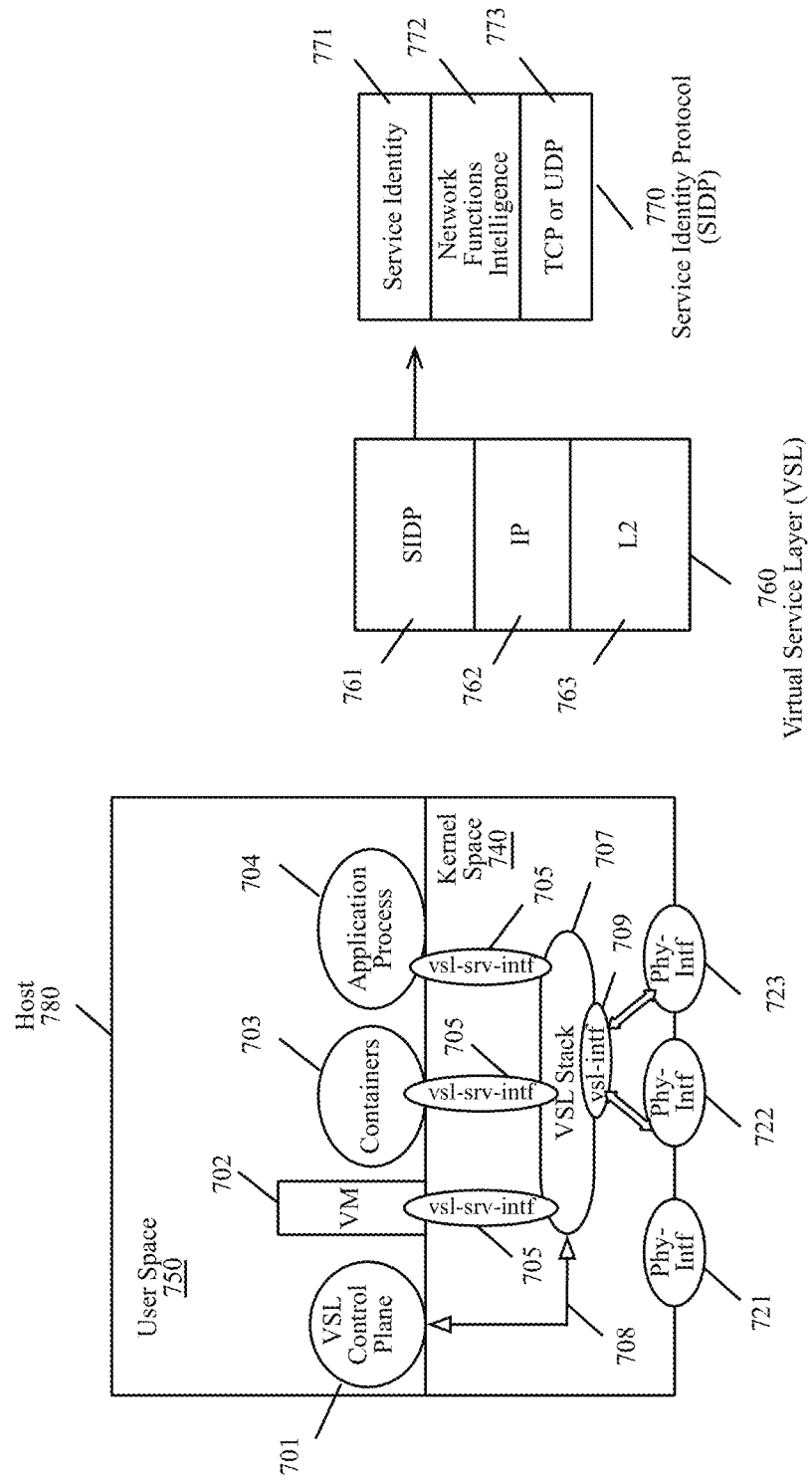
FIG. 7A is a functional diagram illustrating the VSL stack deployed at a host, according to various aspects of the present disclosure.
FIG. 7B is a functional diagram illustrating the VSL stack placement in open systems interconnection (OSI) model, showing service identity protocol being placed after L3 layer.

FIG. 7A is a functional diagram illustrating the VSL stack deployed at a host, according to various aspects of the present disclosure. With reference to FIG. 7, the VSL stack 707 may be deployed at the host 707. A host with the VSL stack is referred to, herein, as a VSL endpoint. The service ports, VSL virtual service interface (vsl-srv-intf), 705 may connect the applications 702-704 to the VSL stack 707. The VSL virtual interface (vsl-intf) 709 may bond to one or more physical interfaces (phy-intf) 721-723 to receive and transmit data traffic in/out of the host 780. The VSL control plane includes the VSL protocol daemon 701, and the VSL BGP daemon (further described below with reference to FIG. 42). The VSL protocol daemon 701 is the control plane of the VSL stack 707 that programs the endpoint rules and session keys for reachability of flows from/to the applications 702-704. The VSL protocol daemon 701 may bind to the VSL interface 709 for peering with external routers.

With further reference to FIG. 7A, the VSL stack 707 may be implemented in-line with the packets path. The vsl-intf, 709 may act as a gateway interface for receiving traffic from the network. The vsl-intf 709 may receive routable IP addresses from the network by a network management protocol, such as, for example, and without limitations, the DHCP.

If one or more subnet IP addresses are received from different physical interfaces 706 bonded to the vsl-intf 709, all IP addresses are assigned to the VSL interface 709 as aliases. The alias is a concept in networking for assigning one or more IP addresses to the same interface. The VSL stack 707 and the VSL protocol daemon 701 view the network where application endpoints 702-704 are deployed as the identity network. The VSL stack 707 may create the vsl-srv-intf 705 for the applications 702-704 deployed in the identity network.

With continued reference to FIG. 7A, the host 780 may include a kernel space 740 and a user space 750. The user space 750 and the kernel space 740 are divisions of the computing capabilities of the host machine 780 and may be implemented using different sets of application programming interfaces (APIs). In the user space 750, the host 780 may implement virtual machines (VMs) 702 with virtual network interface cards VNICs, such as the vsl-int 705. The user space 750 may also include user applications, which do not execute inside any VMs and communicate with the TCP/IP stack (not shown) in the kernel space 740 to send and receive packets.

FIG. 7B is a functional diagram illustrating the VSL stack placement in open systems interconnection (OSI) model, showing service identity protocol being placed after L3 layer. With reference to FIG. 7B, the L2 layer 763 represents physical interfaces "phy-intf" 721-723. The IP layer 762 represents "vsl-intf" 709 assigned with IP address from underlay network. The SIDP represents 771-773. The service identity protocol (SIDP) 761 starts at L4 layer 773 in relation to L3 layer 762. The SIDP implements semantics of identity of applications and applying the network functions 772 to application endpoints 702-704. The service identity 771 represents IP packet to/from "vsl-srv-intf" 705 of application endpoints 702-704.

The VSL control plane 701 may implement the SIDP to identify an application. The SIDP is a protocol that understands the identity of the endpoints by its IP/subnets and applies necessary network functions based on endpoint identity.

Figure 8:
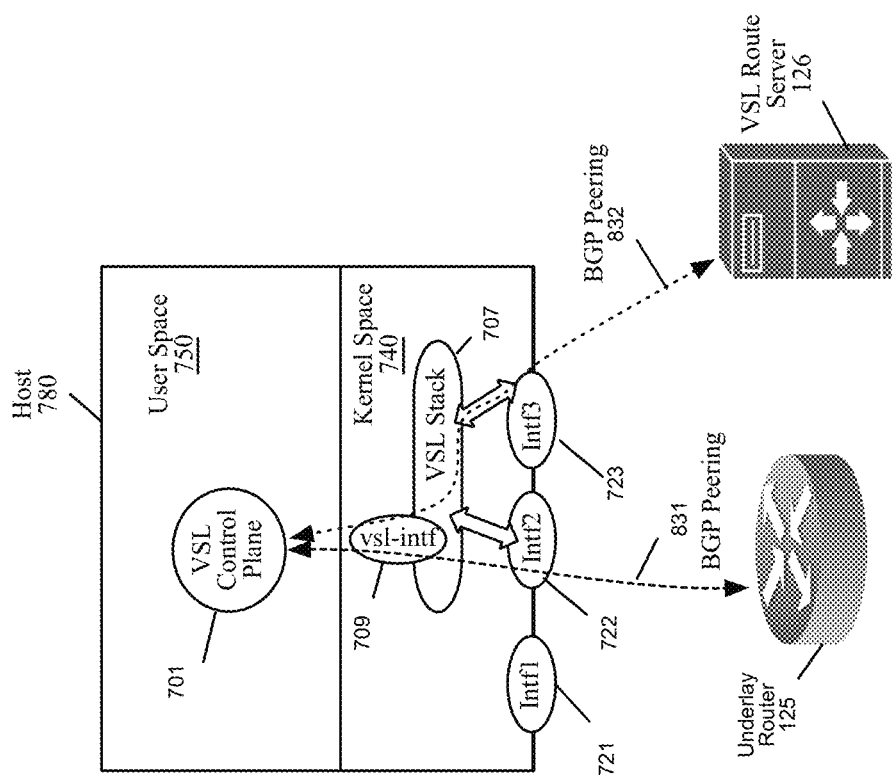
FIG. 8 is a functional diagram illustrating the VSL stack that is deployed at a host and peers with the underlay routers and route servers, according to various aspects of the present disclosure.

FIG. 8 is a functional diagram illustrating the VSL stack that is deployed at a host and peers with the underlay routers and route servers, according to various aspects of the present disclosure. With reference to FIG. 8, the VSL protocol daemon 701 may bind to the vsl-intf 709 to peer with the underlay router 125 and the VSL route server 126 through the physical interfaces intf2 722 and intf3 723.

With reference to FIG. 8, the VSL stack 707 may peer with one or more underlay routers 125 and the VSL route server 126. The VSL stack 707 and the VSL protocol daemon 701 may identify the underlay network. The underlay router(s) 125 and the VSL route server 126 may be deployed as the locator network. The VSL protocol daemon 701 may bind to the vsl-intf 709 on all IP addresses (alias interfaces) and may discover the next hop router 125 and the VSL route server 126 in the locator network by employing, for example, and without limitations, the Neighbor Discovery Protocol (NDP) for the IP Version 6 (IPv6) or the Internet Control Message Protocol (ICMP) for the IP Version 4 (IPv4).

Once the underlay router 125 and the route server 126 are discovered, the VSL protocol daemon 701 may establish the BGP peering with the underlay router 125 and the VSL route server 126 (as shown by 831 and 832, respectively) through the corresponding physical interfaces 722 and 723, respectively. The VSL route server 126 may only do control plane peering (as shown by 831 and 832) that does not handle forwarding of data traffic. The traffic forwarding may be done by the underlay router 125.

Figure 9:
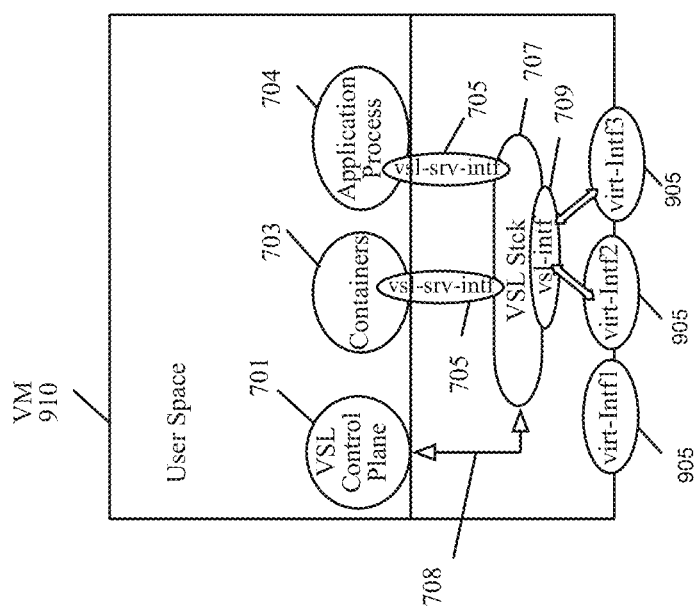
FIG. 9 is a functional diagram illustrating the VSL stack deployed at a VM, according to various aspects of the present disclosure.

FIG. 9 is a functional diagram illustrating the VSL stack deployed at a VM, according to various aspects of the present disclosure. With reference to FIG. 9, the VSL stack 707 may be deployed at the VM 910. The VSL stack 707 may be deployed similar to FIG. 7, described above, with the exception that the VSL stack 707 may only support the standard application process 704 and the containers 703 (but not VMs). The VSL virtual interface (vsl-intf) 709, in the embodiment of FIG. 9, may bond to one or more virtual interfaces 905, which may be connected to the locator network.

Figure 10:
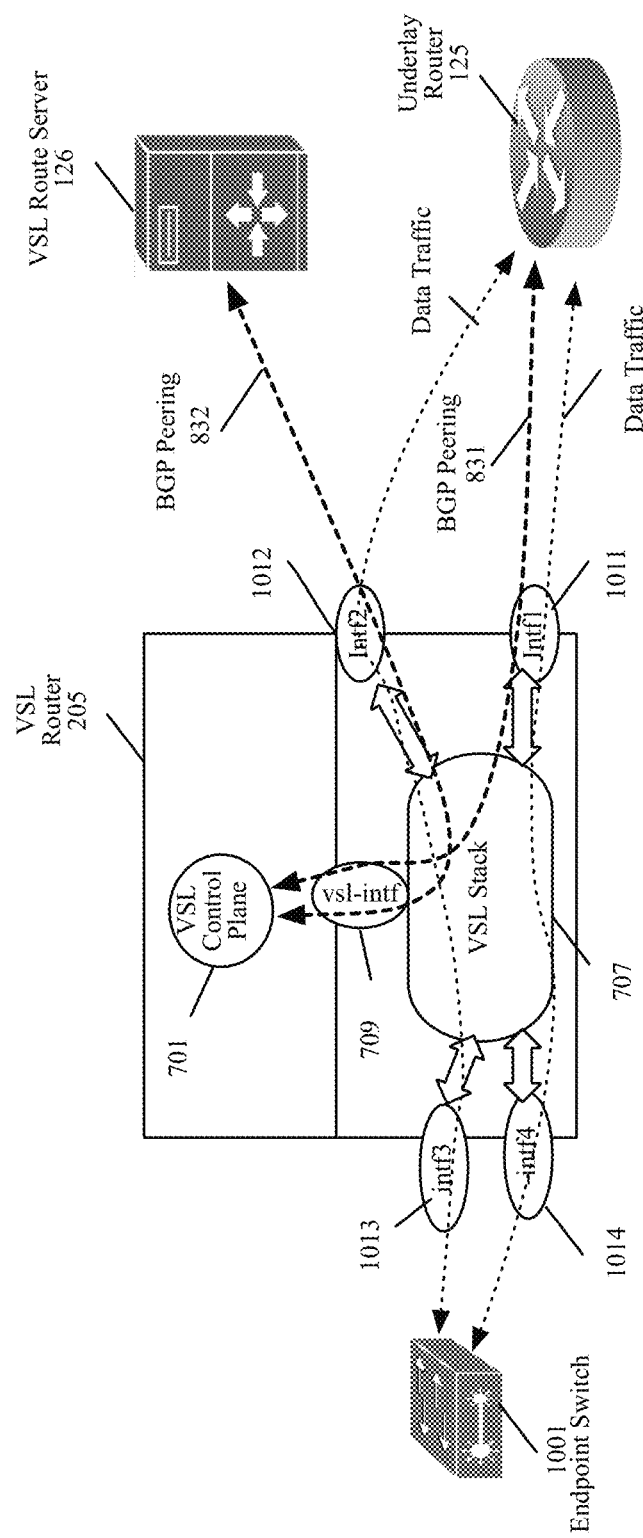
FIG. 10 is a functional diagram illustrating the VSL router deployed between an underlay router and an endpoint switch, according to various aspects of the present disclosure.

FIG. 10 is a functional diagram illustrating the VSL router deployed between an underlay router and an endpoint switch, according to various aspects of the present disclosure. With reference to FIG. 10, the VSL router 205 may be deployed between the underlay router 125 and the endpoint switch 1001. A network node with the VSL stack is referred, herein, as a VSL router. A VSL router, in some embodiments, may be located between an IP underlay router and the hosts.

The VSL control plane 701 may peer (as shown by 831) with the underlay router 125 and with the route server 126 (as shown by the arrow 832) through the VSL interface 709. The service interfaces int3 1013 and intf4 1014 may connect to the endpoint switch 1001 side where applications may be deployed. The route interfaces intf1 1011 and intf2 1012 may connect to the underlay router 125 side.

The VSL router 205 may include two types of ports, the locator interfaces intf1 1011 and intf2 1012 and the identity interfaces intf3 1013 and intf4 1014. The locator interfaces 1011-1012 face the locator network where traffic is from/to underlay router 125. The identity interfaces 1013-1014 face the L2 domain and the endpoint switch 1001, where traffic is from/to endpoints in identity network. The vsl-intf 709 may bond the locator interfaces 1011-1012. The identity interfaces 1013-1014 may be directly handled by the VSL stack 707. In the VSL router 205 too, the VSL control plane 701 may bind to the vsl-intf 709 which may acts as the beacon interface for traffic from the locator network and may act as IP gateway and L2 proxy for the identity network. The VSL control plane 701 may establish BGP peering (as shown by 831 and 832) with the underlay locator network router 125 and the VSL route sever 126, after discovering the router/route server either by Neighbor Discovery Protocol in IPv6 case or by ICMP Router Discovery Protocol in IPv4 case. The VSL protocol daemon 701 may establish peering on all alias IP addresses based on physical interfaces bonding to the vsl-intf 709.

FIGS. 11A-11G illustrate application models and their deployments within and across networks, according to prior art. FIGS. 12A-12F illustrate the application model deployment with middleboxes and the SDN mode, according to prior art. FIGS. 13A-13D and 14A-14B are functional diagrams illustrating the VSL deployed solutions, providing the contrasting difference of the VSL model with the prior art models of 11A-11G and 12A-12F.

The prior art architectures and technologies of FIGS. 11A-11G and 12A-12F implement application intelligence in the network in the form of policies, rules, and middlebox functions (e.g., firewalls, load balancers, VPN gateways, WAN optimization, SD-WAN, tunneling services) etc.

Applications are transforming from monolithic models 1101 (as shown in FIG. 11A) to microservices models 1102 (as shown in FIG. 11B). For example, in FIG. 11, a 3-tiered application deployment model may include the web and graphical user interfaces 1110, the application business logic 1115, and the database 1120 and the middle layer/API 1125 in the same local network, which may have been relatively simple to manage. With the advent of the microservices, the web services 1130, the database services 1135, the application business services 1140, and the middle layer/API services 1145 may be distributed across more and more different environments, such as private and public clouds. Accordingly, orchestrating the prior art configurations across these environments is becoming complex and error prone.

Application segmentation in prior art is implemented by centralized firewalls 1150 (as shown in FIG. 11C) for centralized applications. Application segmentation in prior art is implemented by distributed firewalls 1171-1173 and 1181-1184 for the distributed applications (as shown in FIGS. 11D and 11E). The present data breaches and hacks are predominantly occurring because of the misconfigurations across various environments and deriving firewall rules to block various paths across environments is becoming complex and infeasible at scale. As more endpoints are added, the magnitude of firewall rules increases and maintaining backward compatibility to the existing configuration/rules without breaking becomes more complex. For example, FIG. 11F shows the logical definition and FIG. 11G shows the physical definition of firewall rules for a system with only four applications. Obviously, when many more application are added, the firewall rules may grow more complex or may become more error prone.

Figure 12C:
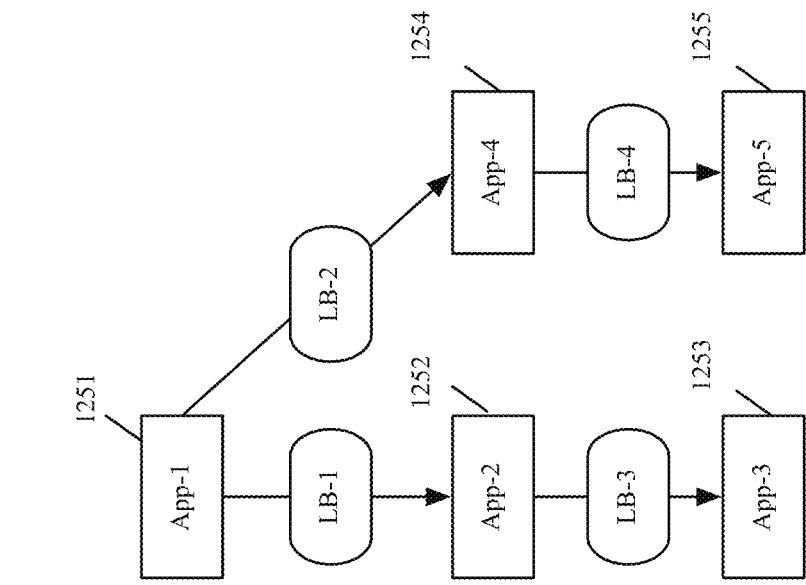
FIGS. 12A-12F illustrate the application model deployment with middleboxes and the SDN mode, according to prior art.
Figure 12B:
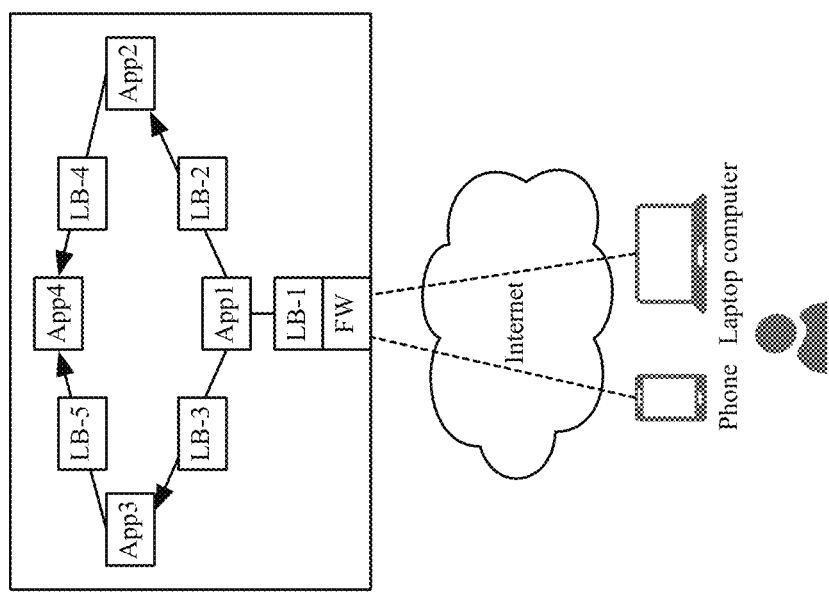
Figure 12A:
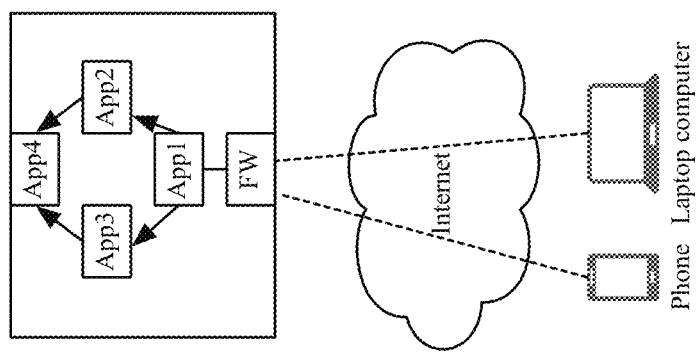
Figures 12D, 12E, 12F:
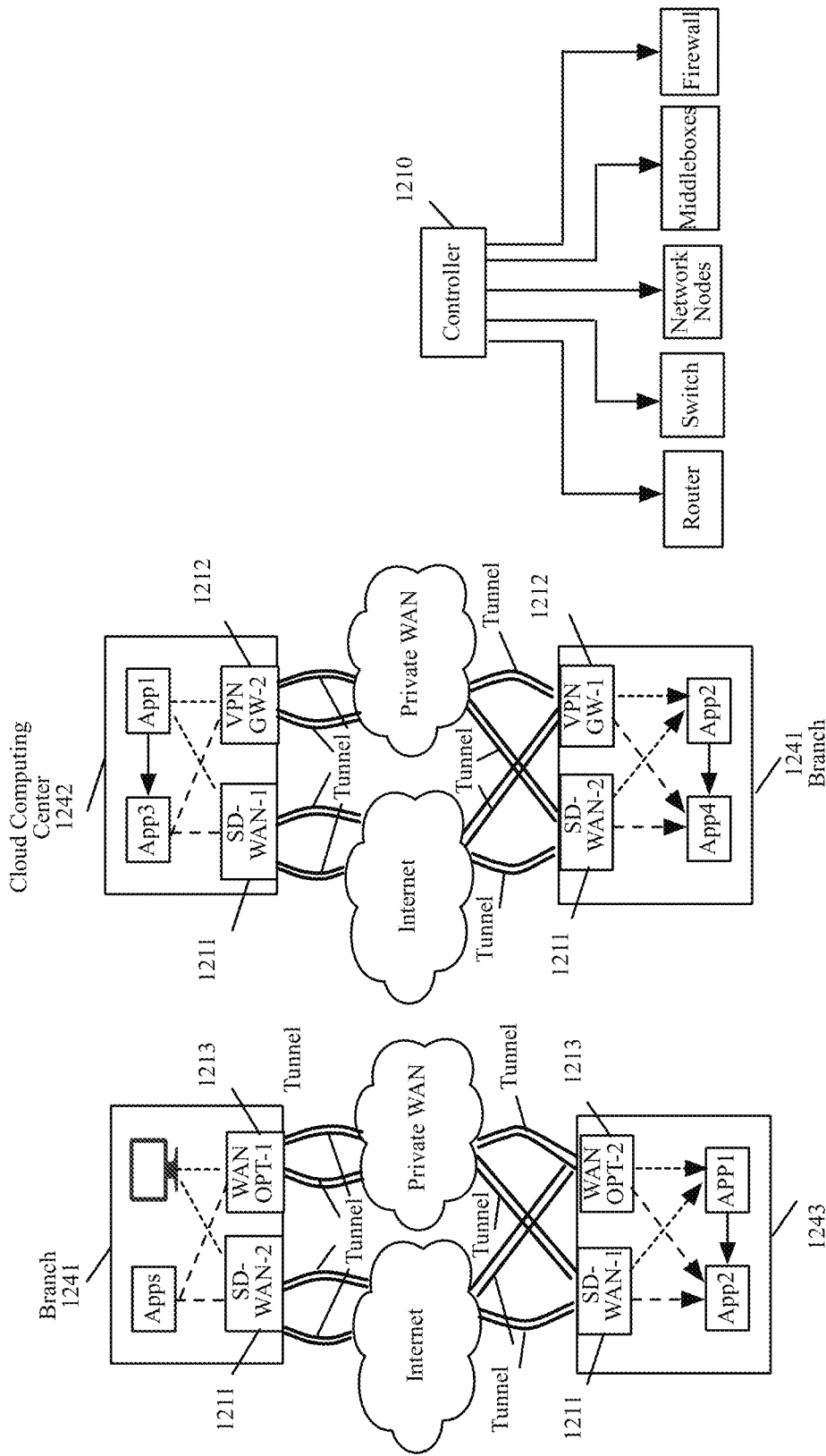

Based on the topological deployment of services, policies, firewall rules, and configurations are derived and programmed to the network nodes and the middleboxes as shown in FIG. 12F Derivation of the policies, rules, and configurations are either done manually or by automation. The method of automating the process of deriving application intelligence and programming is referred to as orchestration. The entity that does the orchestration is referred to as controller 1210, which is evolved from the SDN concept as shown in FIG. 12F. Although the SDN architecture has solved problems with respect to manageability and scalability for the centralized solutions, in the new era of distributed applications and distributed endpoints accessing services, the SDN architecture is opening up a new array of problems and complexities.

To connect various applications distributed across networks and clouds, middleboxes tunneling solutions, such as, SD-WANs 1211, VPN gateways 1212, WAN optimizations 1213, etc., are deployed (as shown in FIGS. 12D and 12E) to connect networks deployed at branches 1241, cloud computing centers 1242, data centers 1243, etc. To provide proper services to the applications on uplinks, policies and rules are derived and programmed on these middleboxes. Deriving and unifying policies and rules at various network functions is becoming complex as the workloads are distributed across the networks and the accessing endpoints are mobile, as shown in FIG. 12A. This distributed world is opening up new paths for data breaches as deriving firewall rules is becoming infeasible to secure enterprise digital assets. Moreover, tunneling solutions limit the scale of number of networks it can stitch and connect, and is infeasible for mobile endpoints.

Perimeter services, shown in FIGS. 12A, 12B, 12D, and 12E, are evolved for the centralized application models of FIGS. 11A and 12C, where applications 1151-1152 and 1251-1255 are deployed in one centralized network and endpoints access these services from branches, the Internet and other networks. When these applications are getting distributed and the accessing endpoints are mobile and distributed, the perimeter services may break, as building perimeters for every network is becoming infeasible. With the dawn of the edge computing, IoT, 5G, and public clouds, building perimeter for these networks and endpoints is becoming infeasible, and characterizing the perimeter for the distributed and mobile endpoints is becoming unachievable. Therefore, the perimeter services coupled with the SDN orchestration-based architectures impose challenges, to provide complete security and adapt to changing landscape.

FIG. 13A shows the contrasting differences of the present embodiments with FIGS. 12A and 12B of the prior art, where the VSL in FIG. 13A is deployed on the VSL endpoint hosts 1311-1314 moving load balancing functionality to the VSL endpoints 1311-1314. The VSL gateway 1315 is deployed facing the Internet users and devices bringing the VSL intelligence to the gateway 1315 with the consolidation of firewall. FIG. 13B shows the contrasting differences of the present embodiments with FIG. 12C of prior art, where the VSL in FIG. 13B is deployed on the VSL endpoint hosts 1321-1324, moving the load balancing (LB) functionality to the VSL endpoints.

Figure 14A:
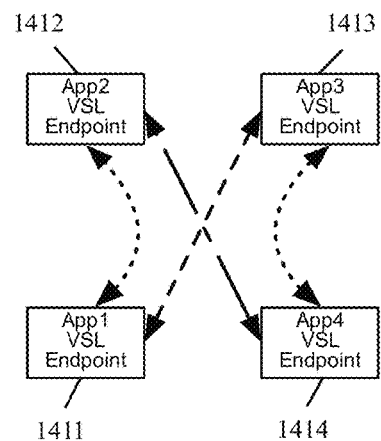
Figure 14B:
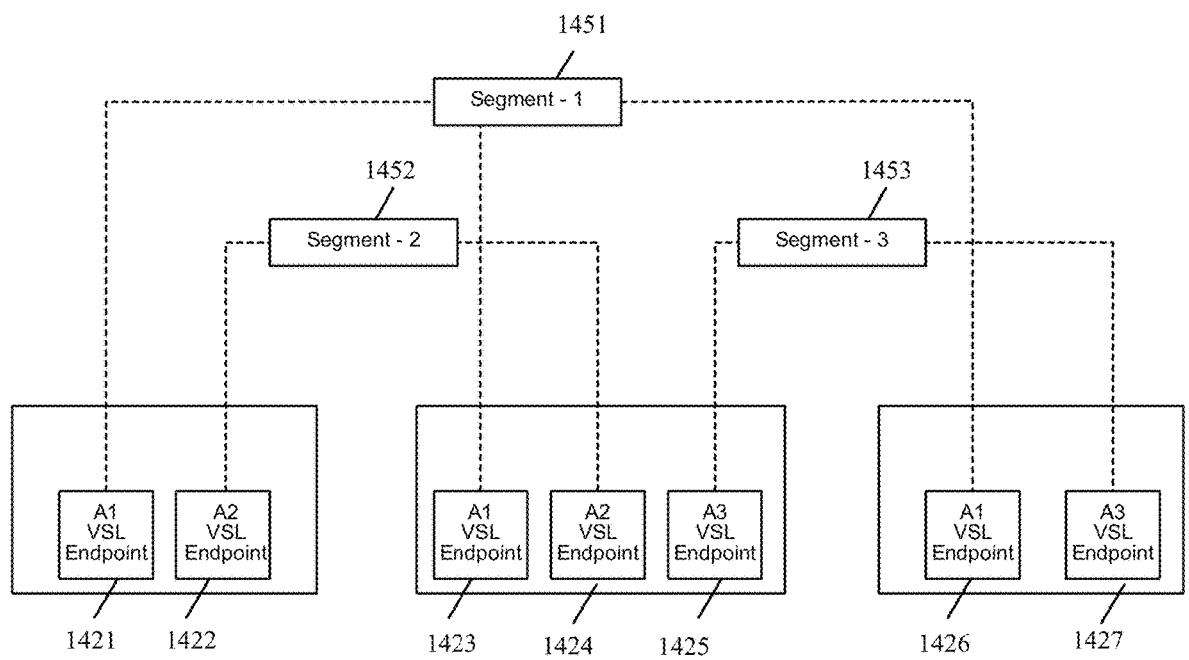

FIG. 13C and FIG. 13D show the contrasting differences of the present embodiments with FIG. 11F, FIG. 12D, and FIG. 12E of the prior art, where applications in FIG. 13C and FIG. 13D are distributed across datacenters 1341, branches 1342, edge networks 1343, and public clouds 1344 and are connected by the VSL endpoints/VSL routers with functionality of security, application optimizations, and sending traffic through uplinks over the Internet and private WAN without the need for the firewall, VPN gateways, WAN optimization, SD-WAN, middle boxes, and tunneling. The functionality of the firewall, VPN gateways, WAN optimization, SD-WAN, middle boxes, and tunneling are all provided by the VSL protocol used to send the packet traffic across the networks. FIG. 14A and FIG. 14B show the contrasting differences of the present embodiments with FIGS. 11D and 11E of prior art, where segmentation 1451-1453 of applications in FIG. 14A and FIG. 14B is achieved by the VSL endpoints 1411-1414 and 1421-1427 without the need for centralized firewalls and distributed firewalls.

Zero trust security was coined recently to redesign the security architecture for the growing landscape of distributed applications and endpoints. The idea behind zero trust is do not trust any endpoint, and authenticate and authorize every endpoint either internal or external to network. The zero-trust is built on the SDN orchestration architecture and extends the existing concepts to elaborate the set of matrixes of firewall rules by deriving identity of the endpoint in the form of certificate keys, endpoint attributes, and/or location etc. This method of extending the matrix of attributes and adding certificate infrastructure increases complexity and does not close all paths across networks and cannot block hackers from accessing network. Moreover, the existing architecture of overlays and tunnels has to be maintained to connect networks across to secure traffic over the Internet.

The VSL architecture of the present embodiments is a new concept of removing intelligence from the network and moving the intelligence to the edge. An edge may be an endpoint (e.g., a mobile device, a server, a storage, a VM, a VSL router, etc.), where service is hosted, or a remote service is accessed from. The VSL intelligence is built alongside the IP protocol.

I. The Virtual Service Layer (VSL)

A. Semantic Configuration and Logical VSL Services Model

Some embodiments may provide a VSL protocol configuration interface to allow a user to define semantic configuration of services that defines service semantics, service clusters, service path in a logical way. The VSL protocol implements application intelligence on three building blocks, application relation, endpoint identity, end-to-end principle. The application relation is defined as provider and consumer. A provider (or producer) application is an application that provides service, a consumer application is an application that receives and/or consumes a service. The terms provider or producer may be interchangeably used herein. The VSL protocol recognizes an application by its identity. The identity may be a specific IP address, or part of a subnet prefix. The end-to-end principle is applying the network functions between the endpoints at the edge without any intermediate nodes, such as, the middleboxes.

FIGS. 15A-15C illustrate the semantic configuration of application declaration of type client and server, grouping applications into cluster, and transport paths to be used to reach those clusters, according to various aspects of the present disclosure. With reference to FIG. 15A, the service semantic configuration table 1510 is a configuration table for defining services and applications that are part of a service. The service identification (ID) column 1511 identifies the service, the application (app) ID column 1512 identifies the application that is part of a service by port number. The transport ID column 1513 defines the transport, which is the logical representation of connectivity between the application endpoints.

The applications that are on the same transport may communicate with each other. The role column 1514 defines the applications' relation. At one end of the transport, the application with the role of provider (shown as P in column 1514) and at the other end of the transport, the application with the of role consumer (shown as C in column 1514) is defined, forming an application relation. The service type column 1515 defines the subtypes for the application roles. The role P may have subtypes of server, generic, and repo. The role C may have subtypes of client and broadcast. The role defines the provider and consumer relationship, the subtypes define semantics of that communication.

The phrase column 1516 defines unique passphrase for a service or a group of services to generate security keys for secure communication between application endpoint. The passphrase may be used by trusted software module (TSM) to generate RSA keys for control plane authentication. As shown in the identity IP/subnet column 1517, each application may be given an identity in the form of an IP address and/or a subnet prefix for backward compatibility with the existing network constructs.

The name column 1518 provides the application name, and the cluster ID column 1519 provides the cluster ID. The cluster ID column 1519 is defined only for the C role applications indicating which cluster the application should reach in order to consume the P role application. The infrastructure virtual routing and forwarding (VRF) column 1520 lets user define the VRF of an infrastructure. VRF is a technology that allows multiple instance of a routing table to co-exist within the same router at the same time. VRF allows network paths to be segmented without requiring multiple routers. The VRFs do not share routes, therefore, the packets are only forwarded between interfaces on the same VRF. The VSL protocol should take into account under which VRF it may reach the VSL endpoint. The cap column 1521 is only defined for P role applications to define capacity of the provider application (e.g., may requests the provider application may be able to handle).

With reference to FIG. 15B, the service cluster configuration table 1540 is a configuration table for defining cluster of application instances for only role type P. The service ID column 1541 identifies service ID and the app ID column 1542 identifies application that is part of a service. The cluster ID column 1543 defines the cluster ID, which identifies unique definition of cluster properties for an application in a service. The priority column 1544 defines priority of a cluster. The ESI column 1545 defines Ethernet segment identifier path to choose in order to reach the cluster. The ESI gives transport identity used to reach to that cluster.

With reference to FIG. 15C, the service path configuration table 1550 is a configuration table for defining path/uplink configuration in a specific network where applications are deployed. The service path configuration table 1550 lets application of role C to choose a path when communicating to a cluster/application of role P. The ESI column 1551 uniquely identifies path config. The network ID column 1552 gives network identity where applications are deployed. The priority column 1553 gives priority to a path, so that highest priority path is chosen. The public IP/Network GW column 1554 gives info on external IP, where in order to reach a given prefix or IP, this defined path has to be chosen. The next Hop column 1555 defines local uplink gateway IP address to send packets to reach public IP/network GW IP/prefix. The edge router column 1556 provide the IP address of the edge router in network defined by Network ID to which the VSL route server can peer and inject static routes for path selection based on metrics. The differentiated services code point (DSCP) column 1557 defines differentiated services value mapping that may be added to the IP header when choosing the given path.

The Funcs column 1558 defines a set of functions to be applied for the service application. The set of functions are only defined for P role applications, in order for a C role application to apply those functions when communicating with a P role application. These functions are end to end, that is, there may be no intermediate nodes applying those functions. These functions are encryption, TCP-opt, compression, forward error correction, and deduplication. The functions (Funcs) column 1558 shows each function with corresponding numerical value.

Figure 15D:
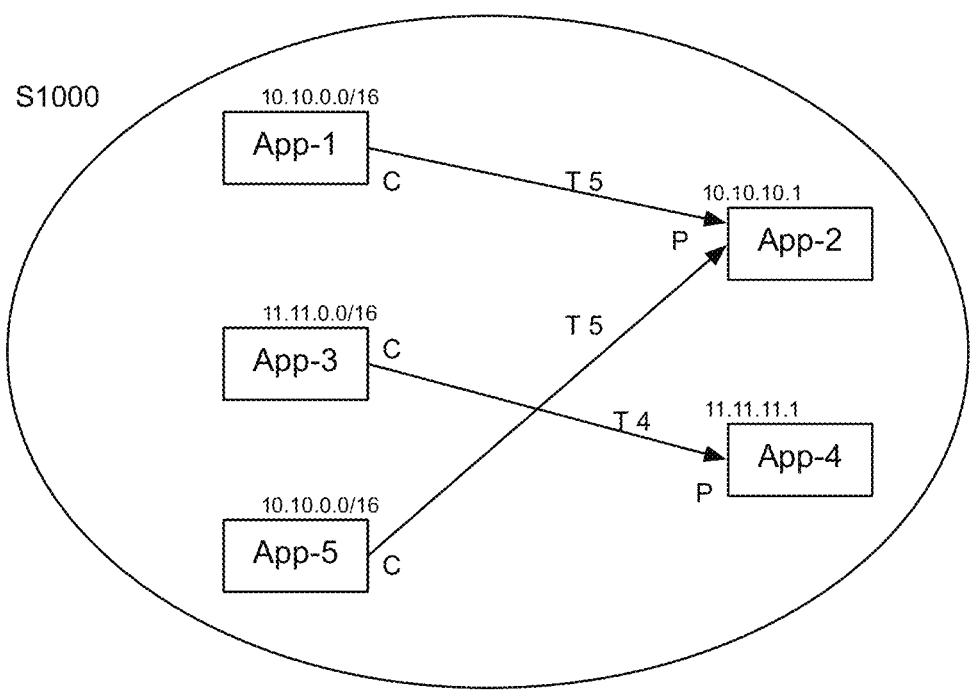
FIG. 15D is a functional diagram illustrating logical application deployment based on semantic configuration of application declaration of type client and server, according to various aspects of the present disclosure.

FIG. 15D is a functional diagram illustrating logical application deployment based on semantic configuration of application declaration of type client and server, according to various aspects of the present disclosure. With reference to FIG. 15D and the configuration tables of FIGS. 15A-15C, App-1, App-5, and App-2 are on the same transport, T5, where App-1 and App-5 roles are consumers and App-2 role is provider. The subtype relation between App-2 provider and App-1, App-5 consumer is server and client, where communication from client to server is enabled. Similarly, App-3 and App-4 are on transport T4, where App-3 role is consumer and the subtype is client, and App-4 role is provider and the subtype is server. As shown in the logical diagram of FIG. 15D, App-3 may only communicate with App-4, and App-1, App-5 may only communicate with App-2. All the applications are part of the service S1000.

Figure 15E:
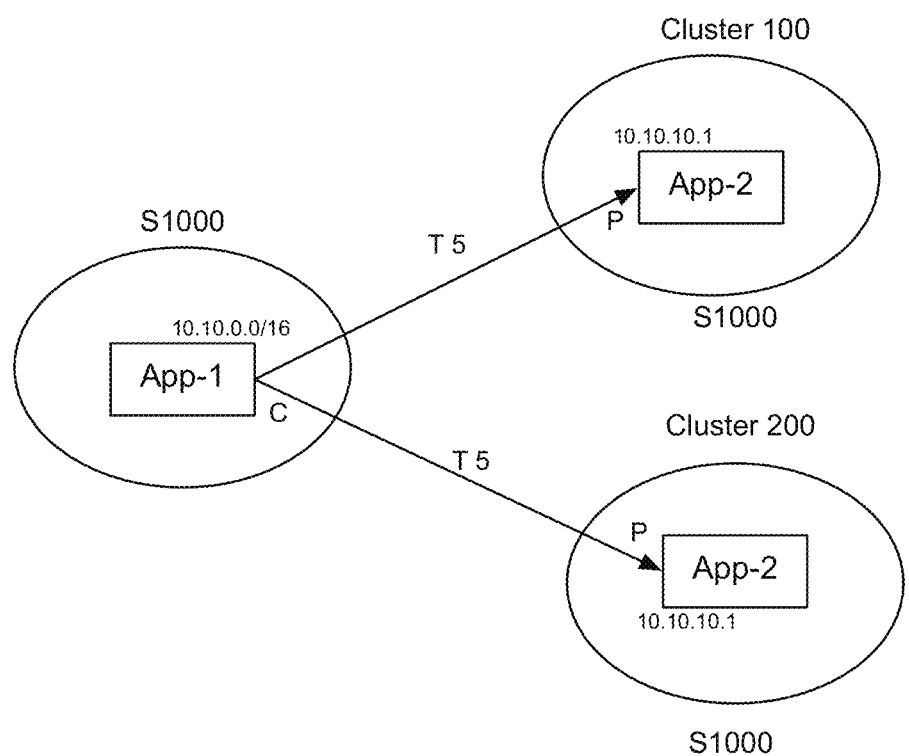
FIG. 15E is a functional diagram illustrating logical deployment of a cluster of applications based on semantic configuration that groups server applications into clusters, according to various aspects of the present disclosure.

FIG. 15E is a functional diagram illustrating logical deployment of a cluster of applications based on semantic configuration that groups server applications into clusters, according to various aspects of the present disclosure. With reference to FIG. 15E, App-2 is defined as two clusters 100, 200. App-1 is connected to two clusters on transport T5 with App-2 semantic role as provider with subtype server and App-1 semantic role as consumer with subtype client. Based on the roles, the communication is always initiated from the consumer application to the provider application, that is from App-1 to App-2. For application role provider, if the identity IP address is x.x.x.x/32 prefix, then the IP acts as anycast for the same instance of application and when the IP address is x.x.x.x/N (where N<32), the prefix acts as identity subnet giving unique IP addresses to instance of the application from that subnet. For application role consumer, the identity IP address is from prefix subnet.

Figure 16D:
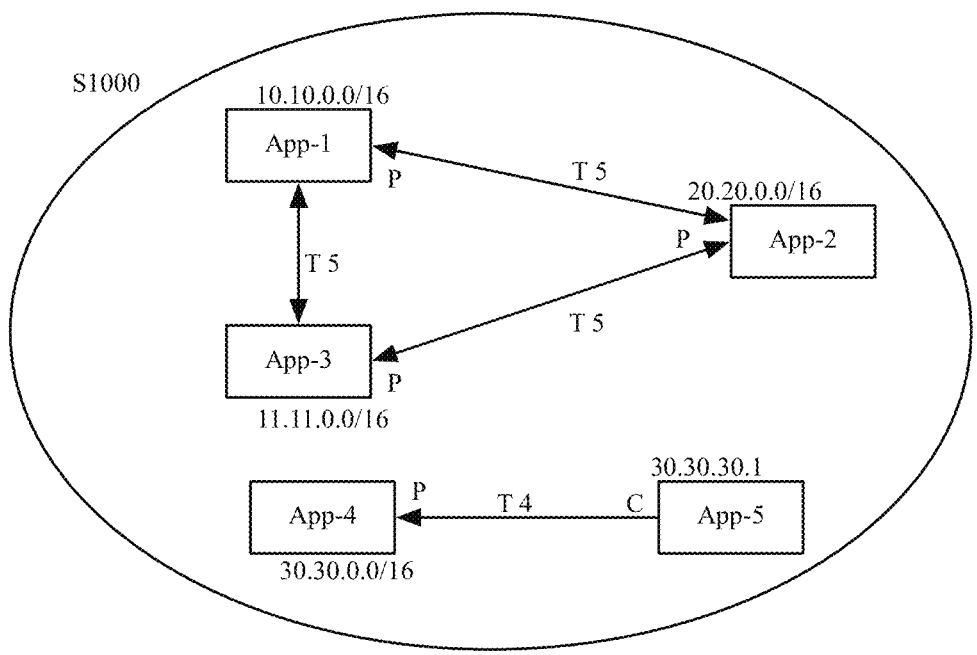
FIG. 16D is a functional diagram illustrating logical application deployment based on semantic configuration of application declaration of type generic, according to various aspects of the present disclosure.
Figure 16E:
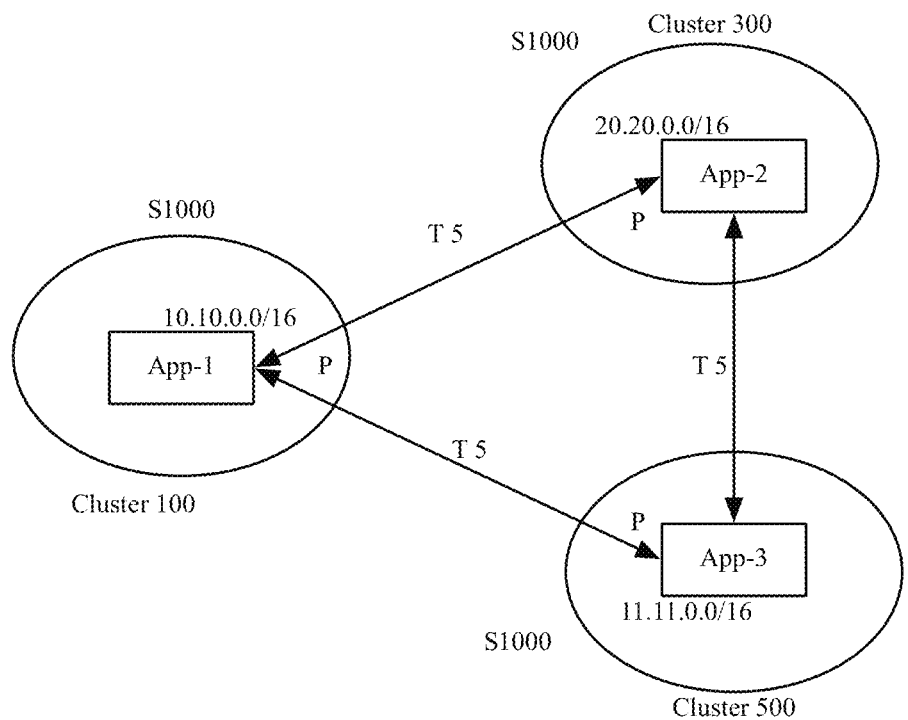
FIG. 16E is a functional diagram illustrating logical deployment of cluster of applications based on semantic configuration grouping generic type applications into clusters, according to various aspects of the present disclosure.

FIGS. 16A-16C illustrate the semantic configuration of application declaration of type generic, grouping applications into cluster, and transport paths to be used to reach those clusters, according to various aspects of the present disclosure. The configuration tables 1610, 1640, 1650 columns provide similar information as the corresponding columns of tables 1510, 1540, 1550, described above. FIG. 16D is a functional diagram illustrating logical application deployment based on semantic configuration of application declaration of type generic, according to various aspects of the present disclosure. With reference to FIG. 16D and the configuration tables 1610, 1620, and 1630 of FIGS. 16A-16C, App1, App-2, App-3 are on the same transport, T5, and semantic roles are the same, provider with subtype generic. For provider roles with subtypes generic, the semantic relation is anyone on the same transport within the service can communicate each other. In other words, an endpoint may be both provider and consumer. As shown by the logical diagram of FIG. 16D, App-1, App-2, App-3 communicate with each other on transport T5. In contrast, App-4 and App-5 semantic relation is provider with subtype server and consumer with subtype client, App-5 communicates to App-4 on transport T4. For application role provider with subtype generic, the identity IP address is from prefix subnet. FIG. 16E is a functional diagram illustrating logical deployment of cluster of applications based on semantic configuration grouping generic type applications into clusters, according to various aspects of the present disclosure. With reference to FIG. 16E, App-1, App-2, and App-3 are defined as clusters 100, 300, 500 and are connected by the transport, T5, where any application may communicate to any other application from/to a cluster.

Figure 17D:
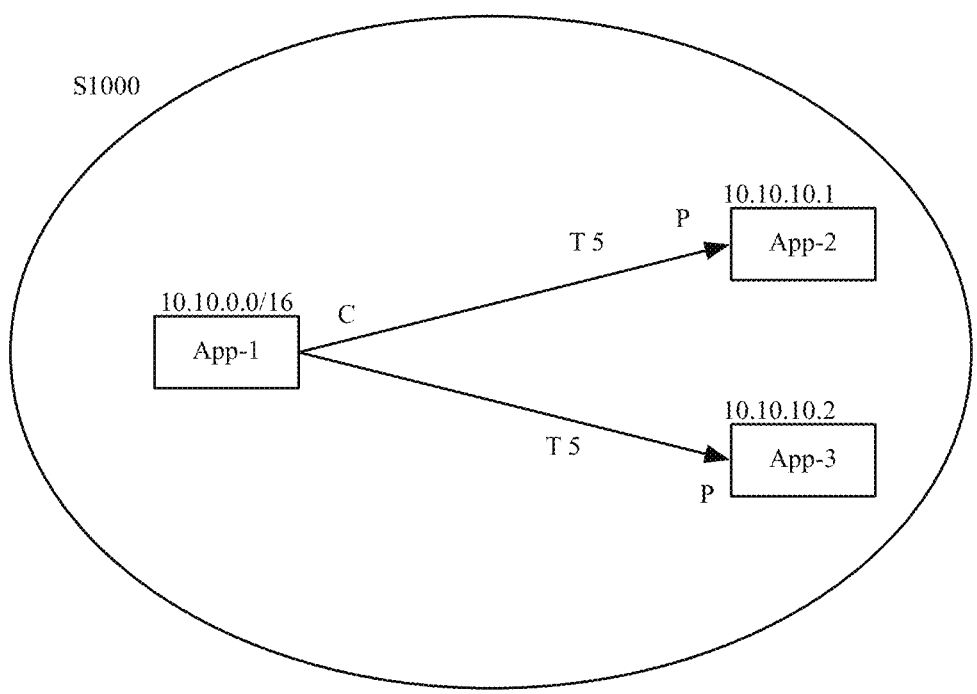
FIG. 17D is a functional diagram illustrating logical application deployment based on semantic configuration of application declaration of type broadcast and repo, according to various aspects of the present disclosure.
Figure 17E:
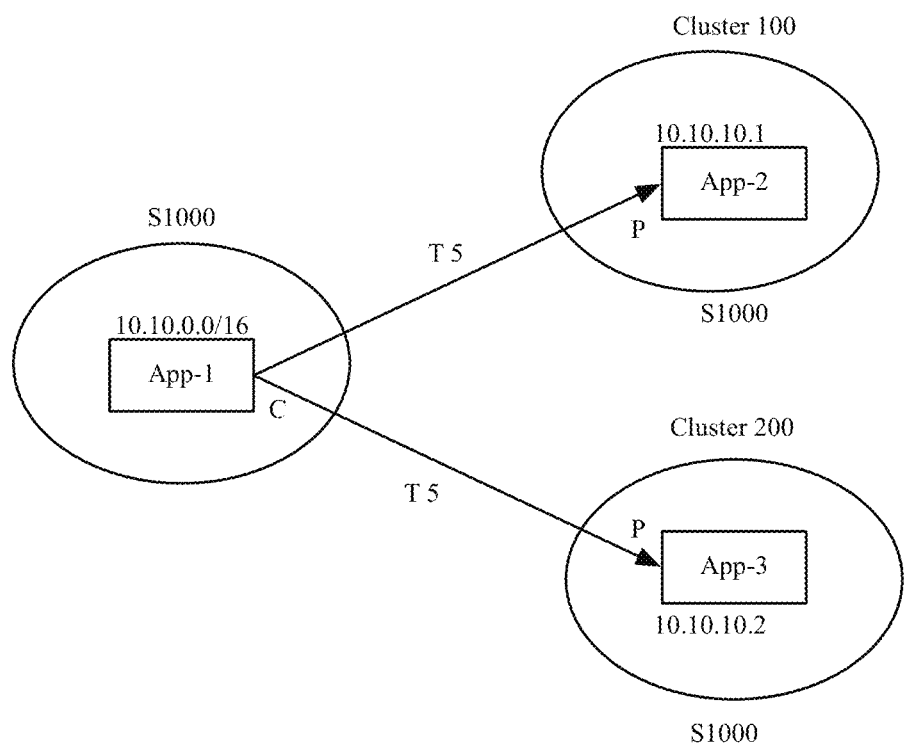
FIG. 17E is a functional diagram illustrating logical deployment of cluster if applications based on semantic configuration grouping broadcast and repo type applications into clusters, according to various aspects of the present disclosure.

FIGS. 17A-17C illustrate the semantic configuration of application declaration of type broadcast and repo, grouping applications into cluster, and transport paths to be used to reach clusters, according to various aspects of the present disclosure. The configuration tables 1710, 1740, 1750 columns provide similar information as the corresponding columns of tables 1510, 1540, 1550, described above. FIG. 17D is a functional diagram illustrating logical application deployment based on semantic configuration of application declaration of type broadcast and repo, according to various aspects of the present disclosure. With reference to FIG. 17D and the three configuration tables 1710, 1720, and 1730, App-2 and App-3 roles are provider with subtype repo and App-1 role is consumer with subtype broadcast. The semantic relation of communication defines App-1 may communicate simultaneously with App-2 and App-3. In other words it defines multicast semantics between consumers and providers. FIG. 17E is a functional diagram illustrating logical deployment of cluster if applications based on semantic configuration grouping broadcast and repo type applications into clusters, according to various aspects of the present disclosure. With reference to FIG. 17E, App-2 and App-3 are defined in a cluster 100, 200, and App-1 is communicating to cluster 100, 200 by transport T5 with same multicast communication semantics.

Figure 18D:
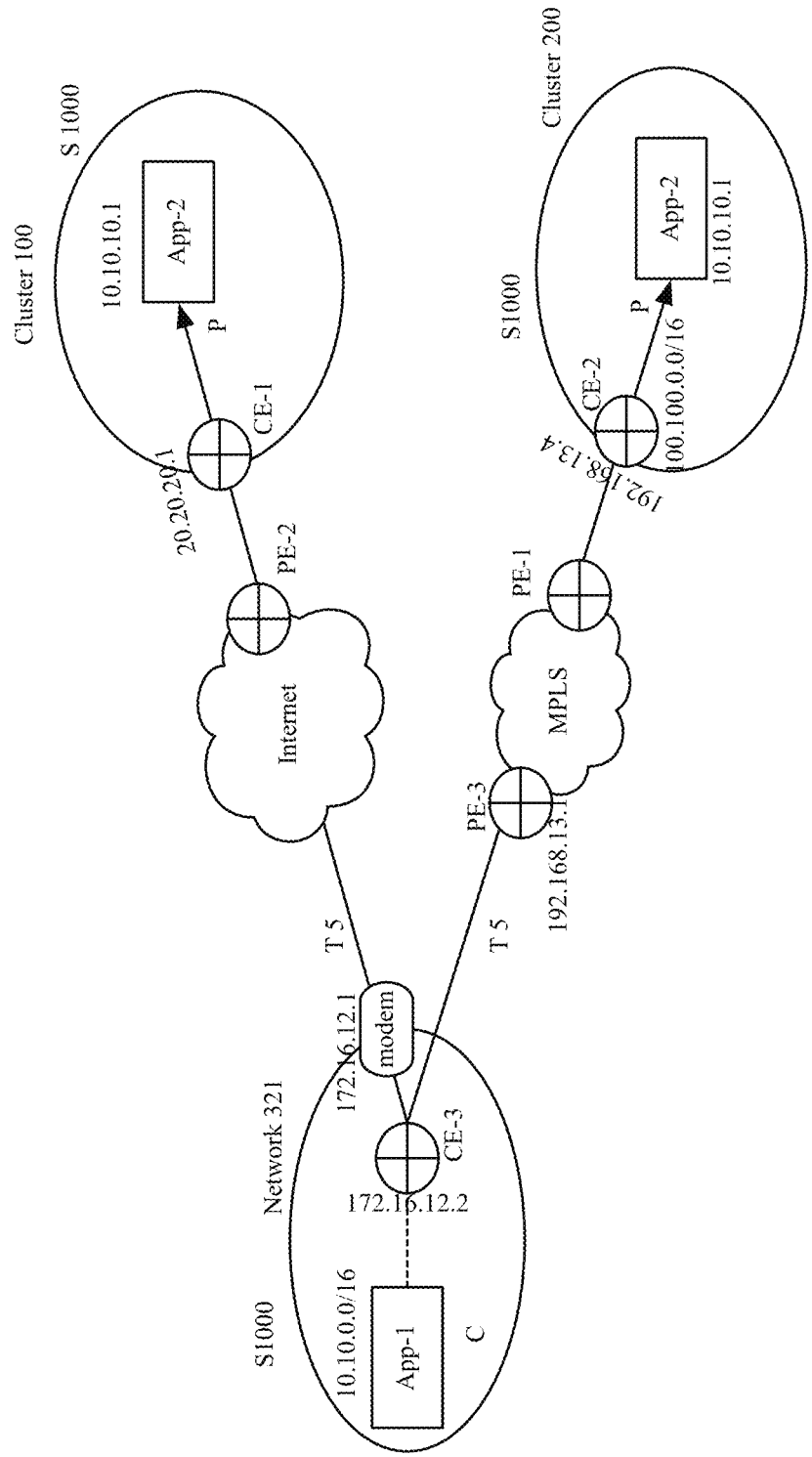
FIG. 18D is a functional diagram illustrating logical deployment of applications across networks connected by the Internet and Private WAN, according to various aspects of the present disclosure.

FIGS. 18A-18C illustrate the semantic configuration of application declaration deployed across networks, according to various aspects of the present disclosure. FIG. 18D is a functional diagram illustrating logical deployment of applications across networks connected by the Internet and Private WAN, according to various aspects of the present disclosure.

With reference to FIG. 18D and the configuration tables 1810, 1840, and 1850 of FIG. 18A-18C, the path configuration for path selection is defined. App-1 semantic role is consumer with subtype client and App-2 semantic role is provider with subtype server. App-2 is defined in two clusters 100, 200. App-1 is connected to clusters by logical transport T5. App-1 deployed in Network 321 connects to cluster 100 network by Internet uplink 172.16.12.1 and cluster 200 network by MPLS private uplink 192.168.13.1. Cluster 200 network is deployed with subnet 100.100.0.0/16 with reachable gateway 192.168.13.4. Cluster 100 network, public IP address is 20.20.20.1, which should be used to reach to any internal endpoint. From service path configuration table 1850 of FIG. 18C, the ESI 1 gives information on the Internet uplink from Network 321 connecting to cluster 100 using local uplink address 172.16.12.1 to reach 20.20.20.1 with priority 1 and DSCP mapping to 40. The ESI 2 gives info on MPLS uplink from network 321 connecting to cluster 200 using local uplink address 192.168.13.1 to reach 100.100.0.0/16 subnet with priority 2 and DSCP mapping to 64. In other words, VSL Route Server programs static routes to edge router 172.16.12.2 to select uplink based on destination prefix derived from given configuration. If path config ESI for a Network 321 is defined with priority −1, then VSL Route Server peers with edge router 172.16.12.2 and learns all IP prefixes reachable by respective uplinks. If path config ESI priority is 0 then, there is no path definition given only DSCP value is consider for that service. In the example of FIGS. 15A-15C, 16A-16C, 17A-17C, and 18A-18C configuration values for only one service and one network are shown for simplicity. Several examples are described herein with reference to the configuration tables of FIGS. 15A-15C, 16A-16C, 17A-17C, and 18A-18C. It should be noted that when there are other services and/or other networks, the configuration tables may include the corresponding values for the additional services and/or networks.

B. The VSL Deployment Architecture and Internals

Figure 19C:
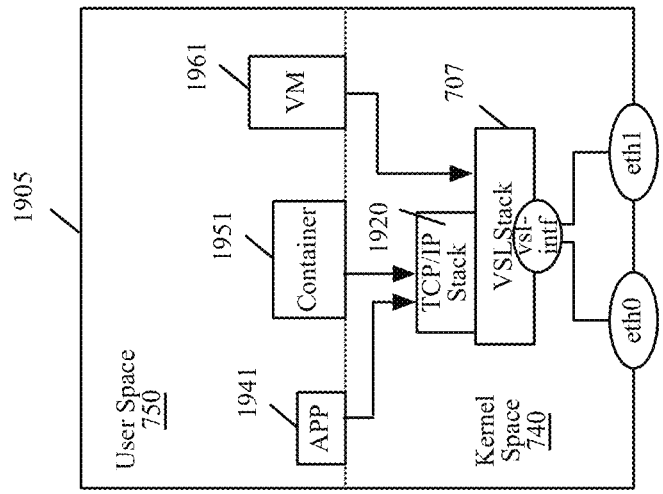
FIG. 19C is a functional diagram illustrating the VSL stack placement at the edge server showing how VSL implements network virtualization for VMs and containers, according to various aspects of the present disclosure.
Figure 19B:
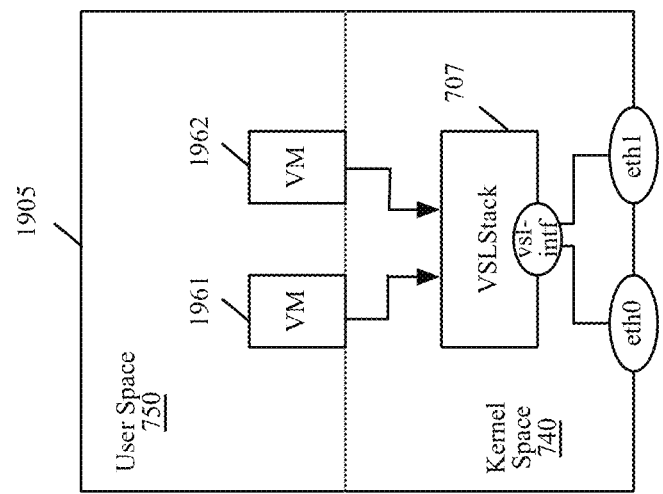
FIG. 19B is a functional diagram illustrating the VSL stack placement at a network node (for example edge server) and the network virtualization implementation by the VSL stack for VMs, according to various aspects of the present disclosure.
Figure 19A:
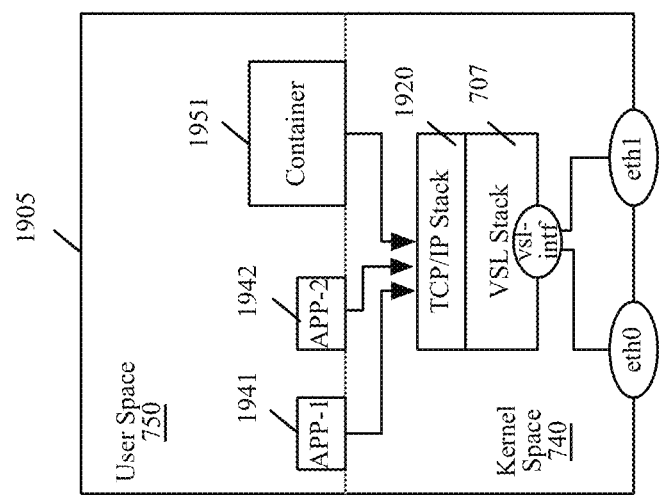
FIG. 19A is a functional diagram illustrating the placement of the VSL stack at a network node, and the deployment of applications and containers with the VSL, according to various aspects of the present disclosure.

FIGS. 19A-19E illustrate logical placement and deployment of the VSL stack at the edge servers, edge devices, VMs, and as a network node, according to various aspects of the present disclosure. FIG. 19A is a functional diagram illustrating the placement of the VSL at a host, and the deployment of applications and containers with the VSL, according to various aspects of the present disclosure. With reference to FIG. 19A, the VSL stack 707 may be deployed at a network node 1905. The network node 1905, may be, for example, and without limitations, an edge server. As shown, the VSL stack 707 may be located in the kernel space 740 and may connect to the applications 1941-1942 and the containers 1951 in the user space 750 through the TCP/IP stack 1920. When the VSL stack 707 is deployed at the host 1905, the applications 1941-1942 retain all TCP/IP stack benefits, such as the network namespaces and isolation, and the VSL stack does not disrupt existing methods of application deployment. The containers 1951 may retain the same benefits of the TCP/IP stack 1920, such as, the network namespaces and isolation.

FIG. 19B is a functional diagram illustrating the VSL stack placement at a network node (for example edge server) and the network virtualization implementation by the VSL stack for VMs, according to various aspects of the present disclosure. With reference to FIG. 19B, the VSL stack 707 may be deployed on the network node 1905 as the network virtualization stack in the kernel space 740. In this deployment, the VMs 1961-1962 attached to the VSL stack 707 by virtual ethernet interfaces get the same functionality and benefits of network virtualization.

FIG. 19C is a functional diagram illustrating the VSL stack placement at edge server showing how VSL implements network virtualization for VMs and containers, according to various aspects of the present disclosure. with reference to FIG. 19C, the VSL stack 707 may be deployed on the network node 1905. The VSL stack 707 may be located in the kernel space 740 as the network virtualization stack. In this model, the VSL stack 707 may be used for deployment of applications 1941, containers 1951, and/or VMs 1961. The VM 1961 may attach to the VSL stack 707 by virtual ethernet interface, the applications 1941 and the containers 1951 may attach to the TCP/IP stack 1920. In other words, the VSL stack 707 may be used for standard application deployment in tandem with the VMs, providing network virtualization and application networking, referred to, herein as the VSL stack hybrid model.

Figure 19E:
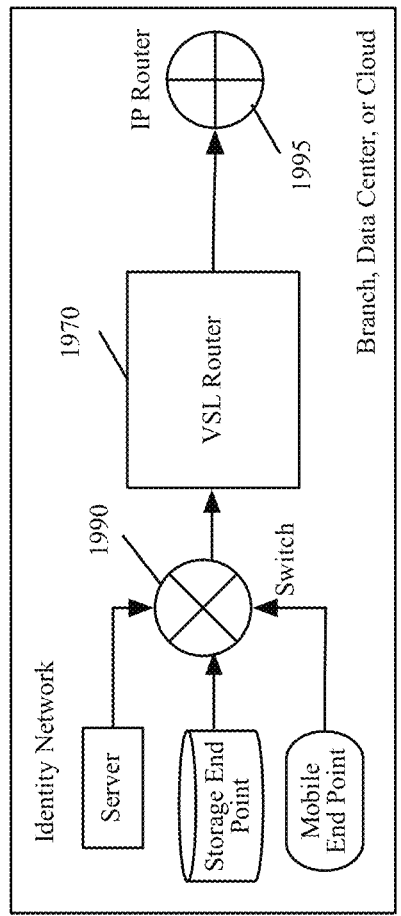
FIG. 19E is a functional diagram illustrating the deployment of the VSL router in a network for applications, where the VSL router is between applications and the IP router, according to various aspects of the present disclosure.
Figure 19D:
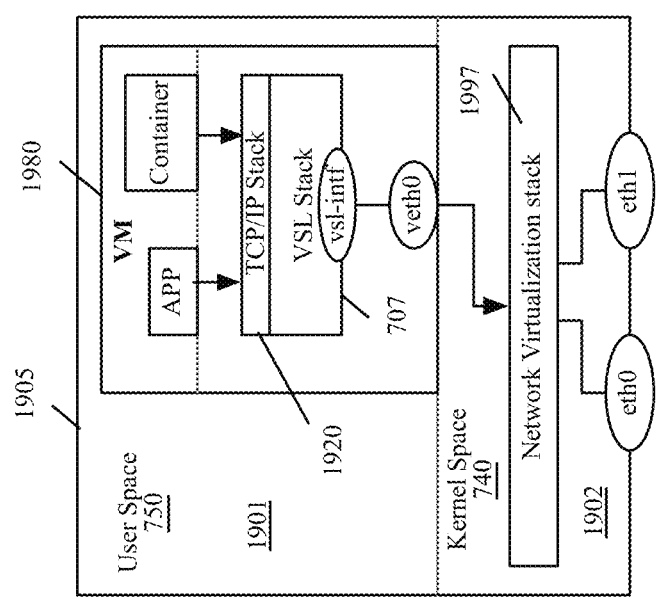
FIG. 19D is a functional diagram illustrating the VSL stack placement in a VM which is deployed on network virtualization stack at server, according to various aspects of the present disclosure.

FIG. 19D is a functional diagram illustrating the VSL stack placement in a VM which is deployed on network virtualization stack at server, according to various aspects of the present disclosure. With reference to FIG. 19D, the VSL stack 707 is deployed in the VM 1980, where the VM 1980 is deployed on the network virtualization stack 1997. This model of deployment enables the VSL stack 707 to function in brown fields (the existing deployment models) without any disruption where network overlays are built.

FIG. 19E is a functional diagram illustrating the deployment of the VSL router in a network for applications, where the VSL router is between applications and the IP router, according to various aspects of the present disclosure. With reference to 19E, the VSL router 1970 is deployed in front of the L2 switch 1990 and behind the L3 Router (the IP router) 1995. The L2 switch's 1990 domain is where application and device endpoints are deployed without the VSL stack. The VSL router 1970 identifies the network where the underlay L3 router 1995 is located as the locator network. The VSL router 1970 identifies the L2 domain behind the VSL router 1970 as the identity network.

Figure 20A:
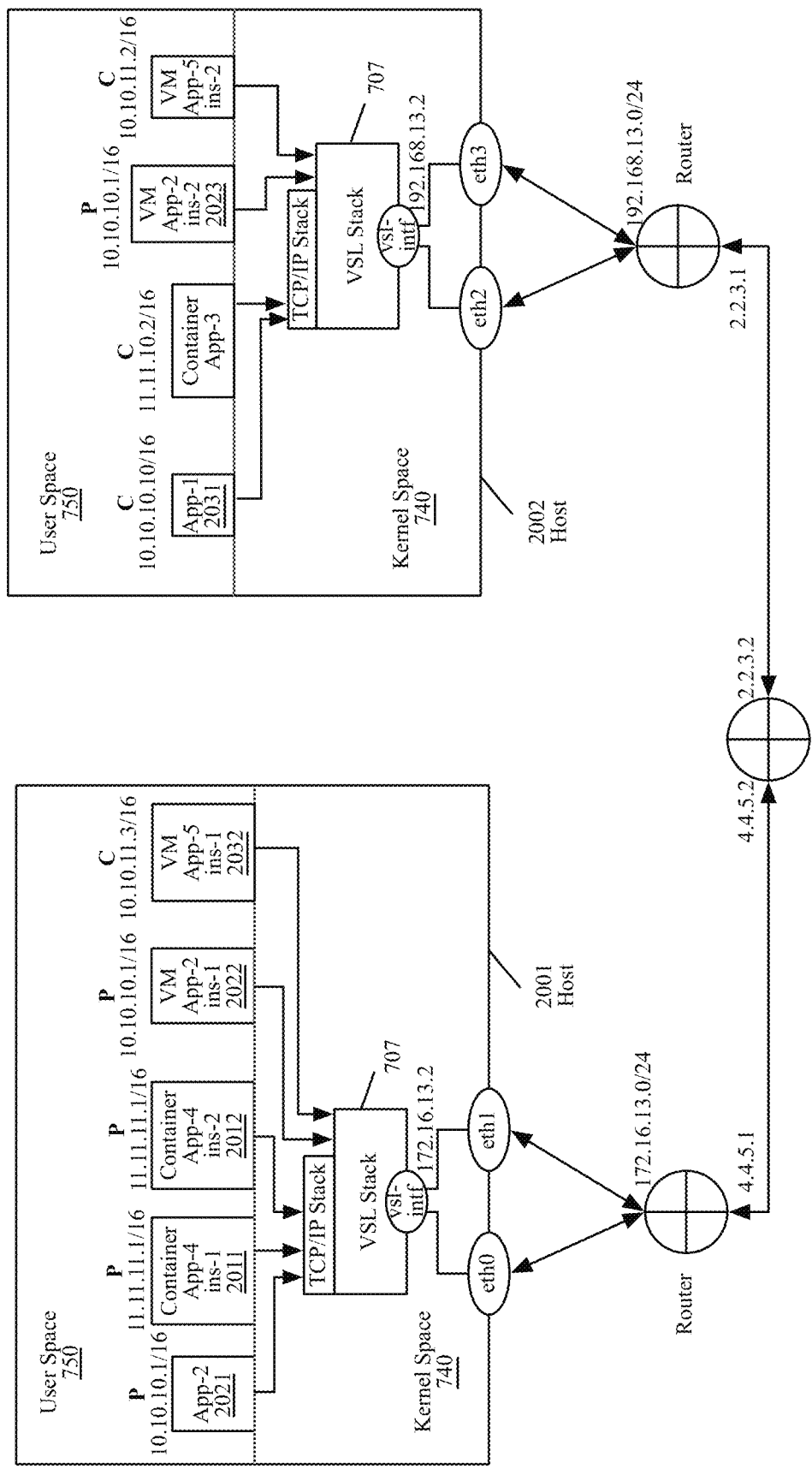
FIG. 20A is a functional diagram illustrating an example of the services deployed based on the defined semantic configuration on the VSL stack across two hosts connected by local routers, according to various aspects of the present disclosure.

FIG. 20A is a functional diagram illustrating an example of the services deployed based on the defined semantic configuration on the VSL stack across two hosts connected by local routers, according to various aspects of the present disclosure. FIG. 20B illustrates the semantic configuration of services deployed on the VSL stack, according to various aspects of the present disclosure. In the example of FIGS. 20A-20B, the VSL stack provides network virtualization to containers and VMs, and provides connectivity between applications based on semantic definition. The figures show the semantic configuration of service declaration and the logical representation of application deployment on the VSL stack as per semantic configuration at the hosts 2001-2002 within the network behind router.

With reference to FIG. 20A, the VSL stack 707 may be deployed on the hosts using a hybrid model. One host 2001 may deployed in the 172.16.13.0/24 subnet and another host 2002 may be deployed in 192.168.13.0/24 subnet. These different underlay networks are connected by the L3 network. For the VSL stack 707, the underlay networks 172.16.13.0/24 and 192.168.13.0/24 are the locator network. The application endpoints connected by the VSL virtual Ethernet interfaces (L2 domain) to the VSL stack 707 are considered as the identity network.

The VSL stack 707 in the 172.16.13.0/24 subnet receives the 172.16.13.2 locator IP address and the VSL stack 707 in the 192.168.13.0/24 subnet receives the 192.168.13.2 locator IP address. With reference to FIGS. 20A and 20B, based on the service semantic configuration (1510, 1610, 1710, and 1810 shown in FIGS. 15A, 16A, 17A, and 18A, respectively) services are deployed as containers, standard applications processes, or VMs. The two App-4 provider instances 2011-2012 are deployed at the VSL stack 707 at the 172.16.13.2 subnet with the identity IP address 11.11.11.1 as anycast.

Two App-2 provider instances are deployed at VSL stack 172.16.13.2, where one instance 2021 is a standard application process and another instance 2022 is a VM. One App-2 provider VM instance 2023 is deployed at the VSL stack 707 at the 192.168.13.2 subnet with the identity IP address 10.10.10.1 as anycast.

App-1 2031 and App-5 2032 consumer instances deployed at the VSL stack 707 at the 192.168.13.2 and 172.16.13.3 subnets, respectively, and are on transport T5 to consume App-2 provider. App-1 2031 and App-5 2032 are assigned identity IP address from the same subnet 10.10.0.0/16 as the provider identity address subnet.

This method of assigning the identity IP address from the same subnet for both the provider and consumer simplifies resolving ARP for 10.10.10.1 provider identity address to L2 proxy address of VSL stack. If the consumer App-1 2031 is assigned the identity IP address from a subnet different then the provider identity IP address, then the VSL stack default gateway IP address has to be configured at consumer endpoint. By default, at all endpoints in the identity network, the VSL stack default gateway IP address has to be configured. The VSL stack sends gratuitous ARP of its gateway IP address to all endpoints in the identity network. Moreover, the VSL L2 proxy address and the gateway IP address are uniform across the VSL deployment within an enterprise/user. This convention of the uniform L2 MAC address and the gateway IP address across the VSL deployment supports workload movement.

Figure 21:
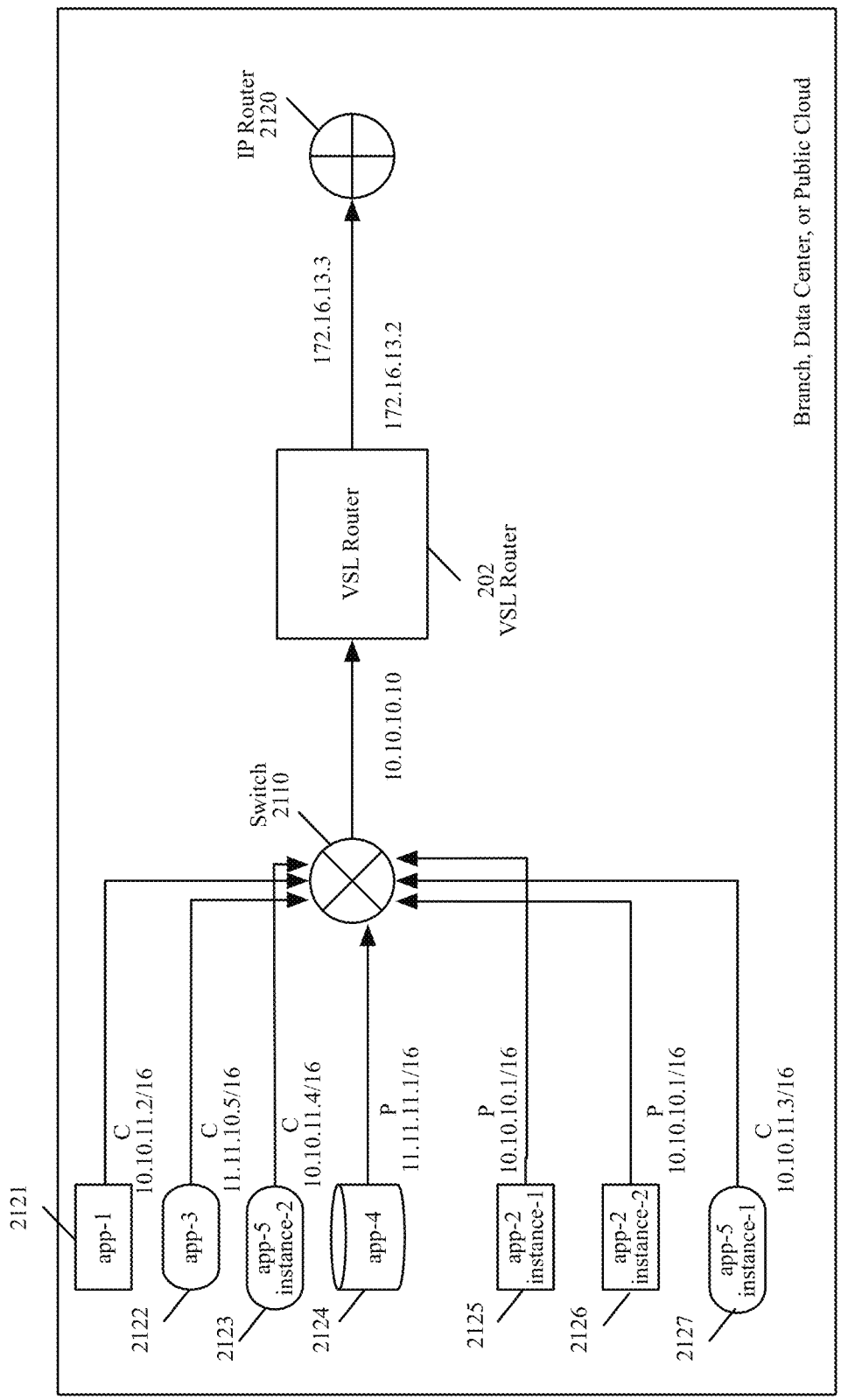
FIG. 21 is a functional diagram illustrating services deployment based on the defined semantic configuration with the VSL router, according to various aspects of the present disclosure.

FIG. 21 is a functional diagram illustrating services deployment based on the defined semantic configuration with the VSL router, according to various aspects of the present disclosure. With reference to FIG. 21, the VSL router 202 is deployed between the switch 2110 and the IP router 2120. The switch 2110 is deployed between the VSL router 202 and the service 2121-2127. The example of FIG. 21 uses the service sematic configuration table 2010, shown in FIG. 20B.

With further reference to FIG. 21, the VSL router 202 may be deployed between the IP router 2120 for the subnet 172.16.13.3 and the switch 2110. The VSL router 202 in the locator network was assigned the 172.16.13.2 locator IP address. The VSL router 202 in the identity network is assigned the VSL gateway IP address 10.10.10.10. The gateway IP address is uniform across the VSL deployment in all identity networks. Along with that, the VSL router 202 hosts the L2 proxy address, which is also uniform across VSL deployment. With reference to the service semantic configuration table 2010 of FIG. 20A, the, applications are deployed in the identity network with their respective identity IP addresses. The communication between the provider and the consumer endpoints in the identity network is mediated by the VSL router 202. At every endpoint in the identity network, the default route is configured to point to VSL gateway. The VSL router 202 sends the gratuitous ARP of its gateway IP address to all endpoints in the identity network.

C. The VSL Packet Format and the VSL Protocol

Figure 22A:
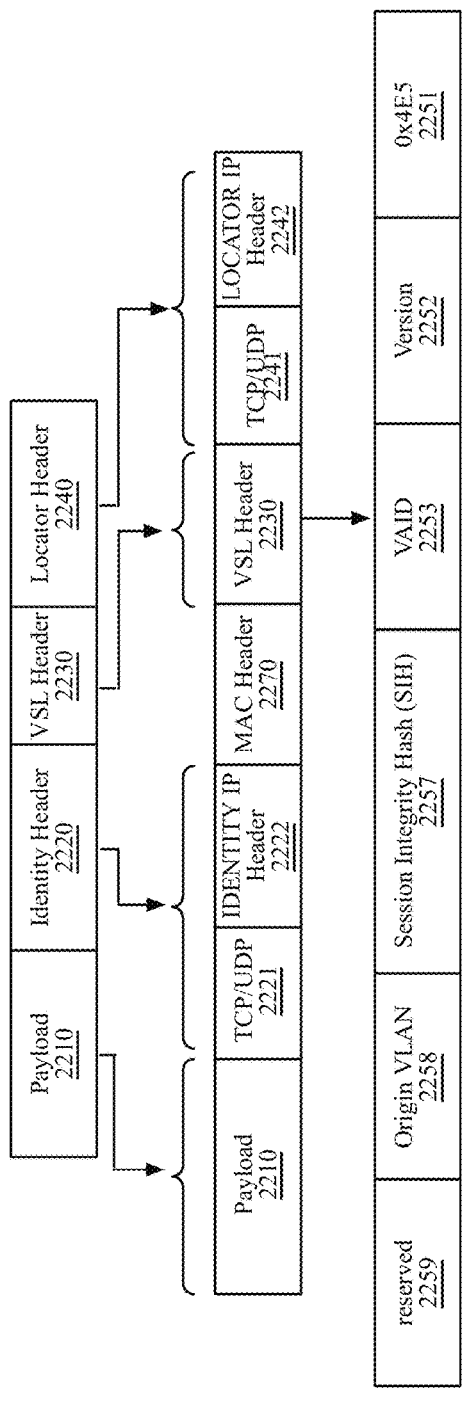
FIG. 22A illustrates an example embodiment of the higher level packet format emitted from the VSL between two VSL service endpoints, according to various aspects of the present disclosure.
Figure 22B:
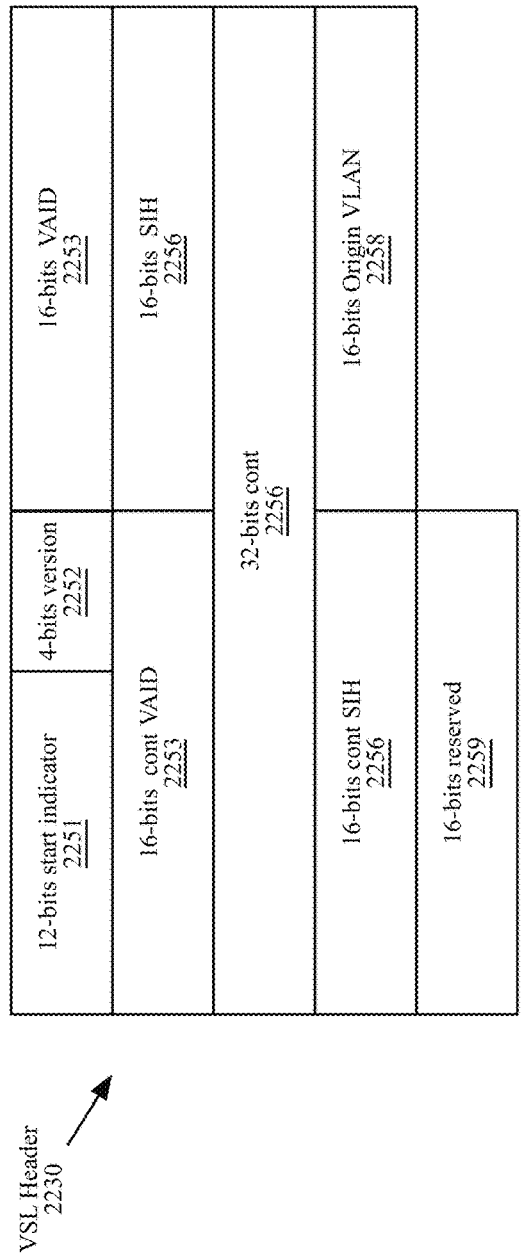
FIG. 22B illustrates an example embodiments of the VSL header fields and the corresponding bit sizes, according to various aspects of the present disclosure.

FIG. 22A illustrates an example embodiment of the higher-level packet format emitted from the VSL between two VSL stacks, according to various aspects of the present disclosure. FIG. 22B illustrates an example embodiments of the VSL header fields and the corresponding bit sizes, according to various aspects of the present disclosure.

With reference to FIG. 22, the details of the VSL service packet format are shown. As the packet format is expanded in FIG. 22, an elaborate view of how VSL header separates IP identity headers from IP locator headers are provided. The VSL service packet may have four parts, payload 2210, the identity header 2220, the VSL header 2230, and the locator header 2240. The VSL header 2230 may be placed between the identity header 2220 and the locator header 2230 to derive service information at that location at the receive (Rx) path.

An endpoint in the identity network may generate a packet with the payload and the identity header, together referred to herein as the identity packet. The TCP/UDP field 2221 and the IP header 2222 from the packet becomes the identity header 2220. Using the identity header 2220, the VSL datapath derives the VSL header information and appends the locator header in transmit (Tx) path. The locator header 2240 may include the TCP/UDP field 2241 and the IP headers field 2242.

The outer TCP/UDP header of the locator header may be copied from the TCP/UDP field 2221 of the identity header 2220, if the endpoint is reachable within the local network or by the private WAN. If the endpoint is reachable by the Internet, then the locator header's TCP/UDP header port values are modified.

In the example of FIG. 22B, the VSL header 2230 size is 18 bytes. The field start indicator 2251 indicates, whether the VSL header 2230 is present in the packet received from the locator network and the value would be 0x4E5 with the length of 12-bits. The 4-bits version field 2252 is used to know the version of the VSL packet and is present for futuristic purposes. The 32-bits virtual application identity (VAID) field 2253 may be used to identify the application endpoint namespace in the datapath. The most significant bits (MSB) 12-bits may be used to represent Transport ID and the least significant bits (LSB) 20-bits may be used to represent the Service ID given in the Service Semantic Config. table. Therefore, the total number of the services possible, in this example, are 2^20 and applications types within the service is 2^12. The definition of these bits is not a hard rule, it may change based on versioning of the VSL header.

The 64-bit Session Integrity Hash (SIH) field 2256, may be generated on the packet by using the symmetric key (session key) which is part of session between endpoints. The SIH field 2256 is a message authentication code for a packet to preserve integrity of the packet and source authentication. The 16-bits origin VLAN field 2258, which is used to store the VLAN of source identity network, the VSL datapath learns at destination Locator it forms complete identity packet. The last field 2259 is 16-bits and is a reserved field for future purposes.

Figure 23:
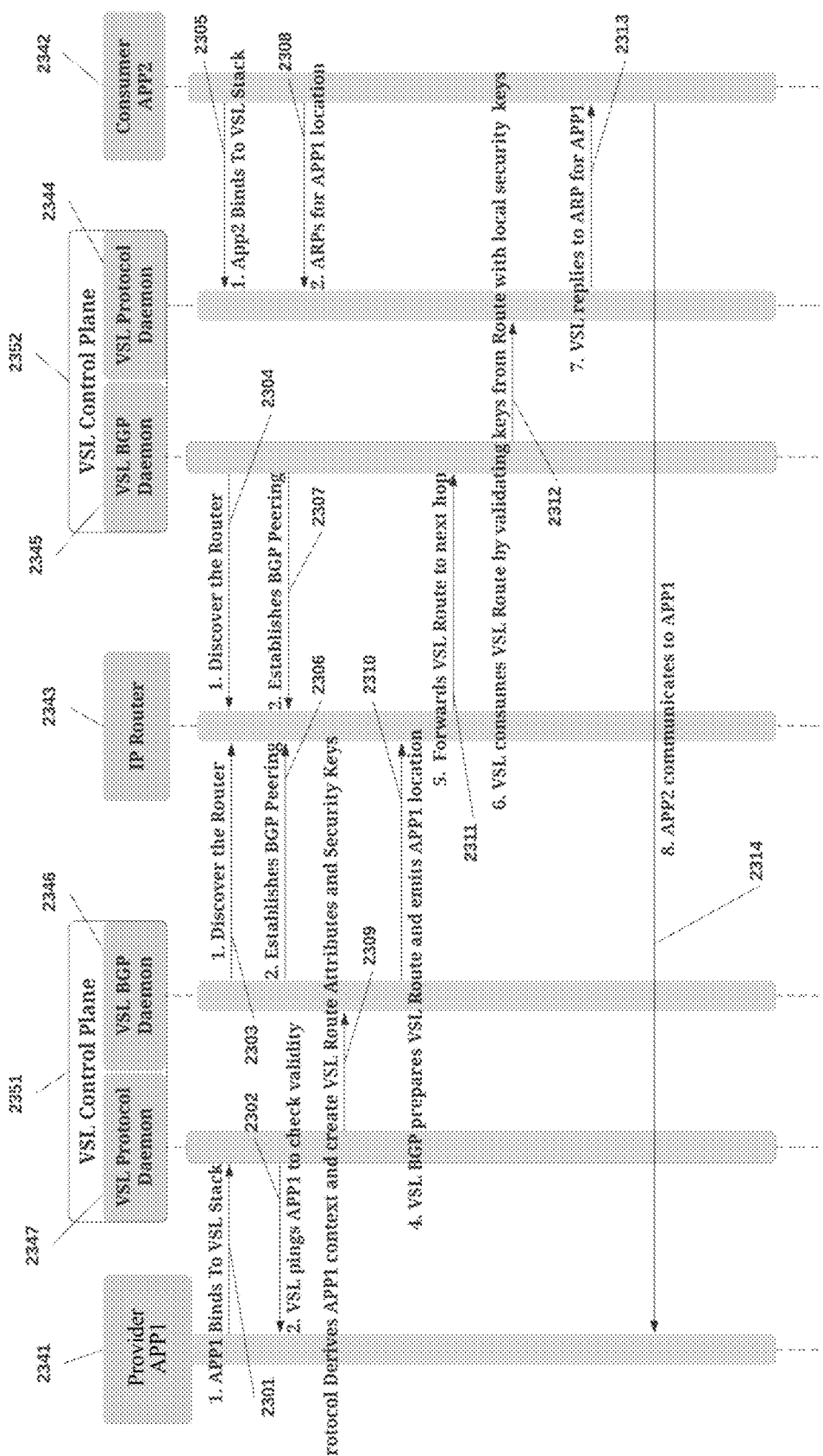
FIG. 23 is a sequence diagram illustrating an example of the how the VSL protocol connects two endpoints across networks by emitting endpoint location in the form of route information to the other VSL endpoints, according to various aspects of the present disclosure.

FIG. 23 is a sequence diagram illustrating an example of the how the VSL protocol connects two endpoints across networks by emitting endpoint location in the form of route information to the other VSL endpoints, according to various aspects of the present disclosure. With reference to FIG. 23, the provider APP1 2341 and the consumer APP2 2342 are deployed at the VSL stack's control plane 2351-2352 and VSL control plane is peering with the IP Router 2343.

The VSL control plane may discover (at blocks 2303 and 2304) the router 2343 and may establish (at block 2306 and 2307) the BGP peering with the router 2343. Also, once service semantic config is received by VSL control plane, the VSL Protocol component TSM (as described with reference to FIG. 41) generates authenticating keys (e.g., and without limitations, public, and private RSA keys) from passphrase of service definition for each application. APP1 2341 and APP2 2343 applications may bind (at blocks 2301 and 2305) to the VSL stack by sending gratuitous ARP (GARP) of its presence in identity network. The VSL protocol daemon 2347 sends (at block 2302) pings to the provider endpoint APP1 2341 based on the identity received in GARP.

The consumer endpoint APP2 2342 sends (at block 2308) ARP for the provider APP1 to the VSL protocol daemon 2344. The VSL protocol daemon 2347 at APP1 2341 receives ack to its ping and generates (at block 2309) the VSL application context attributes, authenticating key (public key), and encrypted security keys (encrypted using authenticating key) and passes it to the VSL BGP daemon 2346. The VSL BGP daemon is a part of the VSL control plane that implements standard BGP control plane with the VSL route specific attributes. The VSL BGP daemon 2346 may generate (at block 2310) the VSL route information using attribute values and keys and may emit the VSL route information to the next hop router 2343. The router 2343 may forward (at block 2311) the VSL route information to the next hop VSL control plane 2352 at APP2 2342, where the VSL BGP daemon 2345 may handover (at block 2312) route attributes and keys to the VSL protocol daemon 2344. The VSL protocol daemon 2344 may authenticate the route information by comparing the authenticating key given in the route information with the local authenticating key of that application specific route. If the keys are matching, then using the corresponding private key, the VSL protocol daemon 234 may decrypt the session keys and may store the decrypted session keys in tables. The VSL protocol daemon 2344 at APP2 may reply (at block 2313) to the ARP request for APP1 2341 from APP2 2342 the L2 proxy address of VSL stack/Router, since APP1 route is received, authenticated and accepted. APP2 2342 may start communicating (at block 2314) to APP1 2341. Using the session keys, the communication between APP1 and APP2 may be encrypted.

Figure 24:
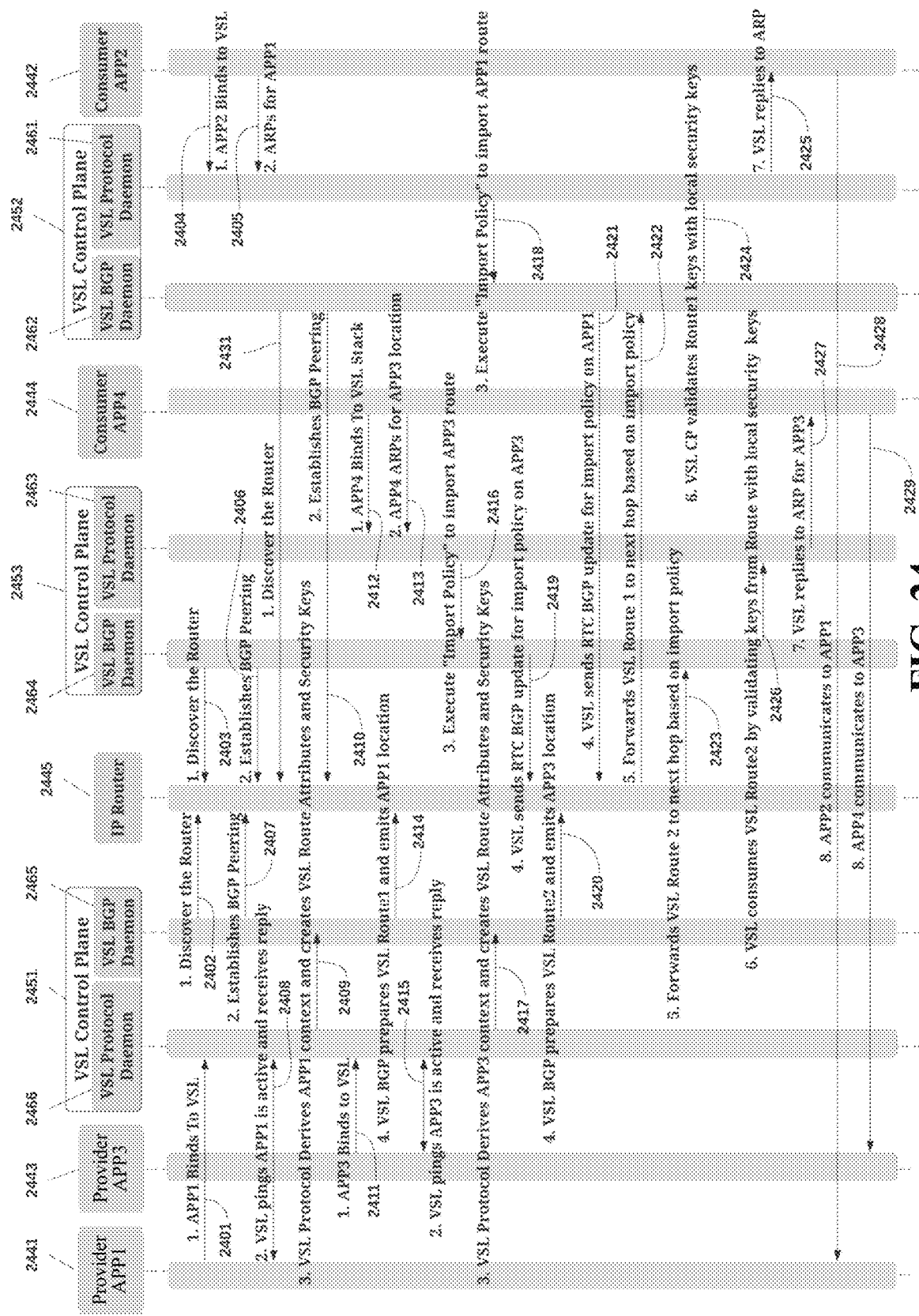
FIG. 24 is a sequence diagram illustrating an example message flow for the VSL protocol contextual reachability, connects two endpoints based on the context of the endpoints, according to various aspects of the present disclosure.

FIG. 24 is a sequence diagram illustrating an example of how the VSL protocol connects two endpoints based on the context of the endpoints, according to various aspects of the present disclosure. The sequence of messages explains how the context of endpoints may be derived by the VSL protocol and how the route information may be generated and transmitted to the next hops, creating reachability path to the endpoints based on the contextual relations.

With reference to FIG. 24, the figure shows details of the VSL protocol exchanging routes for endpoint reachability based on the provider and consumer semantic relation, in continuation from FIG. 23. As per service semantic definition, the consumer APP2 2442 consumes the provider APP1 2441 and the consumer APP4 2444 consumes the provider APP3 2443. APP1 2441 and APP3 2443 are connected to the same VSL control plane 2451, and APP4 2444 and APP2 2442 are connected to different VSL control planes 2452 and 2453, respectively. The VSL control plane may discover (at blocks 2402, 2403, and 2431) the IP router 2445 and may establish (at block 2407, 2406, and 2410) the BGP peering with the router 2445. The VSL protocol daemon 2466 at APP1 2441 and APP3 2443 generates and emits the endpoints' route information after detecting the presence of APP1 2441 and APP3 2443 (at blocks 2401, 2408, 2411, 2415, 2409, 2417, 2414, and 2420 with a similar process as described above with reference to blocks 2301, 2302, 2309, and 2310 of FIG. 23). The VSL protocol daemon 2463 at APP4 2444 after detecting (at blocks 2412 and 2413 with a similar process as described above with reference to blocks 2301 and 2302 of FIG. 23) APP4 2444 presence, executes (at block 2416) import policy request to the VSL BGP daemon 2464 to import all route information of the APP3 endpoint 2443 based on the semantic relation.

Similarly, the VSL protocol daemon 2461 at APP2 2442 after detecting (at blocks 2404 and 2405 with a similar process as described above with reference to blocks 2301 and 2302 of FIG. 23) APP2 2442 presence, executes (at block 2418) import policy request to import all route information of APP1 endpoint 2441 based on semantic relation. The VSL BGP daemons 2464 and 2462 send (at blocks 2419 and 2421, respectively) the route target constraint (RTC) update to the router 2445 to forward (at blocks 2423 and 2422, respectively) the route information of APP3 2443 and APP1 2441. Once the VSL protocol daemon 2461 at APP2 2442 succeeds the authentication process (at block 2424) to consume the route information, the route information may be consumed and the VSL protocol daemon may reply (at block 2425) to the ARP of APP2 2442 for APP1 2441.

Similarly, the same steps may be executed by the VSL protocol daemon 2463 at APP4 2444 to consume APP3 2443 route information (at block 2426) and reply (at block 2427) to the ARP from APP4 2444 for the endpoint APP3 2443. Thus, reachability path is established between only those endpoints based on the semantic relation and APP2 2442 may start communicating (at block 2428) to APP1 2441, and APP4 2442 may start communicating (at block 2429) to APP3 2443.

Figure 25:
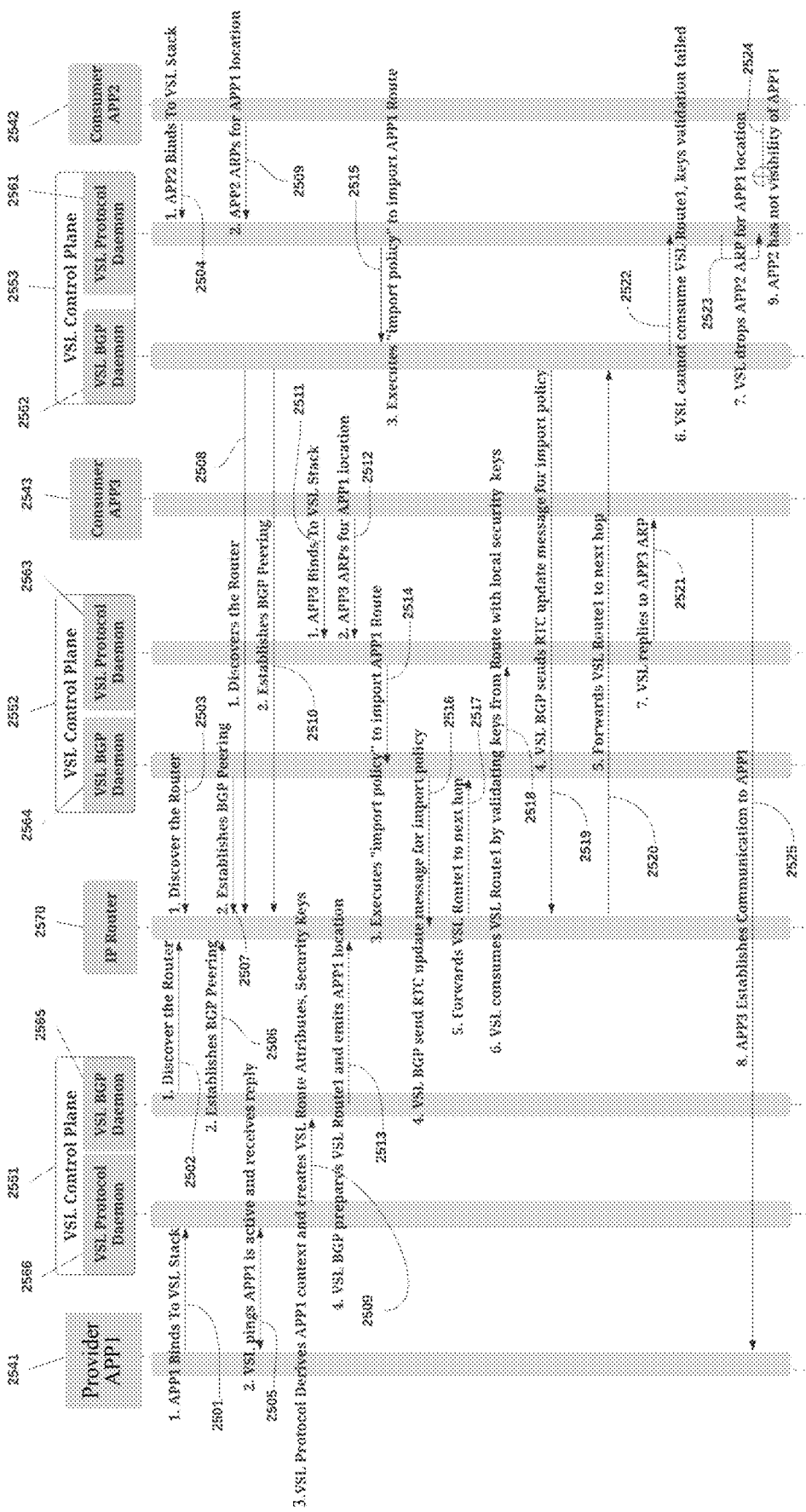
FIG. 25 is a sequence diagram illustrating an example message flow for the VSL protocol contextual visibility, according to various aspects of the present disclosure.

FIG. 25 is a sequence diagram illustrating an example message flow for the VSL protocol contextual visibility, according to various aspects of the present disclosure. The figure shows how the VSL protocol enables addressability of endpoints based on the context of the endpoints. The sequence of messages explains how context of endpoints is derived by VSL and how route is generated and transmitted to next hops and how endpoints authenticate themselves to consume the route to get address visibility.

With reference to FIG. 25, the figure shows the details of the VSL protocol exchanging routes for endpoint visibility based on provider and consumer semantic relation. In continuation from FIGS. 23 and 24 as explained above, the consumer APP2 2542 consumes the provider APP1 2541, and the consumer APP3 2543 consumes the provider APP1 2542. The consumer APP2 2542 has different keys derived from the passphrase using TSM (as described with reference to FIG. 41). The VSL control plane may discover (at blocks 2502, 2503, and 2508) the router 2570 and may establish (at block 2507, 2506, and 2510) the BGP peering with the router 2570. The VSL protocol daemon 2566 at APP1 2541 generates and emits (at block 2509 and 2513) the endpoint route information after detecting (at blocks 2501 and 2505) the presence of APP1 2541.

The VSL protocol daemon 2563 at APP3 2543, after detecting (at blocks 2511 and 2512) APP3 2543 presence, executes (at block 2514) import policy request to the VSL BGP daemon 2564 to import all route information of APP1 endpoint 2541 based on the semantic relation. Similarly, the VSL protocol daemon 2561 at APP2 2542 after detecting (at blocks 2504 and 2509) APP2 2542 presence, executes (at block 2515) import policy request to import all route information of APP1 endpoint 2541 based on the semantic relation. The VSL BGP daemons 2564 and 2562 send the RTC update (at blocks 2516 and 2519 respectively) to the router 2570 to forward (at blocks 2517 and 2520 respectively) the route information of APP1 2541 to the VSL BGP daemon 2564 and 2562. Once the VSL protocol daemon 2563 at APP3 2543 receives the APP1 endpoint route information, the VSL protocol daemon 2563 consumes the route information (at block 2518), after authentication succeeds, and the VSL protocol daemon 2563 replies (at block 2521) to ARP from APP3 2543 for APP1 endpoint 2541 and APP3 2543 is able to address the APP1 endpoint 2541 (at block 2525). Whereas the VSL protocol daemon 2561 at APP2 2542 receives APP1 endpoint route and fails (at block 2522) to authenticate itself to consume the route. The VSL protocol daemon 2561 cannot reply (at block 2523) to the ARP from APP2 2542 for APP1 endpoint 2541 and APP2 endpoint 2542 cannot address (at block 2524) the APP 2541.

D. VSL Packet Path and VSL Stack Components

Figure 26:
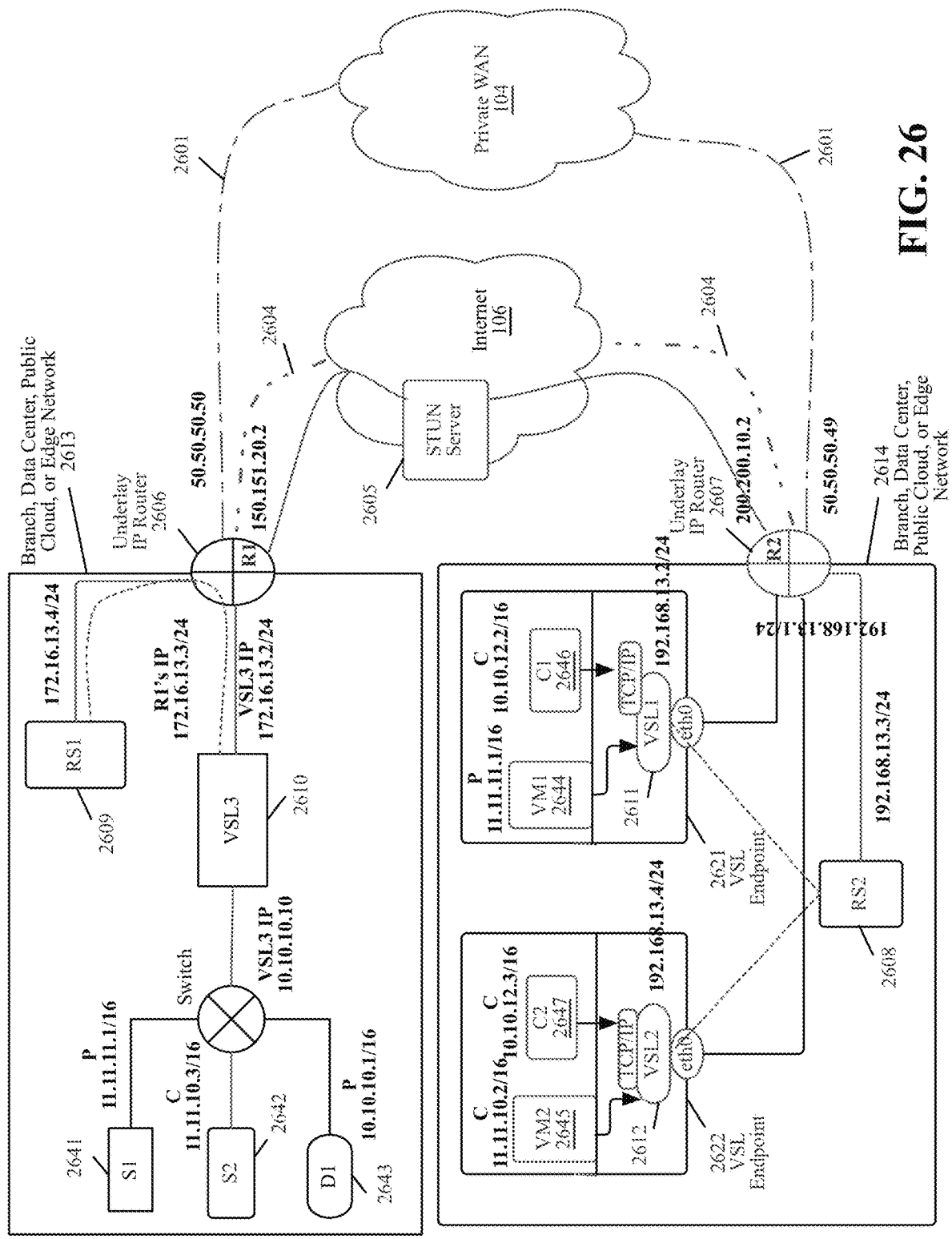
FIG. 26 is a functional diagram illustrating an example of the VSL stack deployment at the VSL endpoints and VSL routers across networks connected by the Internet and private WANs and connectivity of applications being achieved by the VSL protocol stack, according to various aspects of the present disclosure.

FIG. 26 is a functional diagram illustrating an example of the VSL stack deployment at the VSL endpoints and VSL routers across networks connected by the Internet and private WANs and connectivity of applications being achieved by the VSL protocol stack, according to various aspects of the present disclosure. The figure shows example details of deployment model of the VSL endpoint and the VSL router across datacenters, branches, public clouds, and edge networks. The figure does not limit the deployment model and rather shows logically how the VSL endpoints and the VSL routers establish reachability path for application endpoints.

With reference to FIG. 26, the branches, data centers, public clouds, and/or edge networks (collectively shown as 2613 and 2614) may be, which may be connected over the Internet 106 and the private WAN (e.g., MPLS) 104. The VSL stack VSL1 2611 in the VSL endpoint 2621, the VSL2 2612 in the endpoint 2622, and the VSL router VSL3 2610 may establish reachability path for the applications S1 2641, S2 2642, D1 2643, VM1 2644, VM2 2645, C1 2646, and C2 2647 over the Internet 106 and the private WAN 104.

The VSL route server RS1 2609 represents network for the branch, data center, public cloud, or edge network 2613. The VSL route server RS2 2608 represents the network for the branch, data center, public cloud, or edge network 2614. All VSL endpoints and VSL routers in the network 2613 discover and peer with the VSL route server RS1 2609 and with the underlay router R1 2606. All VSL endpoints/VSL routers in the network 2614 may discover and peer with the VSL route server RS2 2608 and with the underlay router R2 2607. The VSL route servers RS1 2609 and RS2 2608 peer each other over the Internet 106 and the private WAN 104 to exchange route information.

The route information exchanged over the Internet 106 establishes the reachability paths 2604 over the Internet 106 between the VSL endpoints/routers. Similarly, the route information exchanged over the private WAN 104 establishes the reachability paths 2601 over the private WAN 104 between the VSL endpoints/routers. The VSL endpoints VSL1 2611, VSL2 2612, and the VSL router 2610 are deployed in the private network with public IP address assigned to network on the Internet 106. In order for an endpoint in the private network to communicate over the Internet 106, the private IP address of the endpoint [IP1:Port1] is translated to the public IP address [IP2:Port2] at the underlay routers R1 2606 and/or R2 2607.

The method of mapping private IP address to public IP address is referred to as network address translation (NAT). Using the NATed public IP address, the external endpoint may reach to the internal endpoint in the private network. In order for the VSL endpoint VSL1 2611 to communicate over the Internet 106 with the VSL router VSL3 2610, the VSL1 has to know the public IP address [IP1:Port1] of VSL3 i.e., the NATed IP address of VSL3 at R1.

Similarly, VSL3 2610 has to know the public IP address [IP2:Port2] of VSL1 2610 at R2 2607. The VSL endpoints/VSL routers may use Simple Traversal of User Datagram Protocol through Network Address Translators (STUN) to find the NATed public IP address [IP:Port] for their internal IP address. The VSL endpoints/VSL routers generate STUN pings to the STUN server 2605 hosted on the Internet 106 and receive their public IP address [IP:Port] information in the ping reply. Once the VSL endpoint/VSL router knows their NATed public IP address, the public IP address may be added to the application endpoint route information at the time of generating the route.

For establishing communication over the private WAN 104, a VSL endpoint/VSL router publishes the endpoint route information to the underlay next hop router R1/R2. The application endpoints S1 2641, D1 2643, and S2 2642 are located in the identity network, VSL3 2610 may act as the IP gateway for the endpoints in the identity network. The IP address 11.11.11.1 of S 2641, the IP address 11.11.10.3 of S2 2642, and the IP address 10.10.10.1 of D1 2643 are recognized as the identities by the VSL router VSL3 2610. The IP address 172.16.13.2 assigned to the VSL router VSL3 2610 acts as the locator IP address and the 172.16.13.0/24 subnet network is the locator network.

Similarly, the application endpoints VM1 2644 and C1 2646 are located in the identity network of VSL1 2611, and the application endpoints VM2 2645 and C2 2647 are located in the identity network of VSL2 2612. The IP address 11.11.11.1 of VM1 2644 and the IP address 10.10.12.2 of C1 2646 are recognized as identities by the VSL endpoint VSL1 2611. The IP address 11.11.10.2 of VM2 and the IP address 10.10.12.3 of C2 2647 are recognized as identities by the VSL endpoint VSL2 2612. The IP addresses 192.168.13.2 and 192.168.13.4 assigned to VSL1 2611 and VSL2 2612 respectively act as the locator address, and the subnet 192.168.13.0/24 is the locator network. The details of how a packet traverses between the VSL endpoints 2611, 2612 and the VSL routers 2610 are described below.

Figure 27:
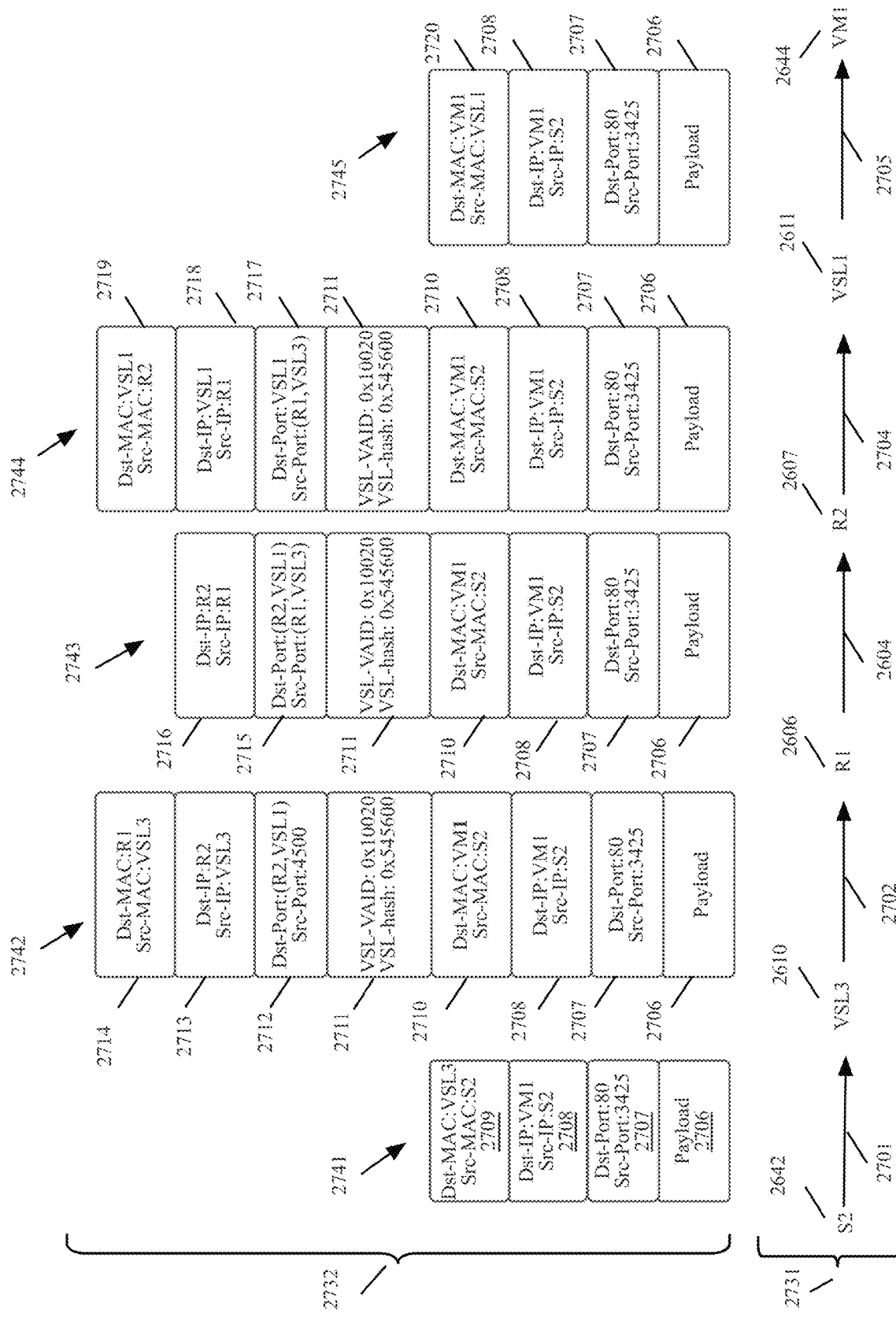
FIG. 27 is a functional diagram illustrating the packet path from S2 to VM over the Internet of FIG. 26, showing how the packet headers are modified, encapsulated, and decapsulated, according to various aspects of the present disclosure.

FIG. 27 is a functional diagram illustrating the packet path from S2 to VM over the Internet of FIG. 26, showing how the packet headers are modified, encapsulated, and decapsulated, according to various aspects of the present disclosure. With reference to FIG. 27, the figure is divided into two sections 2731 and 2732. Section 2731 shows the path of a packet sent from the consumer application endpoint S2 2642 to the producer application endpoint VM1 2644 over the Internet 106. Section 2732 shows the contents of the packets that are examined at each part of the path.

With reference to FIGS. 26 and 27, the packet path for communication from the application endpoint S2 2642 to the application endpoint VM1 2610 is from the application endpoint S2 2642 to VSL router VSL3 2610 (as shown by 2710), from the VSL router VSL3 2610 to the underlay router R1 2606 (as shown by 2702), from the underlay router R1 2606 to the underlay router R2 2607 (as shown by 2604), from the underlay router R2 2607 to VSL1 stack 2611 (as shown by 2704), and from VSL1 stack 2611 to the application endpoint VM1 2644 (as shown by 2705).

As shown by 2741, the packet from S2 2642 to VSL3 2610 is formatted with the payload 2706, the L4 header 2707 that includes the source-Port (Src-Port) 3425 and the destination-port (Dst-Port) 80, the L3 header 2708 that includes the Src-IP of S2 2642 and the Dst-IP of VM1 2644, and the L2 header 2709 Src-MAC would be S2 2642 MAC address and Dst-Mac is addressed to the gateway MAC address of VSL3 (VSL Router) 2610, in other words packet is sent to VSL Router VSL3 2610. At VSL3 2610 packet is encapsulated with the VSL header 2711, the locator header (2712 and 2713), and the L2 header 2714.

The VSL header 2711 may include the SIH field, which is a hash calculated from payload 2706 to the L2 header 2710 of the packet, and the VAID of the application (in this example APP-4 as shown in table 1510 of FIG. 15A) is added to the VSL header. The Locator header (as shown in FIG. 22A) includes L4 2712 and L3 2713 headers. The L4 header 2712 that includes the Src-Port 4500 and the Dst-Port of (R2, VSL1), which is the NATed port representing VSL1 at R2 2607. The L3 header 2713 that includes the Dst-IP of R2, which is the NATed Public IP address representing VSL1 at R2, and the Src-IP of VSL3. The VSL3 may modify the inner L2 header 2710 with the Dst-Mac to VM1 and encrypts the payload 2706 of the packet using the session key before calculating the SIH field in the VSL header 2711. Finally, the L2 header 2714 is appended with Dst-Mac of R1 addressing immediate next hop router and the Src-Mac of VSL3.

Once the packet is received by R1 2606, NATing is applied on the locator headers of packet 2742 resulting in modified packet 2743. At R1 2606, the L4 header 2715 Src-Port is modified from value 4500 to (R1, VSL3), which is the NATed port value representing VSL3 2610 at R1 2606. The L3 header 2716 Src-IP is modified from VSL3 to R1, which is the NATed public IP address representing VSL3 at R1. Packet is forwarded from R1 2606 to R2 2607. At R2 2607, NATing is applied on the locator headers of the packet 2743 resulting in the modified packet 2744. The L4 header 2717 Dst-Port is modified from R2 to VSL1, which is the internal port value assigned to VSL1 in the network 2614. The L3 header 2718 Src-IP is modified from R2 to VSL1 2611, which is the internal IP address assigned to VSL1 2611 in the network 2614. Then R2 2607 encapsulates the L2 header with the Src-MAC to R2 gateway MAC (MAC internal to network 2614 acts as gateway MAC address for endpoints in network) and Dst-MAC to VSL1 2611 and forwards the packet 2744 to VSL1 2611. Once the packet is received by VSL1 2611, VSL1 2611 decapsulates the VSL header 2711, locator headers 2717, 2718, and the L2 header 2719. VSL1 2611 modifies the inner L2 header 2720 Src-MAC from S2 2642 to VSL1 2611 and decrypts the payload 2706 using the session key and forwards the packet 2745 to VM1 2644.

Figure 28:
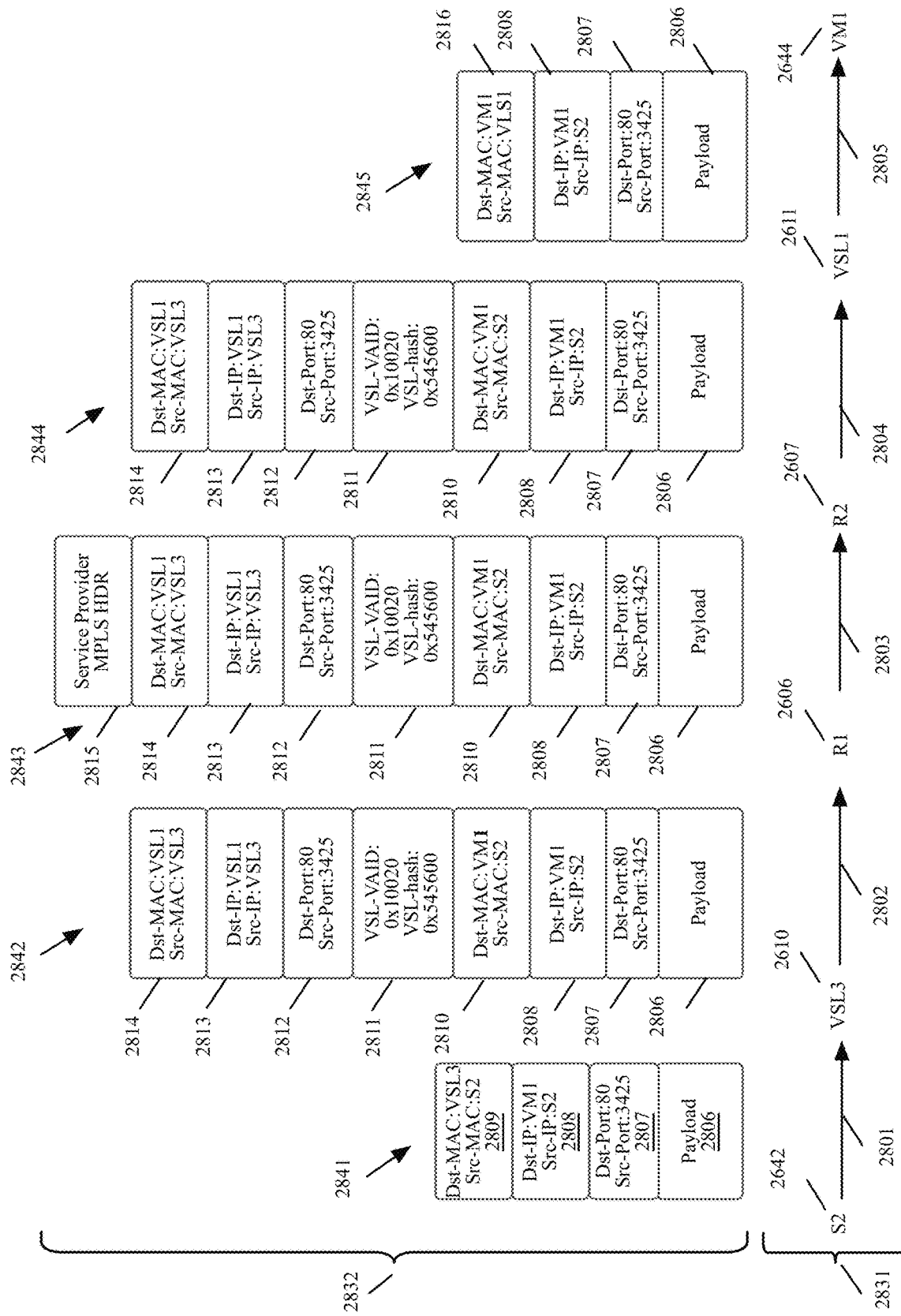
FIG. 28 is a functional diagram illustrating the packet path from S2 to VM1 over the private WAN of FIG. 26, showing how packet headers are modified, encapsulated, and decapsulated, according to various aspects of the present disclosure.

FIG. 28 is a functional diagram illustrating the packet path from S2 to VM1 over the private WAN of FIG. 26, showing how packet headers are modified, encapsulated, and decapsulated, according to various aspects of the present disclosure. The figure shows a packet path from S2 to VM1 over private WAN of FIG. 26.

With reference to FIG. 28, the figure is divided into two sections 2831 and 2832. Section 2831 shows the path of a packet sent from the consumer application endpoint S2 2642 to the producer application endpoint VM1 2644 over the private WAN 104. Section 2732 shows the contents of the packets that are examined at each part of the path.

With reference to FIGS. 26 and 27, S2 is a consumer and VM1 is a producer. R1 2606 and R2 2607 act as switches of L2VPN. The Packet path for communication from S2 to VM1 is from S2 2642 to VSL3 2610 (as shown by 2801), from VSL3 to R1 2606 (as shown by 2802), from R1 2606 to R2 2607 (as shown by 2803) over the path 2601 (FIG. 26), from R2 2607 to VSL1 2611 (as shown by 2804), and from VSL1 2611 to VM1 2644 (as shown by 2804).

The packet 2841 from S2 2642 to VSL3 2610 is formatted with the payload 2806, the L4 header 2807 with Src-Port 3425 and Dst-Port 80, the L3 header 2808 with Src-IP of S2 and Dst-IP of VM1, and the L2 header 2809 addressed to gateway MAC of VSL3 2610 with Src-MAC of S2. VSL3 2610 receives the packet 2841 and encrypts the payload 2806 using the session key, modifies the L2 header 2810 Dst-MAC to VM1 2644, appends the VSL header 2811 to the packet, calculates the SIH field on the packet payload and headers 2210, 2221, 2222, 2270, and encapsulates the locator header to the packet, the L4 header 2812 that is a copy of the identity L4 header 2807 as given by the application endpoint with Src-Port 3425 and Dst-Port 80, the L3 header 2813 with Dst-IP of VSL1 2611 and Src-IP of VSL3 2610, and the L2 header 2814 with Src-MAC of VSL3 2610 and Dst-MAC of VSL1 2611. R1 2606 encapsulates/modifies the packet to service provider header 2815 and packet 2843 is forwarded to R2 2607. R2 2607 removes/decapsulates the service provider header 2815 and forwards the packet 2844 to VSL1 2611. VSL1 2611 removes/decapsulates the locator header from the packet and modifies the L2 header 2816 Src-MAC to VSL1 and decrypts the payload 2806 using the session key and forwards the packet 2845 to VM1 2644.

Figure 29:
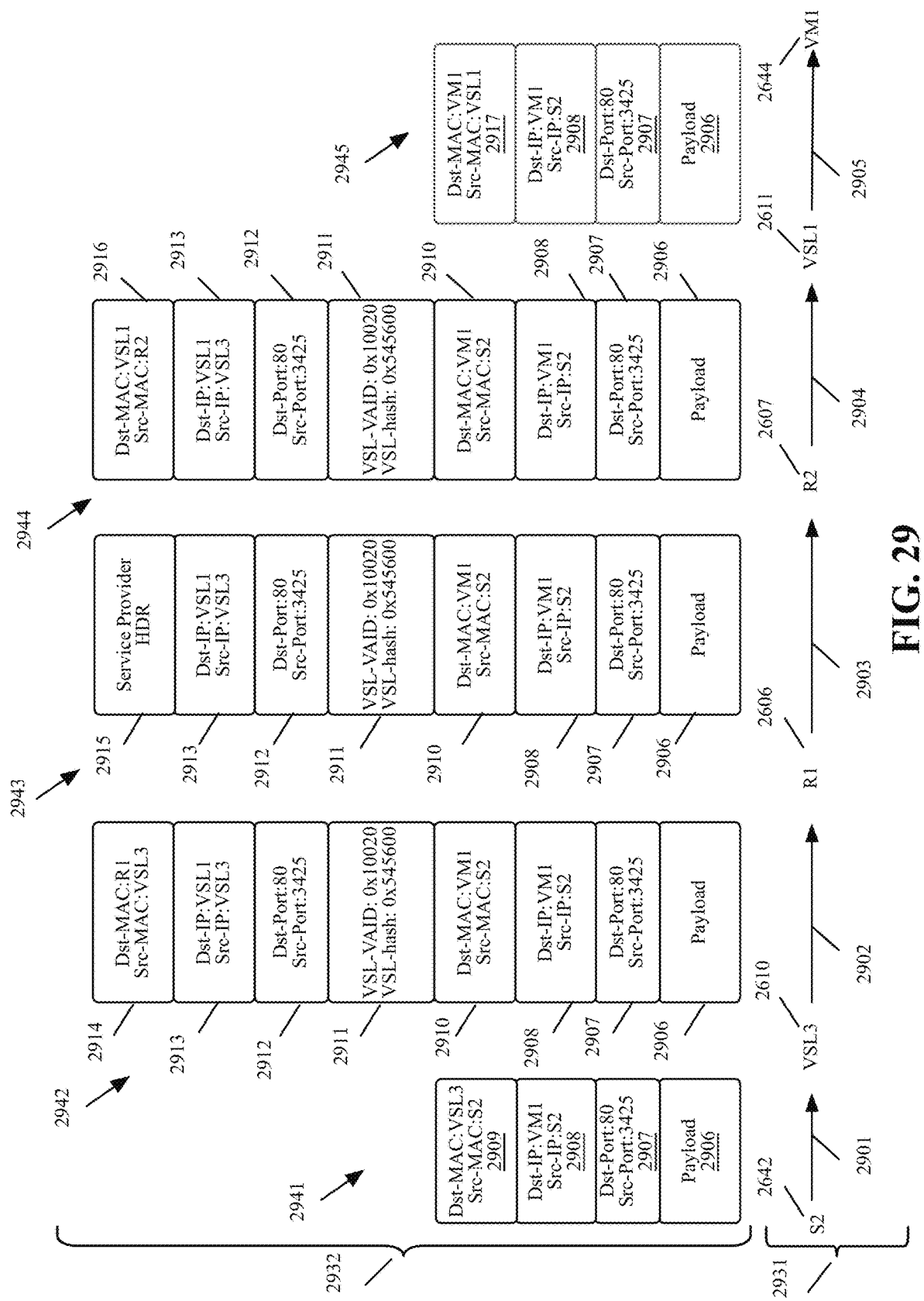
FIG. 29 is a functional diagram illustrating the packet path from S2 to VM1 over the private WAN of FIG. 26, shows how packet headers are modified, encapsulated, and decapsulated, according to various aspects of the present disclosure.

FIG. 29 is a functional diagram illustrating the packet path from S2 to VM1 over the private WAN of FIG. 26, shows how packet headers are modified, encapsulated, and decapsulated, according to various aspects of the present disclosure. With reference to FIG. 29, the figure is divided into two sections 2931 and 2932. Section 2931 shows the path of a packet sent from the consumer application endpoint S2 2642 to the producer application endpoint VM1 2644. Section 2932 shows the contents of the packets that are examined at each part of the path.

With reference to FIG. 29 and FIG. 26, the detail explanation of packet path from S2 2642 to VM1 2644 over private WAN 104 (FIG. 26) is provided. S2 2642 is a consumer and VM1 2644 is a producer and R1 2606 and R2 2607 acts as L3VPN routers. The packet path for communication from S2 2642 to VM1 2644 is from S2 2642 to VSL3 2610 (as shown by 2901), from VSL3 2610 to R1 2606 (as shown by 2902), from R1 2606 to R2 2607 over the path 2601 of FIG. 26 (as shown by 2903), from R2 2607 to VSL1 2611 (as shown by 2904), and from VSL1 2611 to VM1 2644 (as shown by 2905).

The Packet 2941 from S2 2642 to VSL3 2610 is formatted with the payload 2906, the L4 header 2907 with Src-Port 3425 and Dst-Port 80, the L3 header 2908 with Src-IP of S2 and Dst-IP of VM1, and the L2 header 2909 addressed to gateway MAC of VSL3 2610 with Src-MAC of S2.

VSL3 2610 receives the packet 2941 and modifies the L2 header 2910 Dst-MAC to VM1 2644, encrypts the payload 2906 using the session key, and encapsulates the locator header to the packet with the VSL header 2911, SIH field is calculated on packet, the L4 header 2912 is a copy of the identity L4 header 2907 as given by the application endpoint with Src-Port 3425 and Dst-Port 80, the L3 header 2913 with Dst-IP of VSL1 2611 and Src-IP of VSL3 2610, and L2 header 2914 with Src-MAC of VSL3 2610 and Dst-MAC of R1 2606.

R1 2606 receives the packet 2942 and encapsulates/modifies to service provider header 2915 and packet 2943 is forwarded to R2 2607. R2 2607 removes/decapsulates the service provider header 2915 and appends the L2 header 2916 with Src-MAC of R2 and Dst-MAC of VSL1 and forwards the packet 2944 to VSL1 2611. VSL1 2611 removes/decapsulates the locator header from the packet and modifies the L2 header 2917 Src-MAC to VSL1 and decrypts the payload 2906 using the session key and forwards the packet 2945 to VM1 2644.

Figure 30:
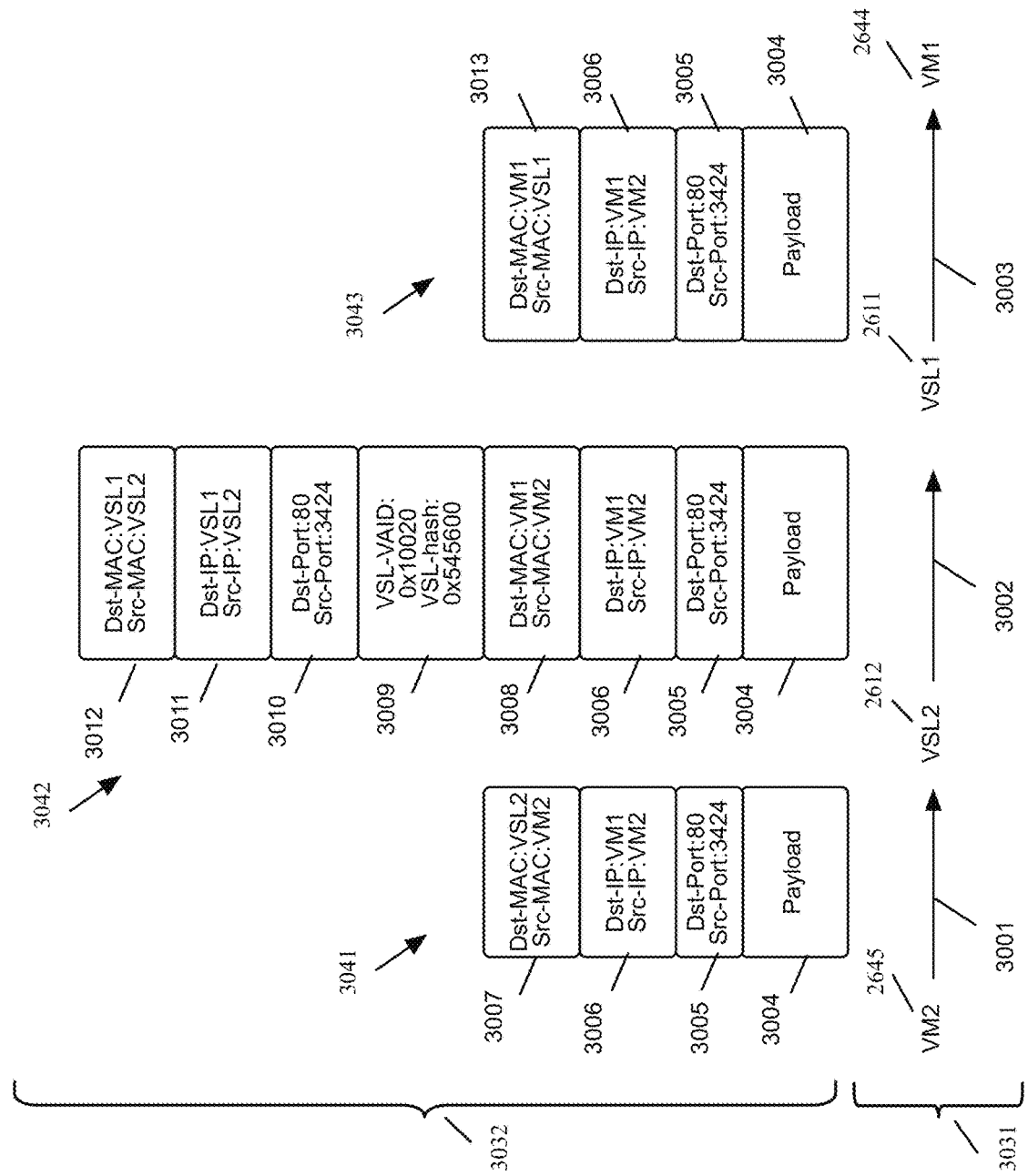
FIG. 30 is a functional diagram illustrating the packet path from VM2 to VM1 of FIG. 26 within the same network, according to various aspects of the present disclosure.

FIG. 30 is a functional diagram illustrating the packet path from VM2 to VM1 of FIG. 26 within the same network, according to various aspects of the present disclosure, according to various aspects of the present disclosure. With reference to FIG. 30, the figure is divided into two sections 3031 and 3032. Section 311 shows the path of a packet sent from the consumer VM2 2645 to the producer VM1 2644 over the same network 2614 (FIG. 26). Section 3032 shows the contents of the packets that are examined at each part of the path.

With reference to FIG. 30 and FIG. 26, the detail explanation of the packet path from VM2 2645 to VM1 2644 within the same network 2614 are provided. VM2 2645 is a consumer and VM1 2644 is a producer. The packet path for communication from VM2 2645 to VM1 2644 is from VM2 2645 to VSL2 2612 (as shown by 3001), from VSL2 2612 to VSL1 2611 (as shown by 30012), and from VSL1 2611 to VM1 2644 (as shown by 3003). The packet 3041 from VM2 2645 to VSL2 2612 is formatted with the payload 3004, the L4 header 3005 with Src-Port 3424 and Dst-Port with 80, the L3 header 3006 with Src-IP of VM2 and Dst-IP of VM1, and the L2 header 3007 with Src-MAC of VM2 and Dst-MAC of VSL2.

VSL2 2612 receives the packet 3041 and modifies the L2 header 3008 Dst-MAC to VM1 2644, encrypts the payload 3004 using the session key, and encapsulates the locator header to the packet with the VSL header 3009, SIH field calculated on packet, the L4 header 3010 that is a copy of identity L4 header 3005 as given by application endpoint with Src-Port 3424 and Dst-Port 80, the L3 header 3011 with Dst-IP of VSL1 and Src-IP of VSL2, the L2 header 3012 with Src-MAC of VSL2 and Dst-MAC of VSL1 and modifies the inner L2 header 3008 with the Dst-MAC of VM1 and forwards the packet 3042. VSL1 2611 receives the packet 3042 and decapsulates the locator header and modifies the L2 header 3013 Src-MAC to VSL1 and decrypts the payload 3004 using the session key and forwards the packet 3043 to VM1 2644.

Figure 31:
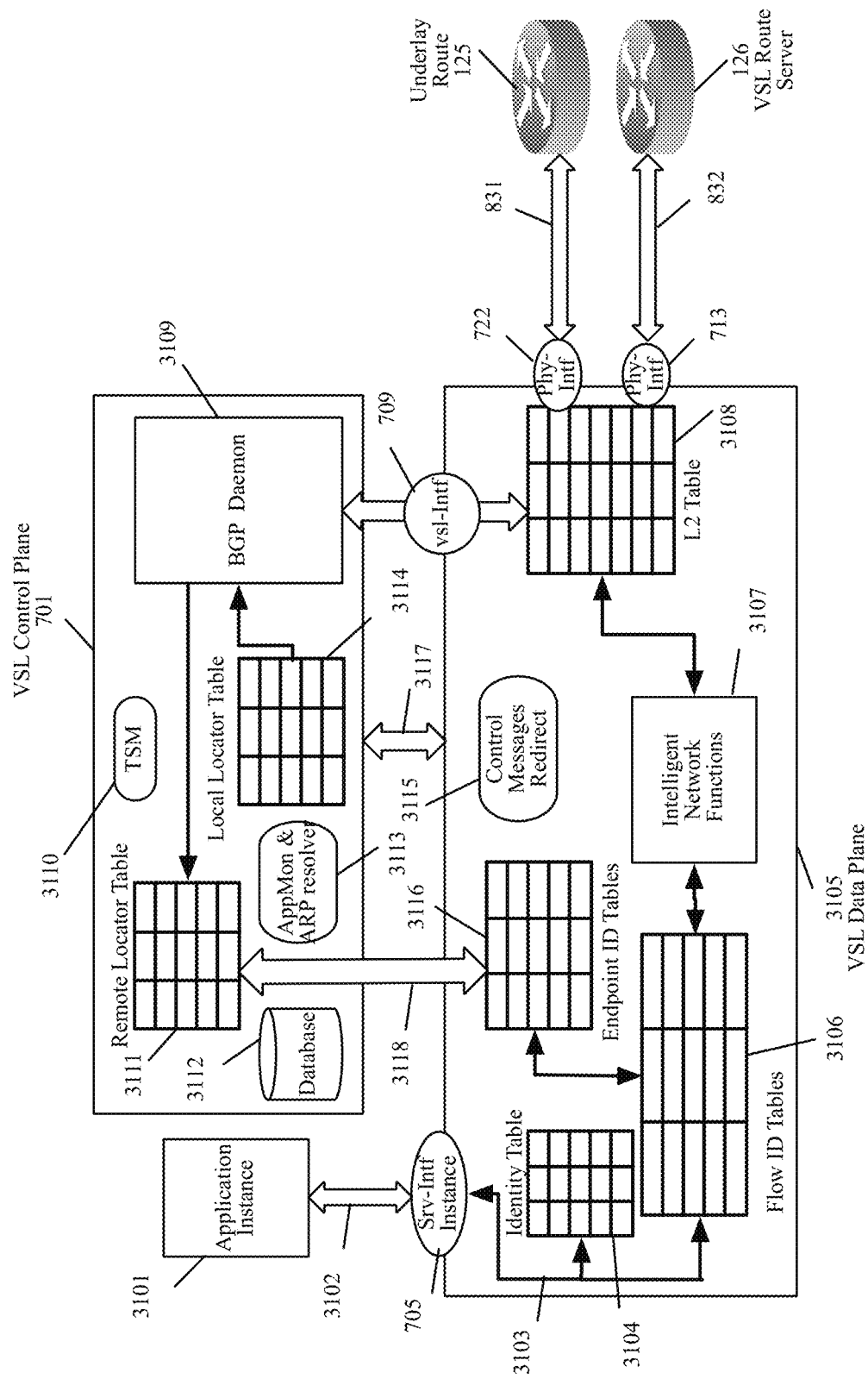
FIG. 31 is a functional diagram illustrating the VSL control plane and the VSL data plane architecture, according to various aspects of the present disclosure.

FIG. 31 is a functional diagram illustrating the VSL control plane and the VSL data plane (datapath) architecture, according to various aspects of the present disclosure. With reference to FIG. 31, the VSL control plane 3119 may include the remote locator table 3111, the local locator table 3114, the BGP module 3109, the TSM 3110, the database 3112, and the application monitoring (AppMon) and ARP resolver 3113. The remote locator table 3111 may store the remote application endpoint locator route information, which is the information about an application endpoint location and how to reach the endpoint. The local locator table 3114 may store the local application endpoints identity information, which are the application endpoints that are present in the VSL identity network. The application endpoint 3101, deployed in the identity network, is connected by the L2 port 3102 representing the L2 domain. Packets received from the identity network may take the processing path 3103.

The BGP daemon 3109 may peer (as shown by 831) with the underlay network routers 125 and may peer (as shown by 832) with the VSL route servers 126. The BGP agent 3109 may receive remote endpoint route information and may store the route information in the remote locator table 3111. The BGP agent 3109 may generate and emit application endpoint route information using the endpoint information from the local locator table 3114. The TSM 3110, as described below with reference to FIG. 41, may take the passphrase from the service semantic config and may generate RSA's keys unique for an application.

The AppMon and ARP resolver 3113 may implement ARP handling for identity network and may generate applications pings to know the alive status of the application endpoints. The BGP agent 3109 of the VSL control plane 3119 may bind to the vsl-intf 709 to peer (as shown by 831 and 832) with the underlay routers 125 and the VSL route servers 126, respectively. The VSL control plane 3119 may program the VSL data plane 3105 rules through the programming interface 3118. The VSL control plane 3119 may receive control plane messages, such as, for example, and without limitations, ARP, pings, etc., through the interface 3117 from the VSL data plane 3105. The VSL data plane 3105 may process the application traffic using rules from the tables programmed by the VSL control plane 3119 and may apply the required network functions 3107 based on the application endpoint.

With further reference to FIG. 31, the VSL data plane 3105 may include the identity table 3104, the endpoint ID tables 3116, the flow ID tables 3106, the L2 table 3108, the control messages redirect module 3115, and the intelligent network functions 3107. The identity table 3104 may store all endpoint identity IP addresses and the associated application endpoint information as defined in the semantic service config. There may be two types of main ID tables 3116: the remote main ID table and the local main ID Table. The main ID tables are designed around the tuple search space based on the identity IP address prefix length.

Figure 32:
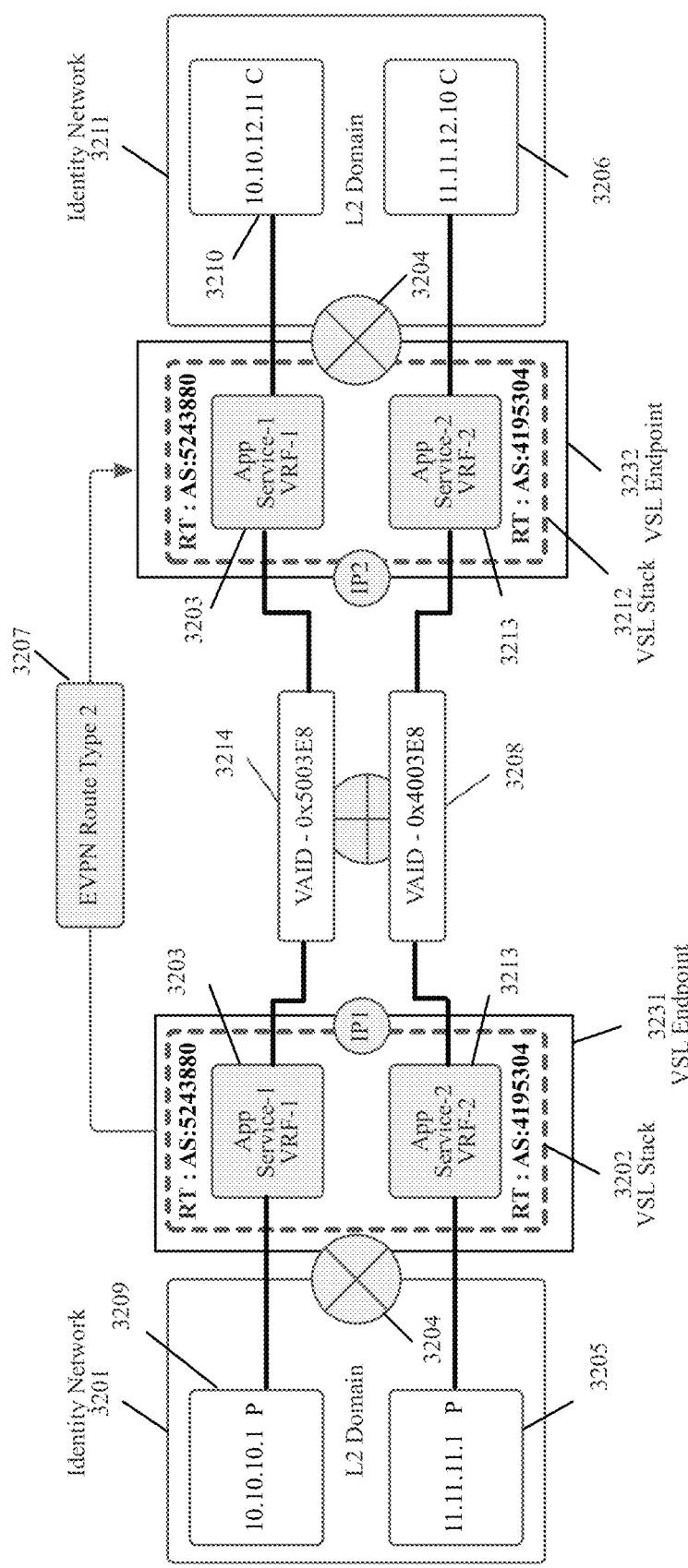
FIG. 32 is a functional diagram illustrating the exchange of route information by the VSL endpoints and/or VSL routers for creating VRF between provider and consumer applications, according to various aspects of the present disclosure.

There may be two types of flow ID tables: remote Flow ID table and local flow ID table. The flow ID tables are designed around tuple search space based on the identity IP address prefix length. The control messages redirect module 3115 may receive control messages, such as, for example, and without limitations, ARP, ICMPv4, ICMPv6, and TCP/UDP pings, and may redirect them to the VSL control plane 701. The L2 table 3108 may store the MAC VRF entries for all physical/virtual interfaces 722-723, the vsl-intf 709, and the srv-intf 705. The MAC VRF value of the interfaces 722-723 and the MAC VRF value of the vsl-intf 709 is 0 (zero). The MAC VRF value of the srv-intf 705 is derived from the VAID 2253 (FIG. 22A) or from the service semantic configuration table 1510, 1610, 1710, and 1810 (FIGS. 15A, 16A, 17A, and 18A, respectively). The network functions 3107 may include encryption, decryption, compression, FEC, TCP-opt, applied on application traffic based on endpoint config E. VSL Service VRFs and Identity Network Topologies FIG. 32 is a functional diagram illustrating the exchange of route information by the VSL endpoints and/or VSL routers for creating VRF between provider and consumer applications, according to various aspects of the present disclosure. With reference to FIG. 32, the identity network 3201 hosts providers application endpoints and identity network 3211 hosts consumer application endpoints. The service-1 provider application endpoint 10.10.10.1 3209 is connected to the VSL stack 3202 of the VSL endpoint 3231, and the consumer endpoint 10.10.12.11 3210 is connected to the VSL stack 3212 of the VSL endpoint 3232. The service-2 provider application endpoint 11.11.11.1 3205 is connected to the VSL stack 3202, and the consumer endpoint 11.11.12.10 3206 is connect to the VSL stack 3212. The route targets RT: AS:5243880 and RT: AS:4195304 create namespace for the application service-1 and application service-2, as described further below with reference to FIG. 35. The autonomous system (AS) defined in RT may be configured by the network administrator per BGP standards through user interface of VSL stack.

As per VSL control plane described above with reference to FIG. 23, the provider endpoint route information is emitted, and the consumer consumes the route information. The VSL stack 3202 may generate and emit the Ethernet VPN (EVPN) route type-2 3207 for each provider application endpoint 3205 and 3209. The remote VSL stack 3212 may consume the route information 3207 for the consumer endpoints looking for those services and may create the application service VRFs 3203 and 3213 between the VSL endpoints/VSL routers. Once the application service VRFs 3203 and 3213 are created at the VSL endpoints, the reachability and visibility paths 3214 and 3208 between the VSL endpoints/VSL routers, where routes are consumed may be created.

Figures 33A, 33B:
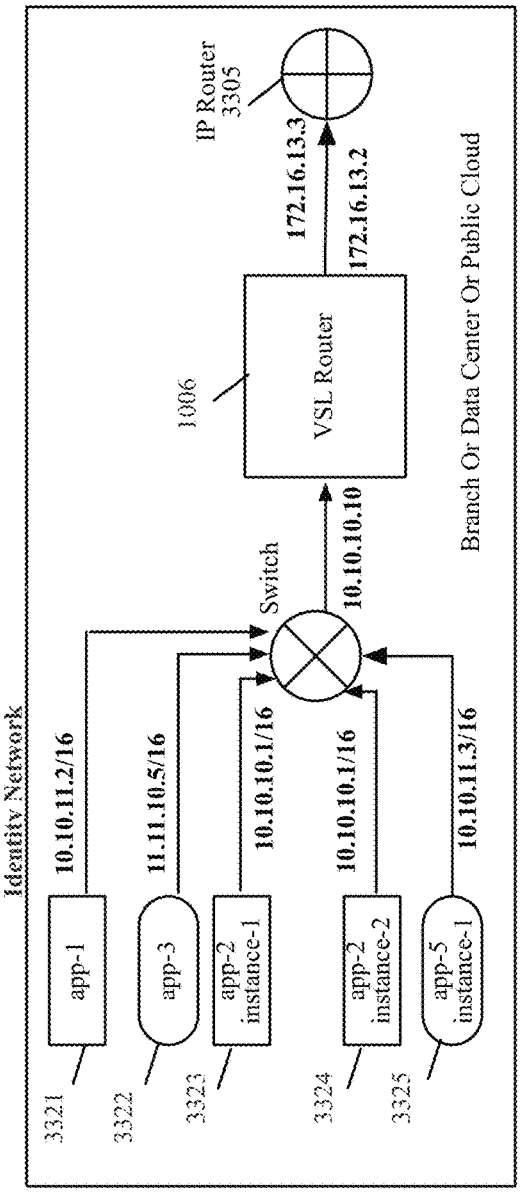
FIG. 33A is a functional diagram illustrating an example application endpoint deployment behind the VSL router, where the application endpoints are grouped in one L2 domain, without assigning VLAN information, according to various aspects of the present disclosure.
FIG. 33B illustrates the semantic configuration associated with the example of FIG. 33A, according to various aspects of the present disclosure.
Figures 33C, 33D:
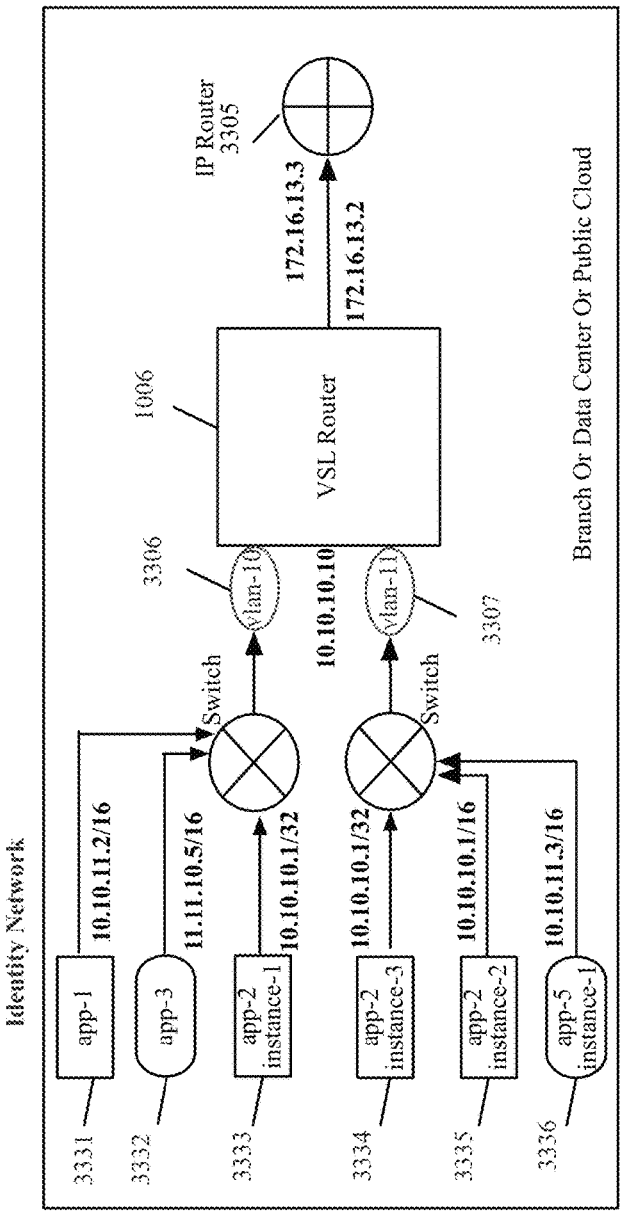
FIG. 33C is a functional diagram illustrating an example application endpoint deployment behind the VSL router, where the application endpoints are grouped under different L2 domains with assigning the VLAN to each domain and the VLAN type bundled, according to various aspects of the present disclosure.
FIG. 33D illustrates the semantic configuration associated with the example of FIG. 33C, according to various aspects of the present disclosure.

FIG. 33A is a functional diagram illustrating an example application endpoint deployment behind the VSL router, where the application endpoints are grouped in one L2 domain without assigning any VLAN information, according to various aspects of the present disclosure. The IP address 10.10.10.10 acts as the gateway address to identity network that is configured on VSL Router. The IP address 172.16.13.2 acts as locator address assigned through DHCP by the underlay network. FIG. 33B illustrates the semantic configuration associated with the example of FIG. 33A. FIG. 33C is a functional diagram illustrating an example application endpoint deployment behind the VSL router, where the application endpoints are grouped under different L2 domains with assigning the VLAN to each domain and the VLAN type bundled, according to various aspects of the present disclosure. This model is called bundled model. FIG. 33D illustrates the semantic configuration associated with the example of FIG. 33C.

With reference to FIGS. 33A-33D, the VSL router 1006 is connected to the locator network at the router 3305. FIGS. 33A and 33B show the deployment model type "no-VLAN" identity network with the VSL router. The application endpoints 3321-3325 endpoints are deployed in the identity network without any VLAN segmentation. As shown in the table 3301, the VLAN 3308 column 3308 value are specified as zero, and the VLAN type column 3309 values are specified as "none."

FIGS. 33C and 33D show the deployment model type "bundled" identity network with VSL router. FIG. 33C shows two L2 segments under the VLANs 3306 and 3307, where each VLAN is an identity network and application endpoints 3331-3336 are deployed in more than one VLAN with given identity IP/subnet addresses 1517, this VLAN type 3311 is referred to herein as the "bundled" identity network, where the table 3302 specifies the values in the columns VLANs 3310 and VLAN type 3311 as "bundled." Consumer application endpoint identity subnet addresses may repeat in different VLANs and provider identity IP address may repeat in the same VLAN and across VLANs. At each application endpoint in identity networks 3306 and 3307 for all identity IP/subnet addresses, the ARP reply is turned off by a method such as, for example, and without limitations, applying ARP filter table. For each deployment model type, the VSL router 1006 acts as the L3 gateway with the gateway IP address of 10.10.10.10 and also as the L2 proxy gateway. The gateway IP address, and gateway MAC address are uniform across the VSL deployment. In the deployment models shown in both FIGS. 33A and 33C, the VSL router does not assign IP addresses by the DHCP, application endpoints IP/subnet addresses have to be configured by network administrator.

Figures 34C, 34D:
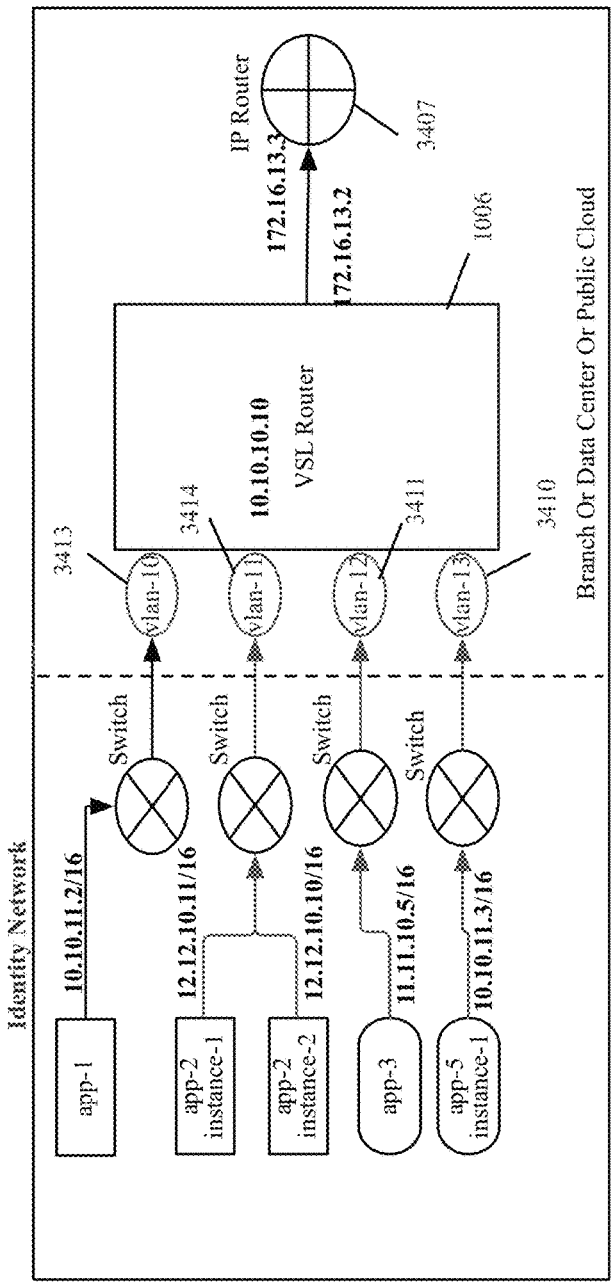
FIG. 34C is a functional diagram illustrating an example application endpoint deployment behind the VSL router, where a single application is deployed in an L2 domain tagged with specific VLAN and provider application instances is assigned subnet prefix IP addresses, according to various aspects of the present disclosure.
FIG. 34D illustrates the semantic configuration associated with the example of FIG. 34C, according to various aspects of the present disclosure.

FIG. 34A is a functional diagram illustrating an example application endpoint deployment behind the VSL router, where a single application is deployed in an L2 domain tagged with the specific VLAN. FIG. 34B illustrates the semantic configuration associated with the example of FIG. 34A. FIG. 34C is a functional diagram illustrating an example application endpoint deployment behind the VSL router, where a single application is deployed in an L2 domain tagged with specific VLAN and provider application instances is assigned subnet prefix IP addresses. FIG. 34D illustrates the semantic configuration associated with the example of FIG. 34C.

FIGS. 34A-34D continue the descriptions of FIGS. 33A-33D, providing further details of identity network deployment models with the VSL router 1006 connected to the locator network at the router 3407. FIG. 34A and the configuration table 3401 show the deployment model type "isolated" identity network with the VSL router, where the configuration table 3401 specifies the values of the columns VLAN 3403 and VLAN type 3404 as "isolated." As shown in FIG. 34A, each application is assigned one or more non-overlapping set of VLANs and the corresponding application endpoints are deployed only in those assigned VLANs. The provider application endpoint identity IP addresses may repeat within the VLAN and across the VLANs. The consumer application endpoint identity subnets addresses may not repeat in a VLAN and may repeat in different VLANs. The VSL router assigns IP addresses from the identity IP/subnets 1517 using DHCP to application endpoints deployed at respective VLANs. FIG. 34C and the configuration table 3402 shows the deployment type "isolated" subnet model identity network with VSL router, which is similar to the embodiment of FIG. 34A and the configuration table 3401, except that the table 3402 column 1517 defines identity subnet for the provider endpoint along with the identity IP address. In such case, the VSL router may assign only identity subnet addresses to the provider endpoints using DHCP and subnets addresses may not repeat in the same VLAN and may repeat across VLANs. As stated above, at each application endpoint in identity networks 3410-3414 for all identity IP/subnet addresses, the ARP reply is turned off by a method such as, for example, and without limitations, applying ARP filter table. For each deployment model type, the VSL router 1006 acts as the L3 gateway and L2 proxy to identity network with the gateway IP address 10.10.10.10 and the gateway MAC address uniform across the VSL deployment.

F. VSL Endpoint Route Derivation and VSL Data Plane Tables

Figures 35A, 35B:
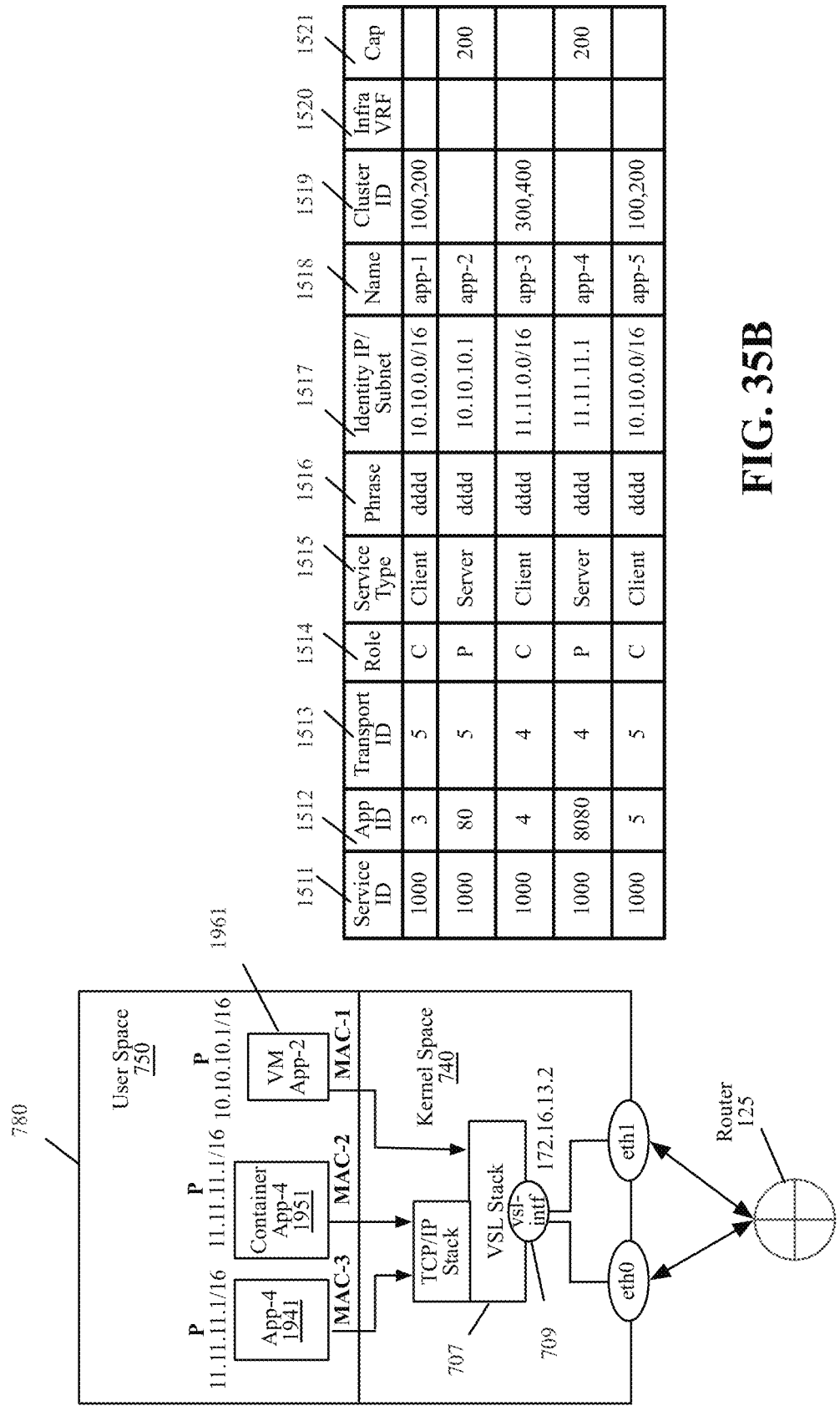
FIG. 35A is a functional diagram illustrating an example of VSL endpoint route generation, according to various aspects of the present disclosure.
FIG. 35B is the configuration table and FIGS. 35C-35E provide examples of the VSL route attributes values derived based on application endpoint deployment with the VSL stack, according to various aspects of the present disclosure.

FIG. 35A is a functional diagram illustrating an example of VSL endpoint route generation, according to various aspects of the present disclosure. FIG. 35B is the configuration table and FIGS. 35C-35E provide examples of the VSL route attributes values derived based on application endpoint deployment with VSL stack 707, according to various aspects of the present disclosure. With reference to FIGS. 35A-35E, the VSL endpoint route information 3534 represents the container application endpoint 1951, the VSL endpoint route information 3535 represents application endpoint 1941, and the VSL endpoint route information 3536 represents the VM application endpoint 1961.

The VSL protocol uses Multiprotocol BGP (MP-BGP) EVPN address family route type to publish application endpoint route. All VSL endpoint routes 3534, 3535, and 3536 are MP-BGP EVPN route type 2 format. Considering the endpoint route information 3534 as an example, the attributes from 3501 through 3515 are standard MP-BGP EVPN route type 2 attributes and the attributes from 3516 through 3521 are VSL attributes. The attribute 3501 indicates MP-BGP EVPN address family of the route. The attribute 3502 defines next hop IP address in order to reach endpoint given in this route, the VSL protocol derives the next hop IP value from the vsl-intf 709 IP address, which is called termination endpoint (TEP) IP.

The attribute 3503 defines route type of the EVPN address family. The attribute 3504 defines route distinguisher (RD), which is used to separate IP address from other VRFs, the VSL Protocol derives the value of this field based on application endpoint service ID 1511, and transport ID 1513 which, similar to the VAID, is derived (described above with reference to FIG. 22). The VSL protocol allocates 4 bytes of the RD to the VAID and 2 bytes to the Autonomous System (AS). The attribute 3505 Ethernet segment identifier is used to define uplink information and is reserved for future purposes by the VSL protocol. The attribute 3506 Ethernet tag is used to represent the VLAN associated with the L2 MAC. The VSL protocol uses this field to communicate in which VLAN application endpoint L2 MAC address is residing.

The attribute 3507 Mac address length defines the length of the MAC value as per EVPN address family route type 2. The VSL protocol uses this as per EVPN address family route. The attribute 3508 MAC address stores the L2 address of the endpoint as per EVPN address family route type 2. The VSL protocol derives the L2 Mac address "MAC-2" of the application endpoint 1951 from the control messages, such as, ARP, PING, and DHCP. The attribute IP address length 3509 defines the length of the IP address field as per the EVPN address family route type 2. The VSL protocol defines the length of the value based on the IPv4/IPv6 address type.

The attribute 3510 IP address defines the endpoint IP address as per EVPN address family route type 2. The VSL protocol derives the IP address of the application endpoint 1951 from the control messages, such as, ARP, PING, DHCP. The value of this IP address should be matched to identity the IP/subnet 1571 of the application as given in the service semantic configuration. The attribute 3511 MPLS label defines the datapath VRF identifier as per EVPN address family route type 2. The VSL protocol derives the datapath equivalent of the VRF identifier as the VSL header VAID as defined above with reference to FIG. 22B.

The attribute extended route target (RT) 3512 defines the namespace to import and export routes across VRFs as per MP-BGP. The VSL protocol derives the RT value similar to the RD defined above to create namespace for each provider application endpoints, so that the VSL protocol at consumer endpoints creates import policy on the RT for the required provider applications. The RD and RT values derived are always unique across the provider applications. The attribute 3513 router MAC extended community holds the gateway MAC address as per EVPN address family route type 2. The VSL protocol leaves this field untouched. The attribute 3514 extended community MAC mobility defines the semantics of mobility of the L2 endpoint across networks. The VSL protocol uses community MAC mobility attribute as per standards to implement L2 endpoint mobility across the networks. The implementation uses sequence number associated to the endpoint route given for the MAC address 3508, 3522, 3525. When an L2 endpoint is moved to another VSL stack/VSL router location, the MAC address associated with that endpoint is learned by the VSL control plane that recognizes that there is already an endpoint route with this learned MAC address and emits the endpoint route from its location with the sequence number incremented. All VSL stacks receive the endpoint route with the new location of the MAC address and see a conflict with their local route information and resolve by comparing the sequence number of the conflicting routes and picking the route information which has the highest sequence number and updating its route cache. The VSL protocol derives the L2 address "MAC-2" of the endpoint 1951 from the control messages such as ARP and PING.

The attribute 3515 tunnel encapsulation defines datapath tunneling protocol to use to communicate to the VSL endpoint. The VSL protocol uses VXLAN as datapath protocol. The attribute 3516 is the VSL control plane defined vendor specific attribute VSL-RLOC, which gives the public IP and port (NAT-IP:Port) representing internal VSL endpoint 780 behind NAT from where this VSL route is emitted. The attribute 3517 is the VSL control plane defined vendor specific attribute VSL-LLOC, which gives internal IP address representing VSL endpoint 780 from where this VSL route is emitted. The attribute 3518 is the VSL control plane defined vendor specific attribute VSL-capacity, which gives value of how much capacity the provider application endpoint is capable of handling, i.e., the number of requests per second, this value is derived from service semantic config 1510 given in column 1521. The VSL route server, based on peering type with its next hop VSL route server, retains one of the attributes in the VSL route, either VSL-RLOC or VSL-LLOC and deletes the other attribute. The VSL route server retains VSL-RLOC attribute, when peering is eBGP, otherwise retains VSL-LLOC attribute, when peering is iBGP and forwards to next hop VSL route server.

The attribute 3519 is the VSL control plane defined vendor specific attribute VSL-Key, which defines the application specific public key used to validate the route and retrieves the session key 3520 with corresponding private key, the session key 3520 establishes session at consuming VSL endpoint. This VSL-Key value is generated by TSM (As described with reference to FIG. 41) using the passphrase 1516 value defined in service semantic config 1510 for that provider application endpoint. The attribute 3520 is the VSL control plane defined vendor specific attribute VSL-session-key, which gives the session key used for VSL application endpoint VRF sessions 3203 to establish communication between consumer and provider only applications. The session key is generated by the VSL protocol for each provider application VSL endpoint route. The VSL protocol rotates the session key for each provider application, by updating the VSL endpoint route periodically. The session key is encrypted with the application specific public key.

The attribute 3521 is the VSL control plane defined vendor specific attribute VSL-Flags, which defines various properties of provider application endpoint, such as, cluster priority, uplink priority, end-to-end functions, and path set functions. The cluster priority defines priority of this application instance endpoint (as described with reference to FIG. 15). The uplink priority property defines priority of the uplink path on which the application endpoint route is received (as described further below, this priority is defined by the route policy on that uplink). The end-to-end functions property defines type of functions to apply between consumer and provider endpoint, the value of this field is set at provider endpoint when emitting route based on service path config 1558. The path set functions property defines type of functions to apply based on uplink path where route is received from. This field is the function of the path, modified by the route policy. The VSL-Flags field width is 48-bits, where bit 0 that defines the VSL endpoint route is received from the VSL route server 126. Bit 1 that defines the VSL endpoint route is received from the underlay router 125, bits 2-9 defines cluster priority, bits 10-17 defines uplink priority, bits 18-27 defines end-to-end functions, bits 28-37 defines path set functions, and bits 38-47 are unused and for future purposes. The attribute VSL-Flags properties, uplink priority and path set functions, are set and modified by route policies at VSL route server 126 only, as VSL attributes are understood and interpreted only by VSL route server. By default, encryption is enabled on communication between application endpoints, by setting encryption capability bit in end-to-end functions/path functions, encryption may be disabled.

With further reference to FIGS. 35A-35E, similar to what was as defined above, the VSL endpoint route 3535 represents the application instance endpoint 1941. All attributes explanation given above applies to all VSL endpoint routes. With respect to 1941 application endpoint, the VSL endpoint route 3535 changes attribute values 3522 MAC Address to MAC-3, and 3523 MAC Mobility to MAC-3, the rest of the attributes including the VSL attributes retain the same values as the VSL endpoint route 3534 because both routes 3534 and 3535 represent the same application but are two different endpoint instances.

With continued reference to FIGS. 35A-35E, the VSL endpoint route 3536 represents application instance endpoint 1961. All attributes explanation given above applies to all VSL endpoint routes. For different application endpoint certain attribute values of the VSL endpoint route differ. With respect to 1961 application endpoint at the VSL endpoint 780, the VSL protocol derives the following attributes for the VSL endpoint route 3536 that differ from another VSL endpoint routes. The attribute 3524 route distinguisher value is derived (as described above) based on the provider application, the RD value would be different for each provider application. The attribute 3525 MAC address "MAC-1" of an application endpoint 1961 is derived by the control messages ARP, PING, and DHCP. The attribute 3526 IP address of an endpoint associated with "MAC-1" is derived by the control messages ARP, ICMP, and DHCP.

The attribute 3527 MPLS label is derived based on service semantic config 1510, similar to the VAID as described above with reference to FIG. 22B. The attribute 3528 extended route target is derived from service semantic configuration as defined above. The attribute 3529 extended MAC mobility copies the MAC address value "MAC-1" from the MAC address attribute 3525. The attribute 3530 VSL-capacity is derived from service semantic configuration 1510 given in column 1521 for that service. The attribute 3531 VSL-Key is derived as defined above from passphrase 1516 column of service semantic configuration 1510 defined for that service. The attribute 3532 VSL-session-key is generated by the VSL protocol for each VSL endpoint route and encrypted using the VSL-Key (the public key). The attribute 3533 VSL-flags are derived as defined above and will be specific to provider application endpoint.

Figures 36A, 36B:
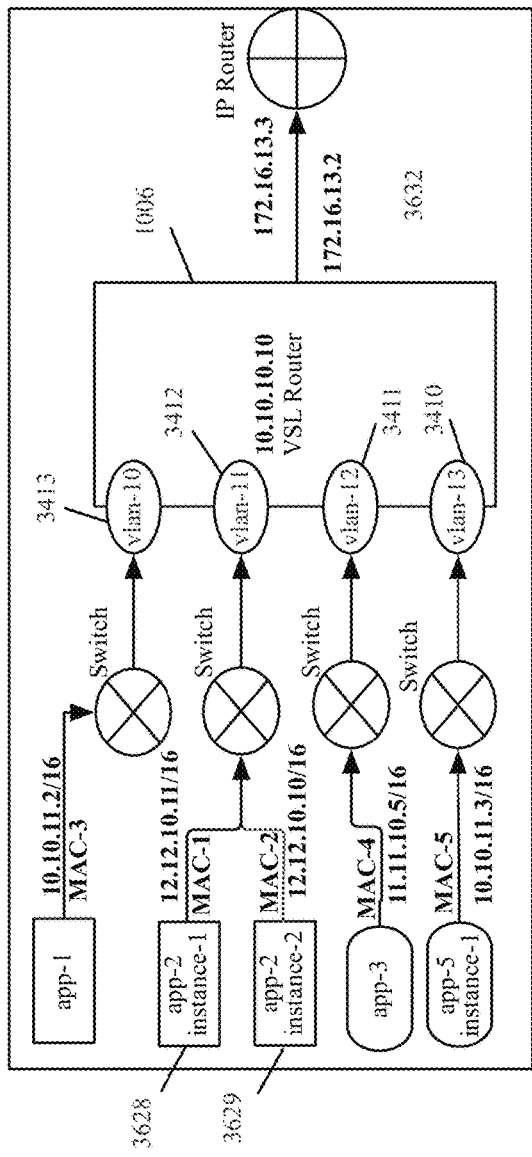
FIG. 36A is a functional diagram illustrating an example of the VSL endpoint route generation, according to various aspects of the present disclosure.
FIG. 36B is the configuration table and FIGS. 36C and 36D provide examples of the VSL route attributes values derived based on application endpoint deployment with VSL router, according to various aspects of the present disclosure.

FIG. 36A is a functional diagram illustrating an example of the VSL endpoint route generation, according to various aspects of the present disclosure. FIG. 36B is the configuration table and FIGS. 36C and 36D provide examples of the VSL route attributes values derived based on application endpoint deployment with VSL router 1006, according to various aspects of the present disclosure.

With reference to FIGS. 36A-36D, the VSL endpoint route information 3630 represents the application endpoint 3628 and the VSL endpoint route information 3631 represents the application endpoint 3629. Both application endpoints 3628 and 3629 represent different instances of the same application APP-2 as per configuration table 3402. All route attributes explanation given above with reference to FIGS. 35A-35E apply to the VSL endpoint routes in FIGS. 36C-36D. The VSL protocol at the VSL router 1006 employs the same methods as explained above for the VSL endpoint routes 3534, 3535, 3536 to derive route attributes values. The followings describe, based on the topological deployment, how the VSL protocol at the VSL router, considers various endpoints information and maps to route attributes values as part of derivation process.

The attribute 3602 next hop value is derived from the IP address 3632 assigned to the VSL router in the locator network. The attribute 3606 Ethernet tag value indicates the L2 domain 3412 assigned to the application endpoints from the column VLANs 3403 of the identity network configuration table 3402. The attribute MAC Address 3608 value "MAC-1" of the application endpoint 3628 is derived for the VSL endpoint route 3630 and the MAC Address 3622 value "MAC-2" of the application endpoint 3629 is derived for the VSL endpoint route 3631. The attribute, IP address 3610 value "12.12.10.11" of the application endpoint 3628 is derived for the VSL endpoint route 3630. The IP Address 3623 value "12.12.10.10" of application endpoint 3629 is derived for the VSL endpoint route 3631. The attribute, MAC mobility values for 3614 and 3624 are derived from their respective MAC addresses attributes 3608 and 3622.

The VSL protocol defined vendor specific VSL attributes are constructed with the following properties and types. All MP-BGP route attributes have well defined properties and type value to identify attribute at routers for processing. The first property of the route attribute indicates whether the attribute is "well known" attribute which may be interpreted by the next hop router to process or is "optional," where it may be ignored. The second property indicates whether the attribute is "transitive" to indicate attribute should be forwarded to neighbors as part of the route or "non-transitive" to indicate attribute should be dropped and not forwarded to the neighbors as part of the route. The VSL attributes have properties of "optional" and "transitive" with type value 255. The type value 255 is known for experimental attribute not recognized by any router as per standards. The VSL attributes are implemented as type length value (TLV) under MP-BGP path attribute type 255, with "optional" and "transitive" as properties.

Figure 37A:
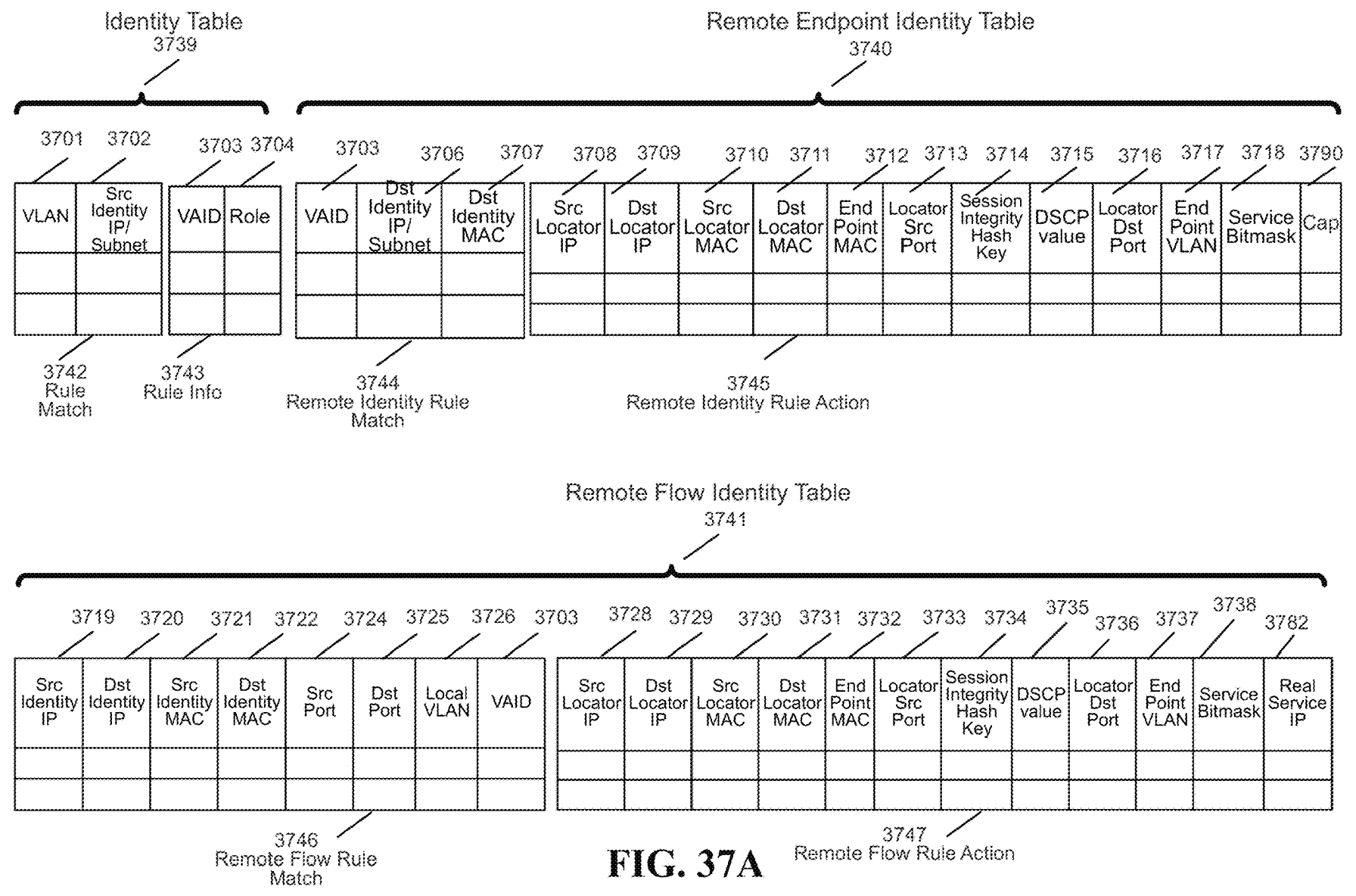
Figure 37B:
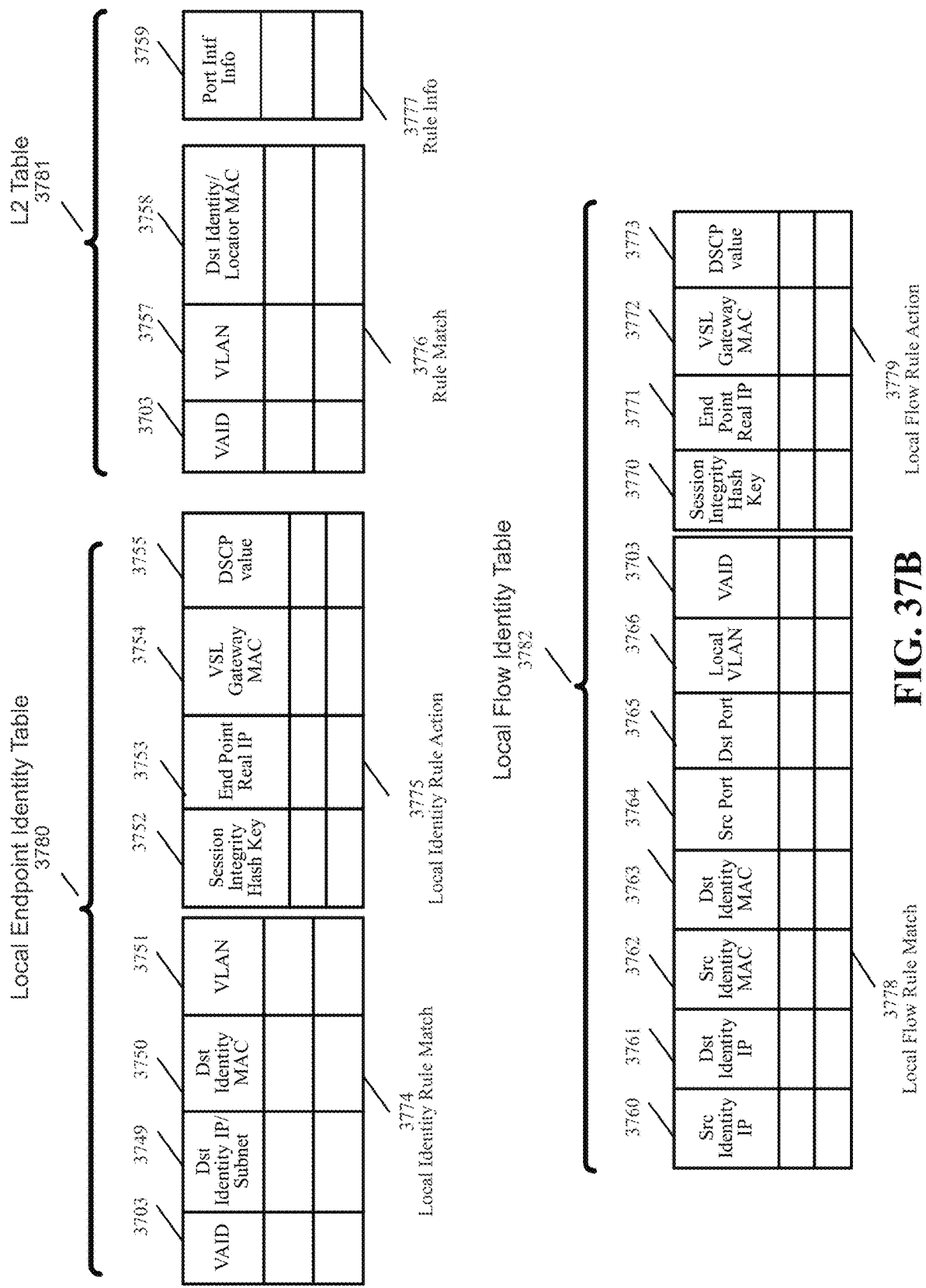

FIGS. 37A-37B illustrate the VSL data plane tables that implement packet forwarding to/from the application endpoints deployed at the VSL endpoints/VSL routers, according to various aspects of the present disclosure. The VSL data plane includes the identity table 3739, the remote endpoint identity table 3740, the remote flow identity table 3741, The local endpoint identity table 3780, the local flow identity table 3782, and the L2 table 3781. These tables form a pipeline for the VSL data plane. Each packet is processed in stages by looking up in tables linearly based on the packet direction as described below with reference to data flow diagrams.

Each rule in the tables includes two tuples (a tuple is a set of fields), match tuple and action or info tuple. A match tuple, the values of which are derived from the packet, matches the packet to a rule in the table and retrieves the corresponding action tuple and applies the action tuple on the packet. An action tuple modifies the packet by updating the existing headers in the packet or encapsulates new headers to the packet.

The info tuple is used for information retrieval. If packet is not matched with any rule in the table, depending on stage of processing either packet is dropped or looked up in other table. Identity Table 3739 is single table in VSL data plane which holds (stores) identity information of application endpoints. Remote Endpoint Identity Table 3740 can be one or more instances implementing tuple space search. A tuple space search defines a table instance based on the number of the fields in the match tuple of a rule and the width of each field (mask) in the match tuple. The remote endpoint identity table 3740 defines the tuple space search based on the width of the identity IP/subnet 3706 and holds (e.g., stores) the remote endpoints locator (reachability) and service information.

The remote endpoint identity table 3740 with respect to the load balancing of flows for service endpoints is implemented as exact match tuple space search (EM-TSS). For each provider application type, a tuple space table may be created with the tuple [VAID 3703, IP/Identity 3706, Dst Identity MAC 3707], where the VAID 3703 and the IP/identity 3706 fields are assigned specific value rather than mask. For all producer endpoints with the same identity IP value and the VAID value, the locator information resides in the corresponding table instance. The identity IP 3706 value may match to values given in the service semantic table 1510 identity IP/subnet column 1517. In other words, for each service provider application type, a separate remote identity table 3740 instance is created in the data plane. Moreover, there may be many service provider application type instance tables created, where each instance table is given a priority as property, so that highest priority table is chosen to connect to provider endpoints of that application type. The priority of the provider application endpoint is given in the VSL route attribute VSL-flags as described above. To load balance the flows, the remote identity table 3740 with specific tuple match values is implemented as consistent hashing. The consistent hashing is a standard concept used in load balancer nodes to distributed traffic on multiple endpoints equally. Two important properties of the consistent hashing are that changes in the table (number of endpoints) does not affect mapping of flows to an endpoint and minimizes the impact of binding a greater number of flows to a specific endpoint. The present embodiments use this concept to implement load balancing of flows to the provider endpoints. The number of flows assigned to the provider application endpoint is determined based on the capacity reserved at the provider endpoint as described below. Moreover, for the provider endpoints of type generic, as defined in the service semantic table 1610, where load balancing is not needed, the remote identity table 3740 is implemented as standard TSS, where the tuple is defined on mask.

The local endpoint identity table 3780 may be one or more instances implementing the tuple space search. For the subnet addresses, the identity IP/subnet 3749 field width defines the local endpoint identity table 3780 instances. For Identity IP addresses, for each provider application type, an exact match tuple space search table may be created with the tuple [VAID 3703, Identity IP/subnet 3749, Dst Identity MAC 3750, VLAN 3751], where VAID 3703, Identity IP/Subnet 3729, and VLAN 3751 fields are assigned specific value rather than mask (width of fields). The local endpoint identity table 3780 holds (e.g., stores) the local endpoints information that are deployed at the VSL endpoint/VSL router. The remote flow identity table 3741 and the local flow identity table 3782 are single tables that hold (e.g., store) the flow rules derived from the remote endpoint identity tables 3740 and the local endpoint identity tables 3780. The L2 table 3781 is a single table that holds (e.g., stores) the information of the MAC VRF and the ports associated with the MAC VRF. The ports information identifies from which port the MAC endpoint may be reached.

With further reference to FIGS. 37A-37B, the pipeline processing is divided into stages based on the packet being processed at which table. The flows ingress from the identity network are treated as Tx path with respect to the local application endpoints (endpoint deployed in the identity network at the VSL endpoint/VSL router) communicating with the remote endpoints. The flows ingress from the locator network are treated as the Rx Path with respect to the remote application endpoints communicating with the local endpoints.

The Tx path pipeline processing goes through the identity table 3739, the remote flow identity table 3741, the remote endpoint identity table 3740, and the L2 table 3781. The Rx Path pipeline processing goes through the L2 table 3781, the local flow identity table 3782, and the local endpoint identity table 3780. The identity table 3739 match tuple 3742 (VLAN 3701, Src identity IP/subnet 3702) values are derived from the service semantic configuration 1510 and the identity network configurations 3301, 3302, 3401, and 3402. For non-VLAN packets from the identity network the value of the VLAN field 3701 in the match tuple 3742 is 0 (zero). Once a rule is matched in the identity table 3739, the associated rule info 3743 (VAID 3703, role 3704) is retrieved for further processing in the pipeline. The rule info 3743 gives datapath identifier information (e.g., the service VRF) for forwarding to the correct application endpoints. If no rule is matched in the identity table 3739, then the packet may be dropped.

The remote endpoint identity table 3740 match tuple 3744 (VAID 3703, Dst identity IP/subnet 3706, Dst identity MAC 3707) most values are received from the VSL endpoint route. As described above with reference to FIGS. 35A-35E, the VSL endpoint route 3534, the attribute MPLS label 3511 value is copied into the VAID 3703, the attribute IP address 3510 is copied into the Dst identity IP/subnet 3706, and the Dst identity MAC 3707 is the VSL stack/VSL router gateway/proxy MAC address for the identity network.

The remote endpoint identity table 3740 action tuple 3745 (Src locator IP 3708, Dst locator IP 3709, Src locator MAC 3710, Dst locator MAC 3711, endpoint MAC 3712, locator Src port 3713, session integrity hash key 3714, DSCP value 3715, locator Dst port 3716, endpoint VLAN 3717, service bitmask 3718, capacity (cap) 3790) modifies the packet L2 header and encapsulates the VSL header/locator header adding the information from the action tuple 3745. The endpoint MAC 3712 field value represents remote application endpoint destination MAC which is received from VSL endpoint route, as given in FIG. 35 VSL endpoint route 3534, attribute MAC address 3508. The locator Src port 3713, and the locator Dst port 3716 fields are used when the VSL endpoint/VSL router is behind NAT/Internet, otherwise these field values are 0 (zero).

By default, the locator Src port 3713 value is 4500 (if VSL stack is behind NAT) and the locator Dst port 3716 value are received from the VSL endpoint route's VSL-RLOC attribute, as given in FIG. 35 VSL endpoint route 3534 attribute VSL-RLOC 3516. The session integrity hash key (SIHK) 3714 is received from the VSL endpoint route, as given in FIG. 35 VSL endpoint route 3534 attribute VSL-session-key 3520. The endpoint VLAN 3717 is received from the VSL endpoint route, as given in FIG. 35 VSL endpoint route 3534 attribute Ethernet tag 3506. service bitmask 3718 is received from VSL endpoint route, as given in FIG. 35 the VSL endpoint route 3534 attribute VSL-Flags 3521. The service bitmask 3718 is added to the 16-bits reserved field 2259 of the VSL header 2230 (FIG. 22B) so that the receiving endpoint may find out what functions are applied on the payload of the packet. The service bitmask 3718 may be used by the receiving endpoint to apply the reverse functions. The DSCP value 3715 is received from the service path configuration 1550 column DSCP 1557 and from the VSL endpoint route 3534 attribute VSL-Flags 3521 (preference is given to the VSL endpoint route). The Dst locator IP 3709 value is received from the VSL endpoint route, as given in FIG. 35 VSL endpoint route 3534 attribute VSL-RLOC 3516 (if VSL endpoint/VSL router is behind NAT) or VSL-LLOC 3517 (if the VSL endpoint/VSL router is not behind NAT). The Cap 3790 value is received once capacity is reserved at the provider application endpoint as described below (with reference to FIG. 43A-43B) to limit the number of flows towards the provider application endpoint instance in context of load balancing. The Src locator IP 3708, and the Src locator MAC 3710 is resolved by the VSL control plane from the vsl-intf 709 and programs to VSL data plane. The Dst locator MAC 3711 is the next hop MAC endpoint and is resolved by the VSL control plane based on the Dst locator IP 3709 value. The next hop MAC endpoint may be the VSL endpoint/VSL router or the router MAC address. If no rule is matched in the remote endpoint identity table 3740, the packet is dropped.

The local endpoint identity table 3780 match tuple 3774 (VAID 3703, Dst Identity IP/subnet 3749, Dst identity MAC 3750, VLAN 3751) values are derived from the local locator table 3114. When gratuitous ARP (GARP) is received from application endpoint in the identity network, the Dst identity IP/subnet 3749 is checked in the service semantic configuration's 1510 column identity IP/subnet 1517, if matches then the VAID 3703 is calculated as explained with reference to FIGS. 22A-22B. The Dst identity MAC 3750 and the VLAN 3751 is derived from the ARP and entry is created in the local locator table 3114. The local endpoint identity table 3780 action tuple 3775 (session integrity hash key 3752, endpoint real IP 3753, VSL gateway MAC 3754, DSCP value 3755) is derived by the VSL control plane from the service semantic configuration 1510 and service path config 1550 and entry is made in the local locator table 3114. The session integrity hash key 3752 is generated by the VSL control plane based on the service semantic configuration 1510.

The remote flow identity table 3741 rules are derived from two different pipeline stage processing. In the first case, where flows that ingress from the identity network are processed at the stage remote endpoint identity table 3740 lookup. For the remote endpoint identity table 3740 of type exact match tuple space search (EM-TSS) table, if the rule is matched, and the corresponding rule action 3745 column cap 3790 value is non-zero (for load balancing case), then the match tuple 3746 and the action tuple 3747 are derived. Linear probing (open addressing technique of hash table implementation) is applied in case the corresponding rule action 3745 column cap 3790 value is zero, until an endpoint with capacity is found. For the remote endpoint identity table 3740 of type tuple space search (TSS) table, if the rule is matched, then the match tuple 3746 and the action tuple 3747 are derived. The match tuple 3746 (Src identity IP 3719, Dst identity IP 3720, Src identity MAC 3721, Dst identity MAC 3722, Src port 3724, Dst port 3725, VLAN 3726, VAID 3703) is derived from the packet identity headers 2220, packet L2 header 2270, and identity table rule info 3743. The action tuple 3747 (Src locator IP 3728, Dst locator IP 3729, Src locator MAC 3730, Dst locator MAC 3731, endpoint MAC 3732, locator Src port 3733, session identity hash key 3734, DSCP value 3735, locator Dst port 3736, endpoint VLAN 3737, service bitmask 3738, real service IP 3782) is derived from the corresponding match tuple of the remote identity rule action 3745. The real service IP 3782 field in the remote flow rule action 3747 is used when the flow of communication is from the provider endpoint to the consumer endpoint and the Src IP of the identity IP header 2222 is modified to the value in the real service IP 3782. The remote flow identity tables rules do not expire nor flushed until the remote endpoint becomes inactive. Once the consumer endpoint flow is assigned to a remote locator service provider endpoint, the flow persists till the remote provider endpoint is active.

In the second case of rule derivation of remote flow identity table 3741, flows that ingress from the locator network are processed at pipeline stage local endpoint identity table 3780 lookup and if rule is matched, then the match tuple 3746 and Action tuple 3747 are derived. match tuple 3746 (Src identity IP 3719, Dst identity IP 3720, Src identity MAC 3721, Dst identity MAC 3722, Src port 3724, Dst Port 3725, VLAN 3726, VAID 3703) is derived from the packet identity headers 2220, inner packet L2 header 2270, and packet VSL header 2230 as reverse flow. The action tuple 3747 (Src locator IP 3728, Dst locator IP 3729, Src locator MAC 3730, Dst locator MAC 3731, endpoint MAC 3732, locator Src port 3733, session integrity hash key 3734, DSCP value 3735, locator Dst port 3736, endpoint VLAN 3737, service bitmask 3738, real service IP 3782) is derived from the VSL header 2230, the locator headers 2240, and the L2 header of the packet 2744 as reverse flow. The session integrity hash key 3734 and the DSCP value 3735 are derived from the corresponding local identity rule action 3775 of the match tuple 3774.

The local flow identity table 3782 rules are derived from two different pipeline stage processing. The first case, where flows ingress from the locator network are processed at stage local endpoint identity table 3780 lookup and if the rule is matched, the match tuple 3778 and the action tuple 3779 are derived. The match tuple 3778 (Src identity IP 3760, Dst identity IP 3761, Src identity MAC 3762, Dst identity MAC 3763, Src port 3764, Dst port 3765, VLAN 3766, VAID 3703) is derived from the VSL header 2230, the identity headers 2220, and the inner L2 header of the packet 2270. The action tuple 3779 (session integrity hash key 3770, endpoint real IP 3771, VSL gateway MAC 3772, DSCP Value 3773) is derived from the corresponding local identity rule action 3775 of the match tuple 3774.

The second case, where flows ingress from the identity network are processed at the stage remote endpoint identity table 3780 lookup and if rule is matched, the match tuple 3778 and the action tuple 3779 are derived. The match tuple 3778 (Src identity IP 3760, Dst identity IP 3761, Src identity MAC 3762, Dst identity MAC 3763, Src port 3764, Dst port 3765, VLAN 3766, VAID 3703) is derived from the packet identity headers 2220, the packet L2 header 2270, and the identity table rule info 3743 as reverse flow. The action tuple 3779 (session integrity hash key 3770, endpoint real IP 3771, VSL gateway MAC 3772, DSCP value 3773) is derived from the remote identity action tuple 3745, the identity headers 2220 and the L2 header of packet 2270. The VSL gateway MAC 3772 is derived from the L2 header of the packet 2270. The local flow identity table 3782 rules may be expired periodically and may go through process of derivation.

With reference to FIG. 37B, the L2 table 3781 holds entries of MAC VRFs and the associated ports that may be used to reach. The match tuple 3776 (VAID 3703, VLAN 3757, Dst identity/locator MAC 3758) gives unique definition of the MAC VRF of the service application endpoints in the identity network. The VAID 3703 with value 0 (zero) indicates the MAC VRF of endpoints in the locator network. The match tuple 3776 is derived, when the application endpoint in the identity network sends GARP or ARP, the VSL control plane learns the endpoint by validating endpoint identity IP, derives the VAID 3703 and creates the match tuple 3776 and the rule Info 3777, and adds them to the L2 Table 3781. Similarly, when the control plane receives the ARP from the locator network, the endpoints are added under the MAC VRF 0 (zero).

G. VSL Data Plane Flow Charts and VSL Control Plane Flow Chart

Figure 38A:
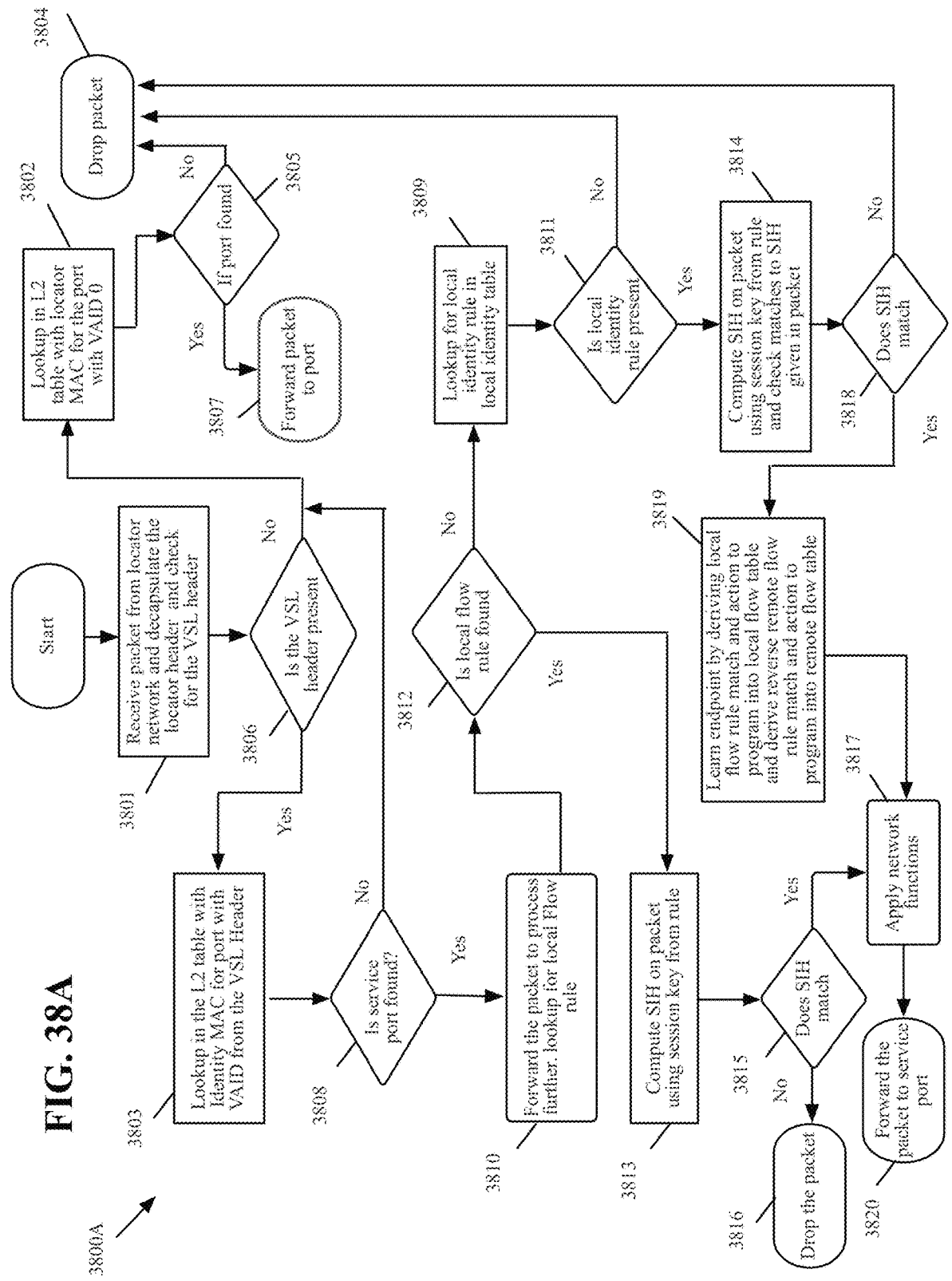
FIG. 38A is a flowchart illustrating an example process for the VSL data plane Rx path execution flow, according to various aspects of the present disclosure.

FIG. 38A is a flowchart illustrating an example process 3800A for the VSL data plane Rx path execution flow, according to various aspects of the present disclosure. With reference to FIG. 38A, the process 3800A, in some embodiments, may be performed by a processor of a network node that includes the VSL stack. The Rx path of the VSL data plane is where the packets are ingressing from the locator network.

With reference to FIG. 38A, at block 3801, a packet may be received by the VSL data plane, the locator header 2240 (FIG. 22A) may be decapsulates, and data the size of the VSL header 2230 (FIG. 22A) may be retrieved.

Next, a determination may be made (at block 3806) whether the retrieved data is VSL header 2230 (FIG. 22A). For example, the 12-bits start indicator 2251 (FIG. 22A) field may be checked. If the retrieved data is not the VSL header, the process 3800A may proceed to block 3802, which is described below.

Otherwise, a lookup in the L2 table 3781 may be made (at block 3803) using the VAID and the Dst MAC address from the L2 header 2270 (FIG. 22A) to retrieve the port information. A determination may be made (at block 3808) whether the service port is found in the L2 table. If yes, the process 3000A may proceed to block 3810, which is described below. Otherwise, a lookup in the L2 table 3781 may be performed (at block 3802) using the VAID 0 (zero) and Dst MAC address from the outer locator MAC header to retrieve the port information. Next, a determination may be made (at block 3805) whether the port information is found. If yes, then the packet is forwarded (At block 3807) to the port. Otherwise, the packet is dropped (at block 3804). From the previous process step 3806, if the result is false then next process step 3802 is executed as explained above.

When a determination is made (at block 3808) that the service port 705 is found in the L2 table, a lookup in the local flow table 3782 may be made (at block 3810). Next, a determination may be made (at block 3012) whether any local flow rule matched from the local flow table 3782 is found. If not, the process 3800A may proceed to block 3809, which is described below.

Otherwise, the SIH on the packet payload and headers 2210, 2221, 2222, 2270 (FIG. 22A) may be computed (at block 3813) using the session key 3770. Next, a determination may be made (At block 3815) whether the computed SIH matches the SIH 2256 from the VSL header 2230 (FIGS. 22A-22B).

If the SIH does not match, the packet may be dropped (at block 3816). Otherwise, the network functions may be applied (at block 3817). After applying network functions, the packet may be forwarded (at block 3820) to the service port.

When a determination is made (at block 3012) that a local flow rule is not matched from the local flow table 3782, a lookup may be made (at block 3809) in the local identity table 3780 for the local identity rule 3774. Next, a determination may be made (at block 3811) whether the local identity rule 3774 is found in the local identity table 3780. If not, then the packet may be dropped (at block 3804). Otherwise, the SIH may be computed (at block 3814) on the packet payload and headers 2210, 2221, 2222, 2270 (FIG. 22A) using the session key 3752.

Next, a determination may be made (at block 3818) whether the computed SIH. matches the SIH 2256 from the packet's VSL header 2230. If not, then the packet may be dropped (at block 3804). Otherwise, the local flow rule 3778 3779 and the remote flow rule 3746, 3747 may be derived (at block 3819). For example, the local flow rule 3778 3779 and the remote flow rule 3746, 3747 may be derived as described above with reference to FIGS. 37A and 37B. Then process 3800A may then proceed to block 3817, which was described above.

Figure 38B:
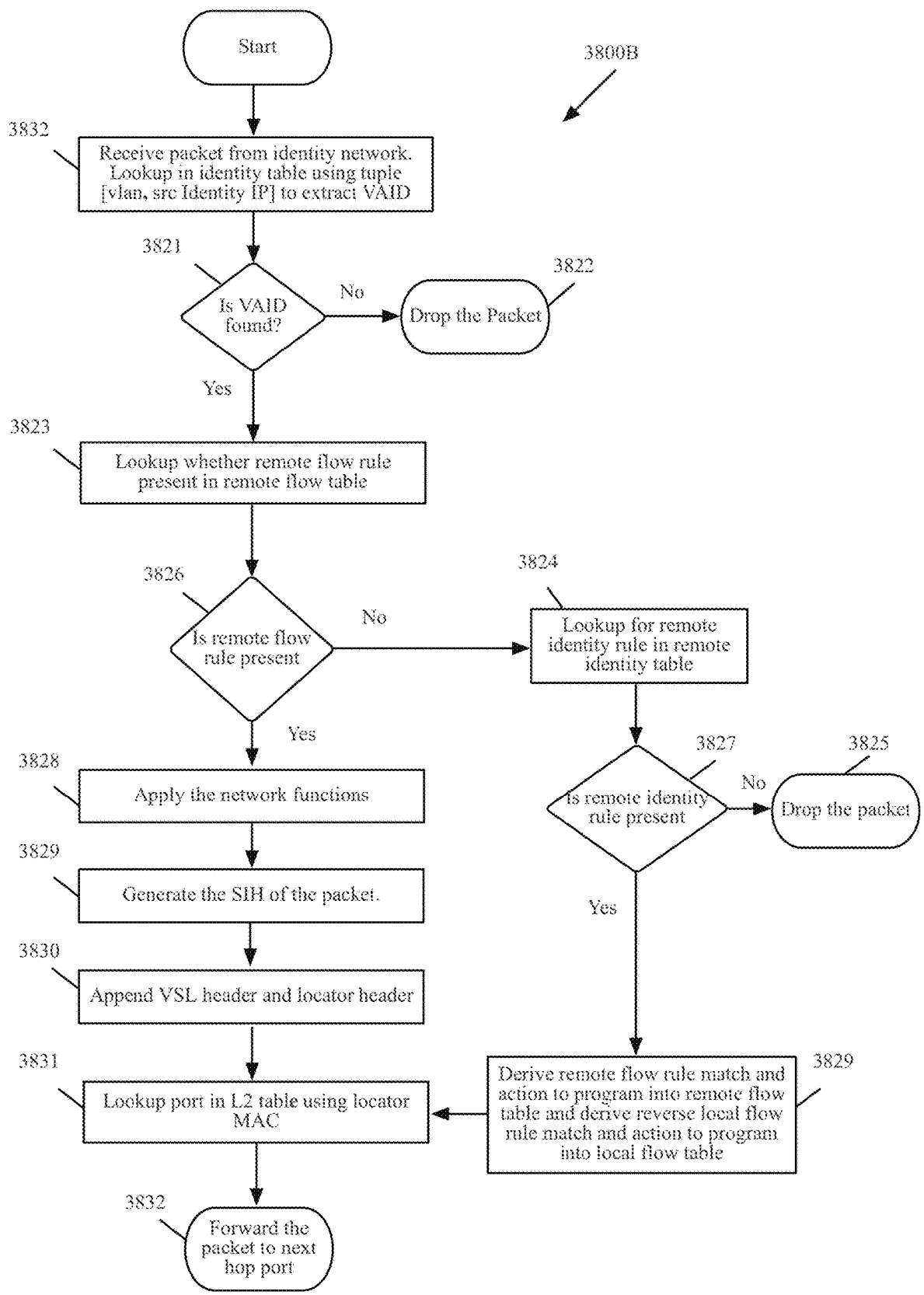
FIG. 38B is a flowchart illustrating an example process for the VSL data plane Tx path execution flow, according to various aspects of the present disclosure.

FIG. 38B is a flowchart illustrating an example process 3800B for the VSL data plane Tx path execution flow, according to various aspects of the present disclosure. With reference to FIG. 38B, the process 3800B, in some embodiments, may be performed by a processor of a network node that includes the VSL stack. The Tx path of the VSL data plane is where the packets are ingressing from identity network.

With reference to FIG. 38B, at block 3832, a packet may be received by the VSL data plane from the identity network and a lookup in the identity table 3739 is may be made to retrieve the VAID 3703 based on the source identity IP/Subnet 3702 field from the identity IP header 2222 and the VLAN 3701 field from the L2 header 2270 of the packet.

Next, a determination may be made (at block 3821) whether the VAID is found. If not, then the packet may be dropped (at block 3822). Otherwise a lookup may be performed (at block 3821) in the remote flow table 3741 for the emote flow rule 3746 match. A determination may be made (at block 3826) whether the remote flow rule 3746 is present. If not, the process 3800B may proceed to block 3824, which is described below.

Otherwise, the network functions may be applied (at block step 3828) on the packet based on the semantic service configuration 1510. The SIH 2256 may be computed (at block 3829) on the packet 2210, 2221, 2222, 2270 for the VSL Header 2230 field SIH 2256.

The packet may be encapsulated (at block 3830) with the VSL header 2230 and the locator headers 2241, 2242. A lookup may be done (at block 3831) in the L2 table 3781 with the locator Dst MAC address to retrieve the port information. The packet may then be forwarded (at block 3832) through that.

When a determination is made (at block 3826) that the remote flow rule 3746 is not present, then a lookup may be made (at block 3824) in the remote identity table 3740 for the remote identity rule 3744. A determination may be made (at block 3827) whether the remote identity rule 3744 is found. If not, then the packet may be dropped (At block 3825). Otherwise, the derives remote flow rule 3746, 3747 and the local flow rule 3778, 3779 may be derived. The process 3800B may then proceed to block 3831, which was described above.

Figure 39A:
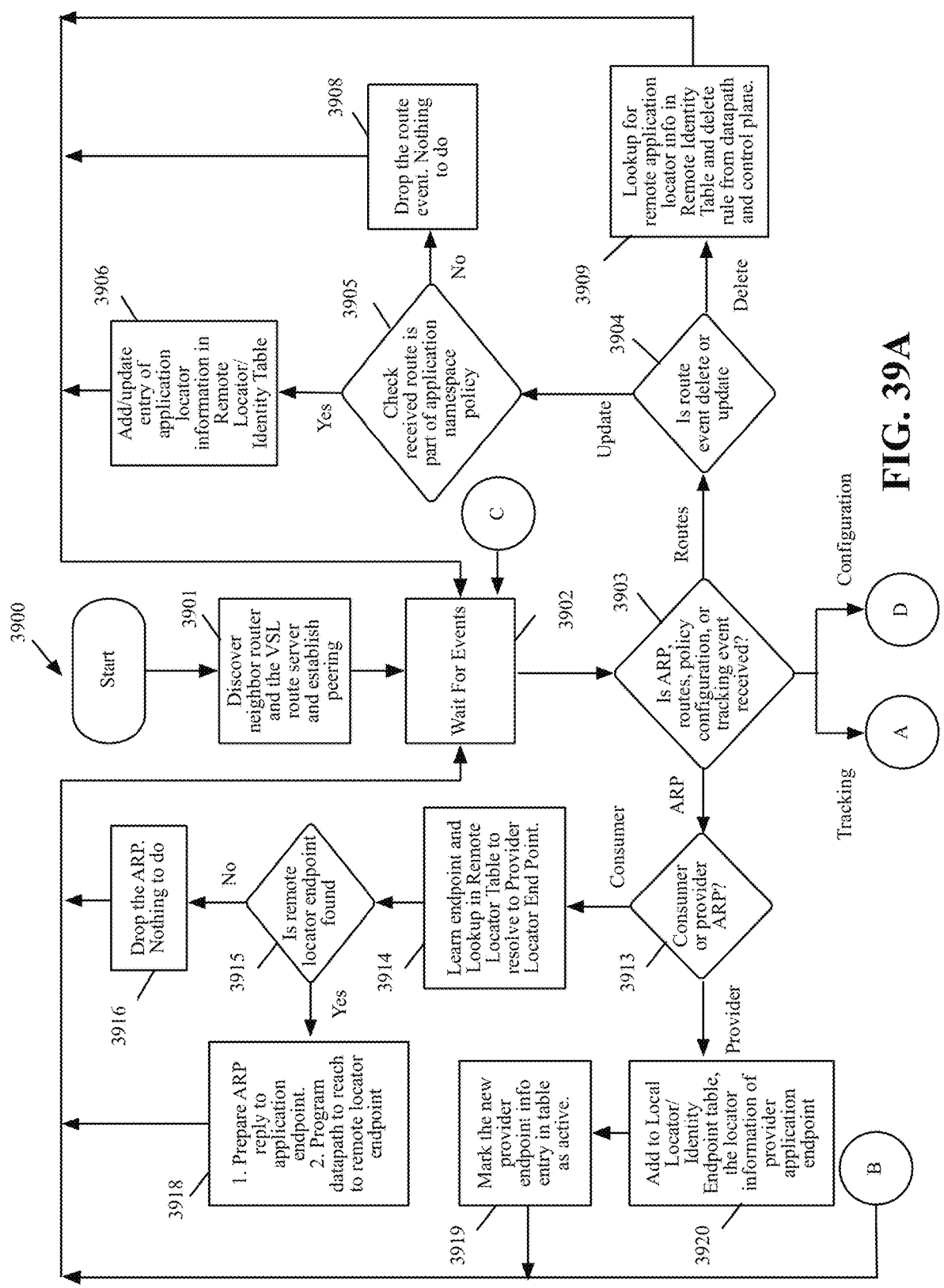
FIGS. 39A-39B are a flowchart illustrating an example process for, VSL control plane's internal working, according to various aspects of the present disclosure.
Figure 39B:
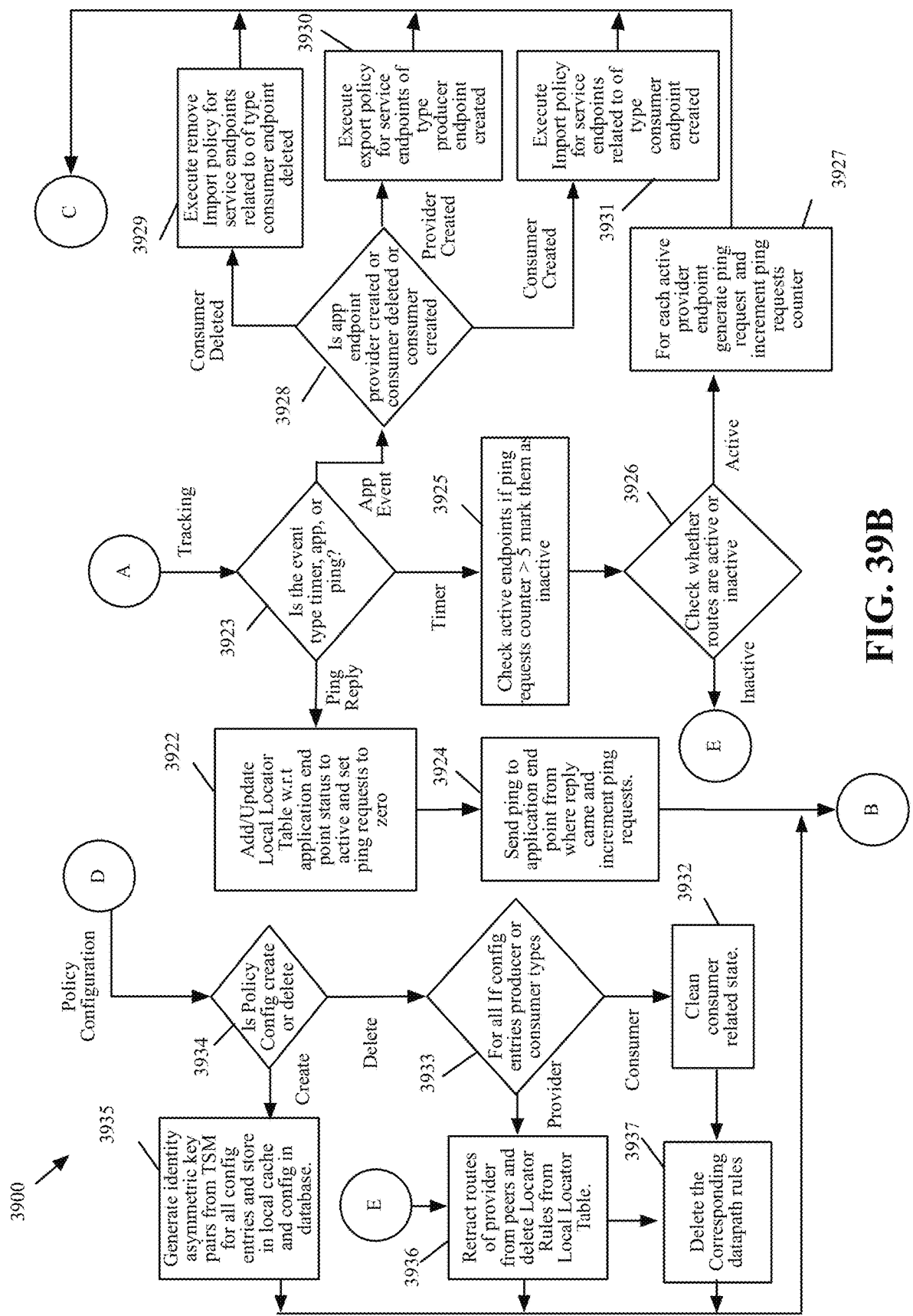

FIGS. 39A-39B are a flowchart illustrating an example process 3900 for, VSL control plane's internal working, according to various aspects of the present disclosure. The process 3900, in some embodiments, may be performed by a processor of a network node that includes the VSL stack. The VSL control plane 701, in some embodiments, is an event-based system that handles various events. The figure shows how the VSL control plane 701 processes events to implement functionality.

With reference to FIGS. 39A-39B, the neighbor underlay routers 125 and VSL Route Servers 126 may be discovered (at block 3901). For example, the VSL control plane 701 may discover the neighbor underlay routers 125 and the VSL route servers 126 using standard neighbor discovery protocols and may peer with them (as shown by 831 and 832 in FIG. 8).

The process 3900 may then wait (at block 3902) for events. When an event occurs, to handle the event, a determination may be made (at block 3903) to know the type of event. If the event type is "route," then, a determination may be made (at block 3904) whether the route event operation is delete or update (add). When the route operation is determined (at block 3904) to be delete, a lookup may be performed (at block 3909) in the remote identity table 3740 to retrieve locator information and the remote identity rule 3744, 3745 may be deleted from the VSL data plane and the remote locator table 3111. Then process 3900 may then proceed to block 3902, which was described above.

When the route operation is determined (at block 3904) to be update, a determination may be made (at block 3905) whether the received route is part of application namespace on which import policy is executed. Import policy on application namespace is executed to receive route information of provider application as described above. When a determination is made (at block 3905) that the received route is not part of application namespace on which import policy is executed, the route may be dropped (at block 3908). The process 3900 may then proceed to block 3902, which was described above.

When a determination is made (at block 3905) that the received route is part of application namespace on which import policy is executed, at block 3906, the entry in the remote locator table 3111 and the remote identity table 3740 may be added (updated). The process 3900 may then proceed to block 3902, which was described above.

When a determination is made (at block 3903) that the event type is "ARP," a determination may be made (at block 3913) whether the ARP type is consumer or provider. When the ARP type is consumer, then the process 3900 may proceed to step 3914, which is described below. When the ARP type is provider, the process 3900 may proceed to step 3920, which is described below. To resolve the ARP type, a lookup may be made in the identity table 3739 to retrieve the role of the endpoint.

At block 3914, the process 3900 may learn the consumer endpoint MAC address and may do a lookup in the remote locator table 3111 to verify whether requested provider endpoint is present. Next, a determination may be made (at block 3915) whether the requested provider endpoint is present, i.e., learnt by the VSL control plane. When the remote locator endpoint is not found (at block 3915) the ARP may be dropped (at block 3916). The process 3900 may then proceed to block 3902, which was described above.

When a determination is made (at block 3915) that the requested provider endpoint is present, the ARP may be replied (at block 3918) with the L2 proxy address and the VSL data plane may be programmed with the remote identity rule 3744, 3745 derived from the remote locator table 3111. The process 3900 may then process to block 3902, which was described above.

When the ARP type is determined to be provider (at block 3913), an entry into the local locator table 3114 may be created (at block 3920) in the VSL control plane and the local identity table 3780 in the VSL data plane. Next, the new entry may be marked (at block 3919) as active in the local locator table 3114. The process 3900 may then proceed to block 3902, which was described above.

When a determination is made (at block 3903) that a tracking event is received, a determination may be made (at block 3923) whether the "tracking" event type is "timer," "app event," or "ping reply." When the tracking event type is "app," the type of the operation may be determined (at block 3928). When the operation is "consumer created," the import policy may be executed (at block 3931) on the namespace for the corresponding provider application to receive provider endpoints route information. The process 3900 may then proceed back to block 3902, which was described above.

When the operation is "provider created," the export policy may be executed (at block 3930) on the namespace of the corresponding provider applications to export route information. The process 3900 may then proceed back to block 3902, which was described above. When the operation is consumer deleted, the removal of the import policy may be executed on the namespace for the corresponding provider application to block receipt of provider endpoints and remove any existing provider endpoints. The process 3900 may then proceed back to block 3902, which was described above.

When the event type is determined (at block 3923) to be "timer," the local endpoint routes (Route information in Local Locator Table) may be marked (at block 3925) as active or inactive based on counter value in the route information. If the counter value is greater than a threshold value, such as, for example 5, then the local endpoint route information is inactive, otherwise active. Next, a determination may be made (at block 3926) whether local endpoint route is active or inactive. When the local endpoint is active, ping is generated (at block 3927) to the local provider endpoint in the identity network and the counter value is incremented by one. The ping may be ICMP, TCP, or any other method of knowing endpoint is active. The process 3900 may then proceed to block 3902, which was described above.

When a determination is made (at block 3926) that the route is inactive, the corresponding local provider endpoint route may be retracted (at block 3936) and deletes corresponding route information from local locator table 3114. Then process step 3937 the corresponding local endpoint route information may be deleted from the data plane. The process 3900 may then proceed to block 3902, which was described above.

When the event type is determined (at block 3923) to be "ping reply," the corresponding local endpoint may be set (at block 3922) as active and the counter of that endpoint entry may be reset to zero. The ping may be sent (at block 3924) to the provider application endpoint from where the ping reply came from and the counter may be incremented by one. The process 3900 may then proceed to block 3902, which was described above.

When a determination is made (at block 3911) that the event is "policy configuration," a determination may be made (at block 3934) whether the operation of policy is create (add) or delete (remove) of application endpoints. When the operation is "create," all identity asymmetric keys of application namespace may be generated (at block 3935) using TSM as described below and is stored in runtime database. The process 3900 may then proceed to block 3902, which was described above. When a determination is made (at block 3934) that the operation is "delete," a determination may be made (at block 3933) whether the configuration is for the provider endpoints or the consumer endpoints. When the configuration is for the provider endpoints, then process 3900 may proceed to block 3936, which was described above. Otherwise, when the configuration is for the consumer endpoints, the consumer state may be cleaned (at block 3932). The process 3900 may then proceed to block 3937, which was described above.

H. VSL Gateway Internals and TSM and VSL Control Plane Internals

Figure 40:
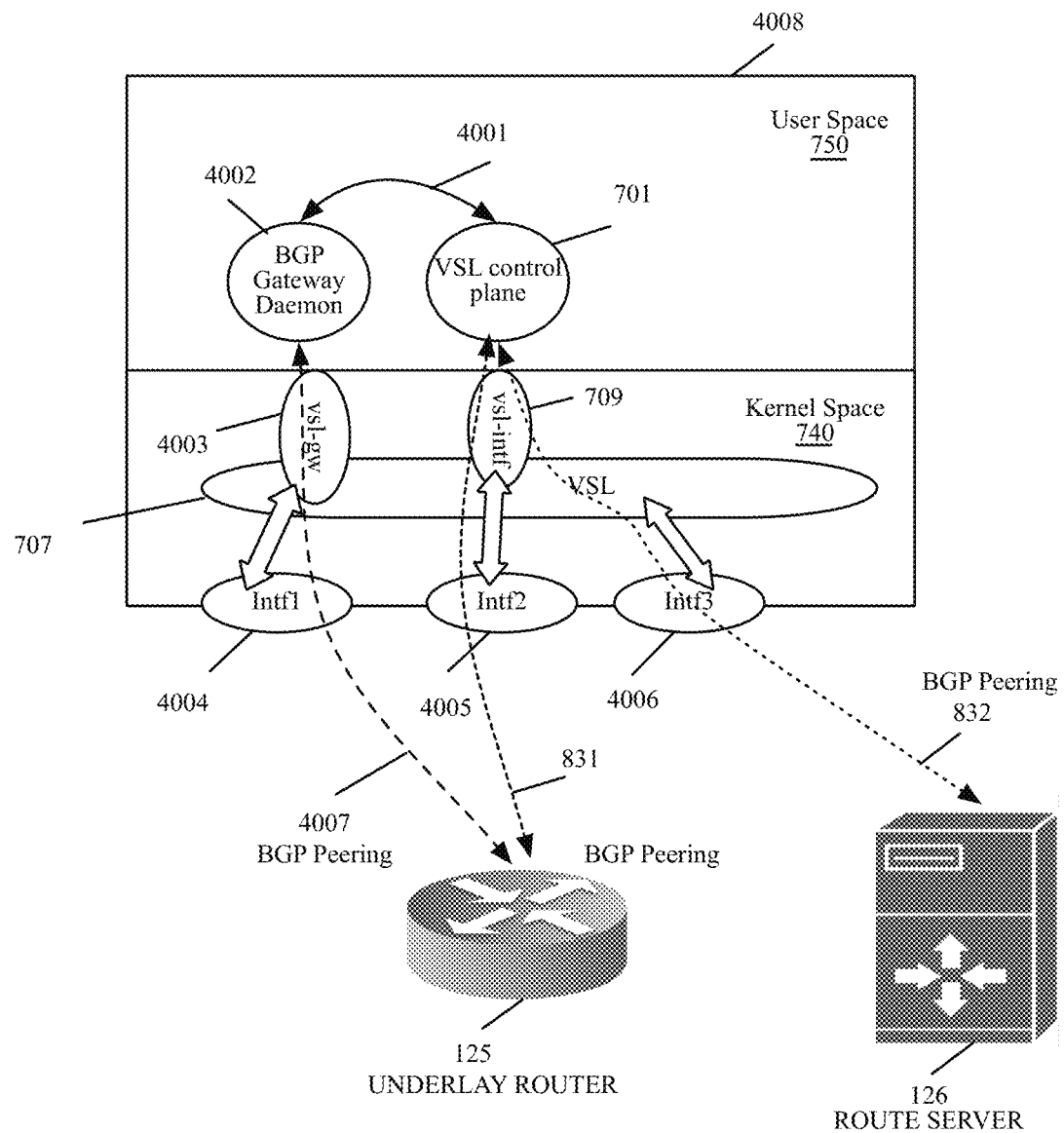
FIG. 40 is a functional diagram illustrating the VSL gateway internals and deployment model, according to various aspects of the present disclosure.

FIG. 40 is a functional diagram illustrating the VSL gateway internals and deployment model, according to various aspects of the present disclosure. The VSL gateway 4008 is a network node deployed at the edge of network facing the Internet or the endpoints that are not in the identity network. The VSL gateway 4008 includes the VSL stack 707, and the BGP gateway daemon 4002. The VSL stack 707 includes the VSL control plane 701 and the VSL data plane and the functionality is similar to what was described above.

The BGP gateway daemon 4002 may peer (as shown by 4007) with the underlay router 125 to inject the ECMP routes. The VSL gateway 4008 may contain two virtual bridge interfaces to which the physical interfaces are bonded. The first virtual interface is the VSL stack's 707 "vsl-intf" 709, which was described above. The second virtual interface, the "vsl-gw" 4003, is very specific to the VSL gateway 4008. The virtual interface "vsl-gw" 4003 may bond with one or more physical interfaces 4004 to receive traffic from the non-identity network. A non-identity network is a network which has no VSL endpoints nor has any endpoints located behind the VSL router. An example of a non-identity network is the Internet, local network connected with switches and L3 routers without any presence of VSL routers.

The BGP gateway daemon 4002 may peer (as shown by 4007) through the "vsl-gw" 4003 to the underlay routers. The BGP gateway daemon 4002 may inject service application endpoint route information (VSL routes) into the underlay routers as the ECMP route to receive traffic towards producer endpoints deployed in identity network.

The BGP gateway daemon 4002 may learn route information from the non-identity network and may interpret the endpoints in the non-identity network as consumer endpoints. The VSL control plane 701 and the BGP gateway daemon 4002 may communicate with each other by the IPC 4001 to exchange route information. The VSL control plane 701 may communicate to the BGP gateway daemon 4002 the VSL endpoint route as the ECMP route and may receive the prefix routes in the non-identity network as consumer endpoints. Once the producer and consumer semantic relation is established between the endpoints, the VSL control protocol programs the appropriate rules in the VSL data plane to establish connectivity between the endpoints as described above.

The VSL gateway 4008 may receive service semantic configuration 1510 and may learn only those service endpoints based on the semantic relation of the applications as given in the configuration. The semantic relation may define the consumer and provider relation as described above and for only those consumer endpoints the corresponding producer endpoints may be learnt. For the VSL gateway 4008, consumer definition is similar as defined in the service semantic configuration 1510, with role 1514 column value "NI-C" (non-identity consumer). The identity IP/Subnet 1517 column may define all subnets that may access service based on the semantic relation defined. If the identity IP/subnet 1517 column value is "*/all" then any endpoint in the non-identity network may access service as defined by semantic relation.

Figure 41:
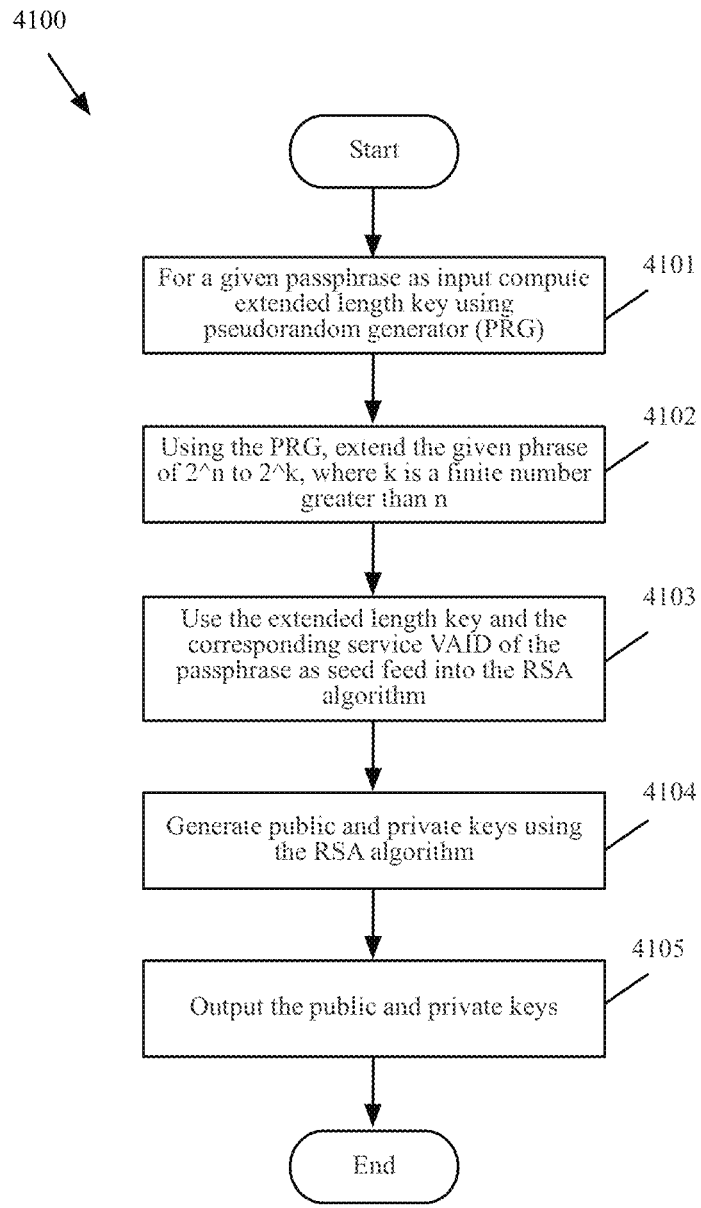
FIG. 41 is a flowchart illustrating an example VSL control plane process for generating application specific public and private key pairs used to authenticate and validate VSL route to consume at VSL endpoint/VSL router, according to various aspects of the present disclosure.

FIG. 41 is a flowchart illustrating an example VSL control plane process 4100 for generating application specific public and private key pairs used to authenticate and validate VSL route to consume at VSL endpoint/VSL router, according to various aspects of the present disclosure. The process 4100, in some embodiments, may be performed by a processor of a network node that includes the VSL stack.

With reference to FIG. 41, for a given passphrase as input, the extended length key may be computed (at block 4101) using pseudorandom generator (PRG). For example, the passphrase may be taken from the passphrase column 1516 of the semantic configuration table and may be input to the PRG. The PRG, from an input of length $2^n$, computes (at block 4102) the extended length key of $2^{n+k}$, where k>n and k is a finite number.

The PRG outputs, which are extended key lengths are random for any given input, making it computationally hard for any hacker to predict the extended key length given the key length space of $2^{n+k}$, where k is a large number. The PRGs method of extending key length is deterministic and for a given input produces the same output. The PRG deterministic behavior of generating the same output for an input, is defined by a secret seed. The possible behaviors of a PRG are based on length k.

At block 4103, the extended key length and VAID (as described above) may be input to the RSA (Rivest-Shamir-Adleman) algorithm. The RSA public key cryptography algorithm may generate the private and public keys, where the private key is hidden from, and the public key may be made visible to, the third parties. This method of asymmetric keys enables stronger crypto system and enabling many applications.

The RSA algorithm may generate (at block 4104) the private and public keys, where the private key is held private with the VSL control plane and the public key may be sent in the VSL route for the corresponding application. The RSA keys may be handed over (at block 4105) to the VSL control plane as an output. The process 4100 may then end.

VSL protocol may use other methods of generating public and private key pairs by taking passphrase as input. The above method defined is one such example that uses PRGs as the intermediate step to secure process of generating RSA keys using the passphrase.

Figure 42:
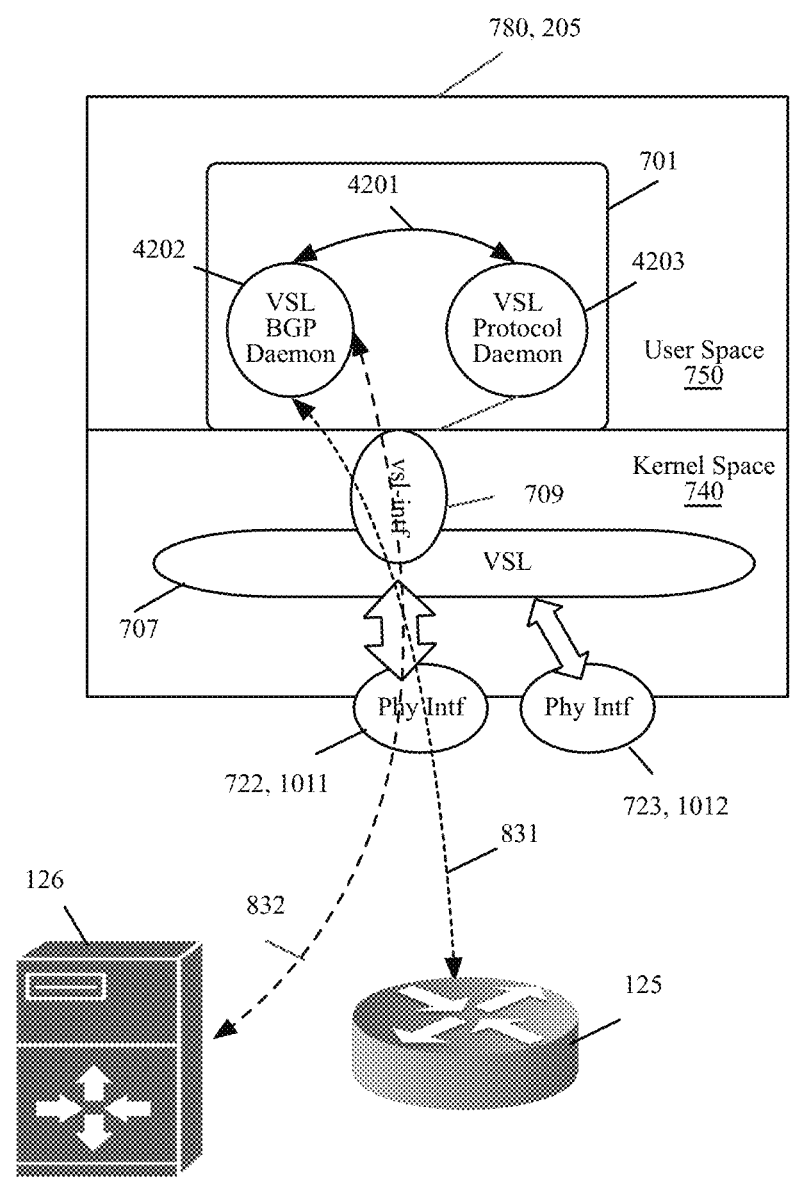
FIG. 42 is a functional diagram illustrating the VSL control plane internals, according to various aspects of the present disclosure.

FIG. 42 is a functional diagram illustrating the VSL control plane internals, according to various aspects of the present disclosure. With reference to FIG. 42, the VSL control plane 701 includes the VSL protocol daemon 4203, and the VSL BGP daemon 4202, which both communicate by inter process communication (IPC) 4201 to update and receive route information. The VSL BGP daemon 4202 may peer (as shown by 831, 832) with the underlay router 125 and the VSL route servers 126. The VSL protocol daemon 4203 may bind to the vsl-intf 709 to receive and process control messages, such as ARP, ICMP, DHCP, and any other network management messages. The rest of the diagram components and their interactions are described above.

I. VSL Capacity Reserve Protocols and VSL Path Selection

Figure 43A:
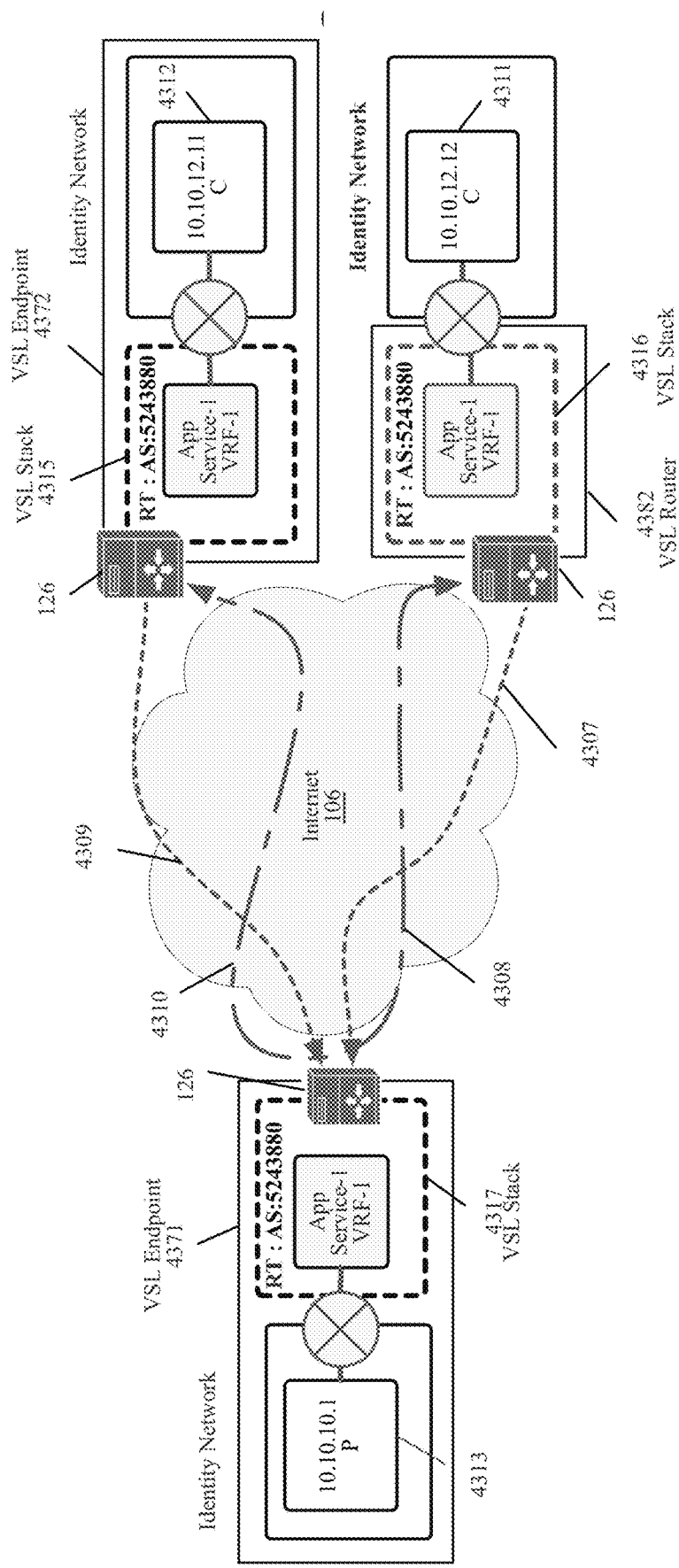
FIG. 43A is a functional diagram illustrating how the VSL endpoints and the VSL routers exchange capacity information of service provider endpoints connected over the Internet, according to various aspects of the present disclosure.

FIG. 43A is a functional diagram illustrating how the VSL endpoints and the VSL routers exchange capacity information of service provider endpoints connected over the Internet, according to various aspects of the present disclosure. With reference to FIG. 43A, the VSL endpoints 4371-4372 and the VSL router 4382 exchange capacity information of service provider endpoints as per service semantic configuration table 1510 (FIG. 15A) connected over the Internet uplinks. Similar to what described above, the deployment in FIG. 43A shows the application endpoints 4312 and 4313 at the VSL endpoints 4731-4732 and the application endpoint 4311 connected to the VSL router 4382 are connected over the Internet 106.

The VSL route server instances 126 connect over the Internet 106 to exchange the provider endpoint 4313 route information, so that the consumer endpoints 4311 and 4312 connect to the provider endpoint 4313 and access service. The service provider endpoints 4313 may process requests based on the limit of capacity they may handle. The capacity is defined by the user in the service semantic configuration 1510 column "cap" 1521 as described above with reference to FIG. 15A.

The VSL control plane 701 (FIG. 7) may reserve the capacity of provider endpoints for the corresponding consumer endpoints, so that the consumer endpoints may generate only that number of requests per second. The VSL control plane 701 implements a protocol to borrow and reserve the capacity at service endpoints to specific consumer endpoints.

The VSL control plane 701 implements distributed protocol for the endpoints connected over the Internet and unicast protocol for the endpoints connected over the private WAN. FIG. 43A depicts the distributed protocol to borrow and reserve capacity at the service provider endpoints 4313 that communicate over the Internet. The VSL control plane 701 may implement a two-way handshake protocol. The VSL control plane 701 at the VSL stack 4315 of the VSL endpoint 4372 and the VSL stack 4316 of the VSL router 4382 may send RESERVE request 4309 and 4307 to the VSL control plane 701 at the VSL stack 4317 of the VSL endpoint 4371 with capacity value to reserve.

The VSL control plane 701 of the VSL stack 4317 may send back RESERVE ACK 4310, and 4308 with capacity value to the VSL control plane 701 at the VSL stack 4315 and the VSL stack 4316 on how much capacity may be reserved for the VSL endpoints based on the availability. If the value is zero, no capacity is reserved. The VSL control plane 701 at the VSL stack 4315 and the VSL stack 4316 sends RESERVE request to other the VSL control planes 701 which have provider endpoints to reserve the required capacity to accumulate at the VSL control plane 701 for the consumer endpoints.

The VSL control plane 701 implements distributed protocol using standard BGP EVPN route type 3 route format to implement RESERVE request and RESERVE ACK acknowledge message. The VSL control plane 701 adds vendor specific attributes to communicate capacity request and capacity reserve handshake. The VSL defined attributes are VSL_CAPR, VSL_DRLOC, VSL_SRLOC, VSL_SLLOC, VSL_FLAGS, VSL_VAID, VSL_SEQ. The VSL_CAPR is the VSL capacity requested/reserved the meaning of field is interpreted based on message type. The VSL_DRLOC is the VSL destination remote location public IP address and port received from the VSL route as described above, the VSL_SRLOC is the VSL source endpoint public IP address and port allocated after NAT mapping discovered by STUN as described above. The VSL_SLLOC is the VSL source local internal IP address allocated to the request originating VSL endpoint/VSL router in the locator network as described above. The VSL_FLAGS is an 8-bit field representing message type RESERVER, RESERVER ACK, the VSL_VAID is the VSL application namespace identifier VAID (as described above), which carries value for which service application type the capacity has to be reserved. The VSL_SEQ defines request identifier to correlate the corresponding acknowledgement, this number has to be same in RESERVE ACK message for the corresponding RESERVE request. The VSL control plane 701 uses the VSL_SRLOC information to punch hole in the NAT for the consumer endpoints to communicate to the provider endpoints. This establishes communication channel between consumer endpoints and provider endpoints. All VSL defined attributes as defined above, have properties "optional" and "transitive," and type value 255.

Figure 43B:
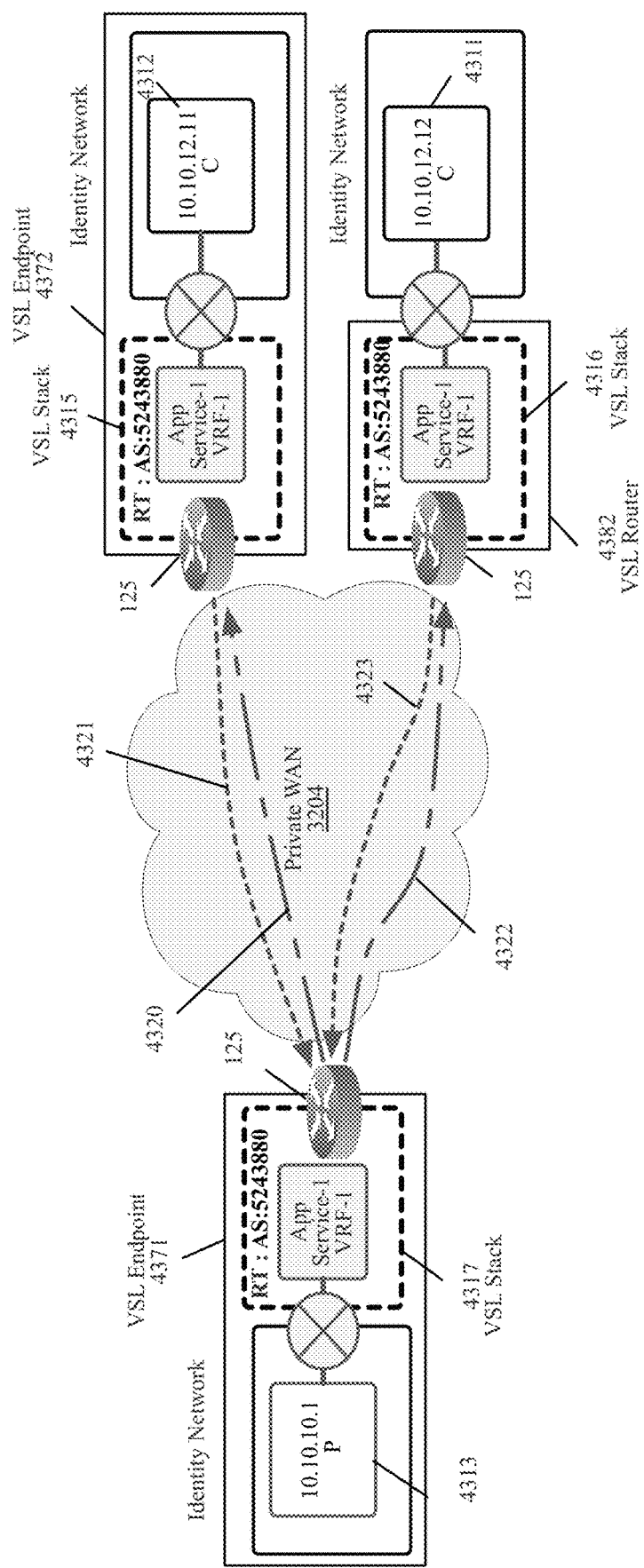
FIG. 43B is a functional diagram illustrating how the VSL endpoints and the VSL routers exchange capacity information of service provider endpoints connected over private WAN, according to various aspects of the present disclosure.

FIG. 43B is a functional diagram illustrating the deployment of application endpoints at the VSL endpoints/VSL routers, connected over the private WAN 4324, according to various aspects of the present disclosure. With reference to FIG. 43B, as described above, the application endpoints 4312 and 4313 at the VSL endpoints 4372 and 4371, and the application endpoint 4311 connected to the VSL router 4382 are connected over the private WAN 3204. To reserve capacity for the consumer endpoints, the VSL control plane 701 (FIG. 7) implements unicast protocol for networks connected over the private WAN, since the locator IP addresses are addressable and reachable. For this unicast protocol implementation, the VSL control plane 701 simply uses the TCP/IP stack to implement the protocol, which listens on a specific port to receive unicast messages. The VSL control plane 701 of the VSL stack 4315 and the VSL stack 4316 may send the unicast RESERVE request 4321 and 4323 to the VSL control plane 701 of the VSL stack 4317. The VSL control plane 701 of the VSL stack 4317 may send back the RESERVE ACK message 4320 and 4322 indicating how much capacity may be reserved based on the available capacity. If the value is zero, no capacity is reserved. The VSL control plane 701 for unicast messages is formatted as simple TCP/IP payload with three field values [capacity request/reserved, VAID, sequence number], for RESERVE request payload contains [capacity request, VAID, sequence number] and for RESERVE ACK the payload contains [capacity reserved, VAID, sequence number]. The capacity request field contains the value of the capacity to be reserved for the requesting endpoint. The capacity reserve field contains value indicating how much capacity is reserved for the requesting endpoint. The VAID is virtual application identifier as described above. The sequence number is the request identifier number to correlate to corresponding acknowledgement.

Figure 44A:
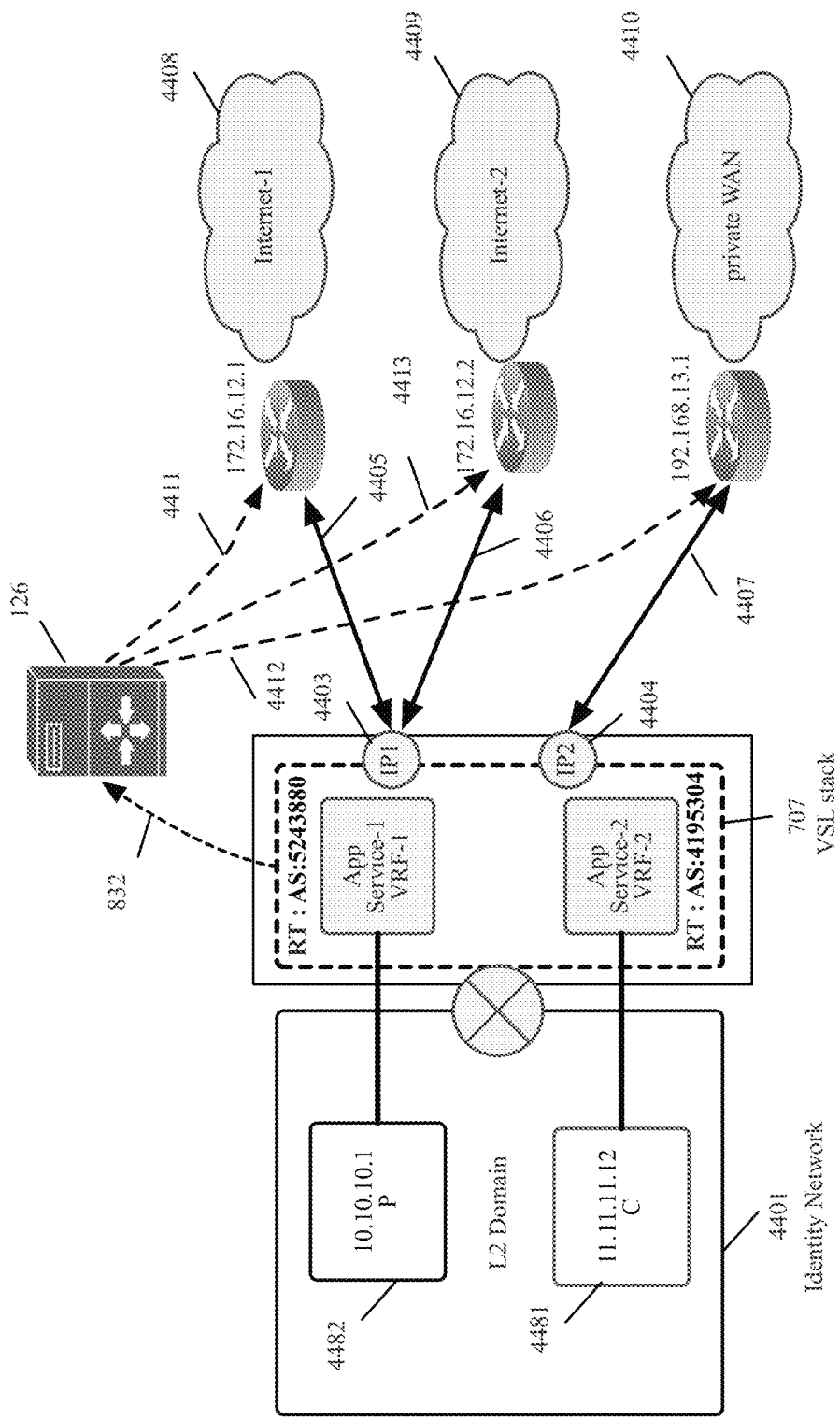
FIG. 44A is a functional diagram illustrating the VSL path selection in the non-disjoint case where the VSL stack may select path based on the metrics, according to various aspects of the present disclosure.

FIG. 44A is a functional diagram illustrating the VSL path selection in the non-disjoint case where the VSL stack may select path based on the metrics, according to various aspects of the present disclosure. In the non-disjoint case, the VSL stack 707 may select the path based on the metrics, as described above. The VSL stack 707 in this type of deployment is directly connected to the uplinks' 4405, 4406, 4407 gateways. There are three uplinks in this scenario, the uplink 4405 forwards the traffic through the Internet-1 4408, the uplink 4406 forwards the traffic through the Internet-2 4409, and the uplink 4407 forwards the traffic through the private WAN 4410. The consumer application endpoint 4481 and the provider application endpoint 4482 are deployed in the identity network 4401.

The uplinks gateway is depicted with reference to the service path configuration table 1550 (FIG. 15C). The VSL stack 707 peers 832 with the VSL route server 126 to receive the VSL route information. The VSL route server 126 peers (as shown by 4411, 4413) with other VSL route servers 126 in different networks through the Internet uplinks 4405, 4406 as external BGP peering (eBGP).

The VSL route server 126 peers (as shown by 832) with the VSL stack as internal BGP (iBGP) and peers (as shown by 4412) with the other VSL route servers in different networks through private WAN uplinks 4407 as internal BGP (iBGP). The VSL route server 126 receives the endpoint route information represented as the VSL route from different uplinks peering 4411, 4412, 4413. The VSL route information as described above may have locator information in the VSL-RLOC attribute or VSL-LLOC attribute, depending on the peering uplink as described above. The locator information may be public IP or internal IP address of the VSL endpoint/VSL router as described above. To reach the locator IP, the next hop gateway is resolved using service path configuration 1550 (FIG. 15C) entries. The VSL control plane 701, as described above, once the VSL route information is received, and based on the service path configuration 1550 entries specific to that network, resolves the next hop 1555 MAC addresses to reach the locator IP through the resolved gateway uplinks based on the priority 1553 given. If an uplink path is down, the corresponding peering 4411, 4412, 4413 is down and the corresponding routes are retracted. The VSL control plane 701 picks the next VSL route received on another specific path which is active and may resolve it for reachability to locator IP as described above.

Figure 44B:
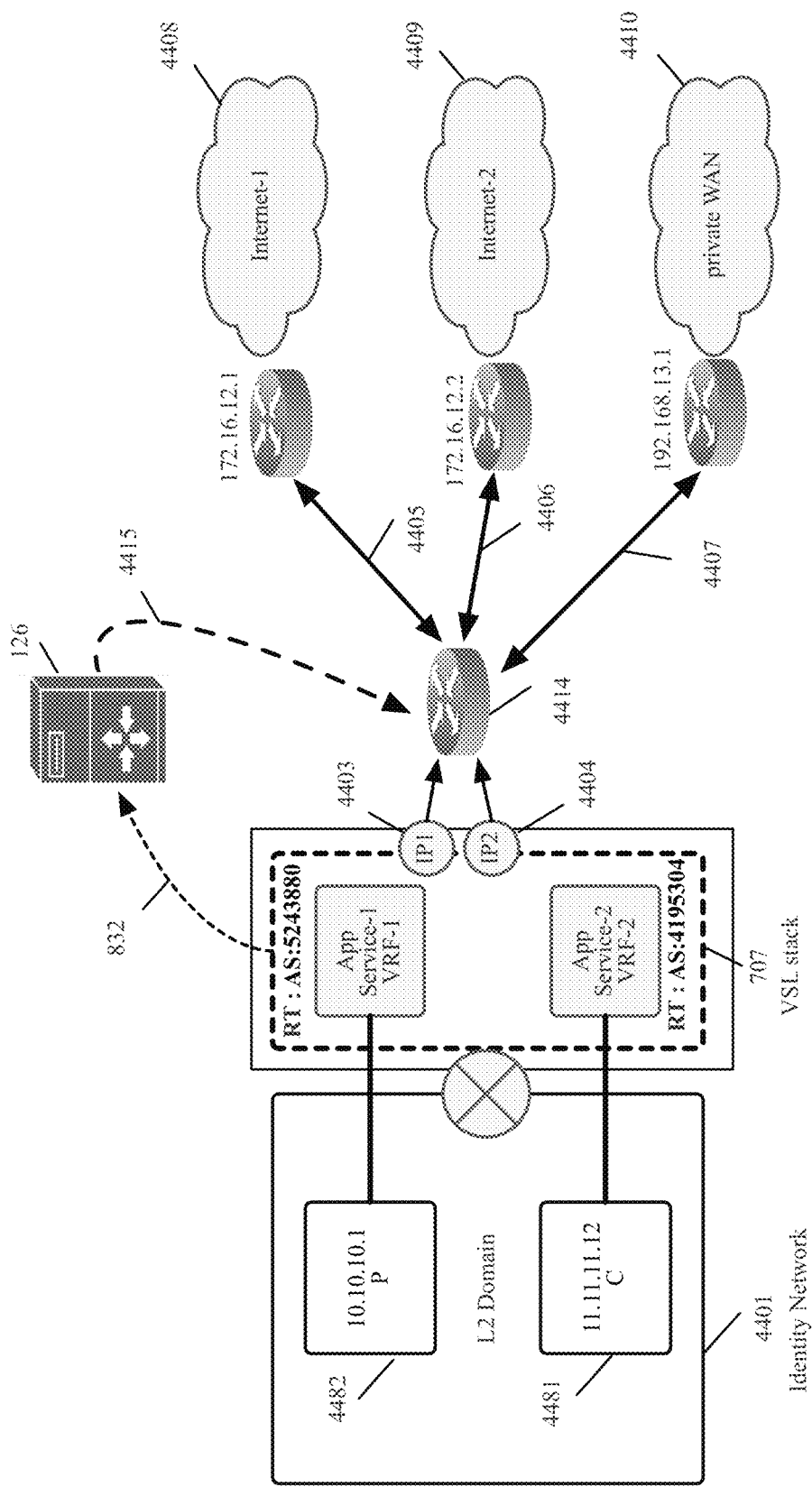
FIG. 44B is a functional diagram illustrating VSL path selection in the disjoint case where the VSL stack is behind intermediate router and cannot select the path, according to various aspects of the present disclosure.

FIG. 44B is a functional diagram illustrating VSL path selection in the disjoint case where the VSL stack is behind intermediate router and cannot select the path, according to various aspects of the present disclosure. FIG. 44B, shows the details of path selection in disjoint case, where the VSL stack 707 is located behind intermediate/edge router and the VSL route server 126 peers (as shown by 4415) with the edge router 4414. The edge router 4414 is connected directly to the uplinks 4405, 4406, 4407 gateways. The VSL route server 126 is peered to another VSL route server at different networks through next hop router 4414. The VSL route server 126, based on the service path configuration 1550 (FIG. 15C) edge router field 1556 specific to network, peers with the edge router 4414, and programs the static routes for the given IP addresses/prefixes 1554 and the corresponding next hop 1555. The static routes are programmed with proper metric that reflects priority of the uplink as per service path configuration.

J. Software Defined WAN and WAN Optimization

With reference to FIG. 26, FIG. 32, and FIG. 44A-44B describing the combined functionality that enables connecting the application endpoints 2645, 2647, 2644, 2646, 2641, 2642, and 2643 distributed across the networks 2613, 2614 over the Internet 106 and the private WAN 104 uplinks 2604 and 2601. The packet path over the Internet and the private WAN as described above (reference to FIG. 27, 28, 29) establishes connectivity between the consumer and provider as part of the app service VRF session 3203 and 3213 (FIG. 32). The app service VRF sessions 3203 and 3213 are created at the VSL stack 3212 at the consumer application endpoints 3206 and 3210 once the VSL route 3207 is consumed.

In the non-disjoint case (FIG. 44A), the VSL route server RS2 2608 may peer with the VSL route server RS1 2609, and vice versa, on both the Internet 106 and the private WAN 104 uplinks 2601 and 2604. Therefore, the VSL routes 3207 representing a provider application endpoint may be received on different uplinks 2601 and 2604. The VSL stack 3212 choses one of the app service VRF 3203 and 3213 with the highest priority as given in the VSL-flags 3521 and 3621 (FIGS. 35C-35E, and 36C-36D) given as part of the VSL route 3207 to connect consumer endpoints. In the case, if provider endpoint is inactive, the VSL route is retracted and the VSL stack choses another service provider application endpoint to connect the consumer application endpoints. In the case, if the Internet 2604 uplink is down at R1 2606 or R2 2607, the VSL route received on that uplink as part of peering between VSL route servers 2609 and 2608 is retracted and the application service VRF session is deleted. Then VSL stack choses the next application service VRF session with the highest priority to connect consumer application endpoints.

In the disjoint case (FIG. 44B), the VSL route server RS2 2608 may peer with the VSL route server RS1 2609 over the Internet 106 or the private WAN 104 on one of the uplinks 2601, 2604. In such case, the VSL stack 3212 receives only one VSL route 3207 and may have one application service VRF session to the provider application endpoint, therefore, the VSL stack has no knowledge of uplinks. The VSL route server 126, 2609, 2608 peers with the edge routers 4414, 2606 and 2607 to learn all routes for the reachability of provider application endpoint on possible uplinks 2604, 2601. Based on the service path configuration (with reference to 1550, 1650, 1750, 1850), the VSL route server updates or programs static routes to the edge router to prioritize uplinks for service application endpoint communication. In case, if any uplink is down, the corresponding routes are retracted by the edge routers and the VSL route server, leaving those routes whose uplinks are intact and enabling communication to take uplinks path. Given, that the VSL by default brings security as part of connectivity, and manages uplinks selection, thus the VSL implements SD-WAN concept without intermediate network node selecting uplink paths for communication without any tunnels.

With reference to FIGS. 26, 32, and 44A-44B describing the combined functionality that enables optimization of application performance for the application endpoints 2645, 2647, 2644, 2646, 2641, 2642, and 2643 distributed across the networks 2613, 2614 communicating over the Internet 106 and the private WAN 104 uplinks 2604 and 2601. The VSL stack implements forward error correction (FEC), compression techniques, and TCP optimization as part of intelligent network functions 3107. The FEC is a technique applied to minimize errors in data transmission over communication channels. When a channel is lossy and has error, data packets transmission result in corruption and loss of packets, causing the source to retransmit the packets, increasing the delay and decreasing the performance of the applications.

Data compression is a process of reducing the size of data for optimal usage of resources compared to the original data size in transmission. The VSL stack implements lossless data compression technique called source encoding, where the VSL stack, when transmitting data, compresses the packet data and, when receiving, decompress the packet data. The TCP optimization is a technique to increase goodput (i.e., the application-level throughput of a communication), improved network efficiency, higher TCP transfer speeds, lower retransmission rates, and consistent TCP round trip times. The VSL stack implements standard TCP window optimization techniques to improve performance of applications, to increase throughput/goodput and reduce latency. The VSL stack implements all the described functions as WAN-optimization (WAN-opt).

The above described SD-WAN setup is also applicable for the WAN-opt. In order to apply the above-described functions of applications, the VSL stack, based on the identity of application endpoint, the function values given in the VSL-flags attribute of the VSL route 3534 as described above, and the service path configuration (with reference to 1550, 1650, 1750, 1850), determines whether to apply the WAN-opt functions on application traffic. In order to determine whether a function should be applied on the application traffic, the VSL stack gives first priority to end-to-end functions value, next it considers the path functions value, and last it considers the service path configuration function value 1558. For the service path configuration case, only if the VSL stack is deployed in the non-disjoint mode with respect to the uplinks, then the function values 1558 path functions value (as described above) is considered and applied.

II. Computer System

Figure 45:
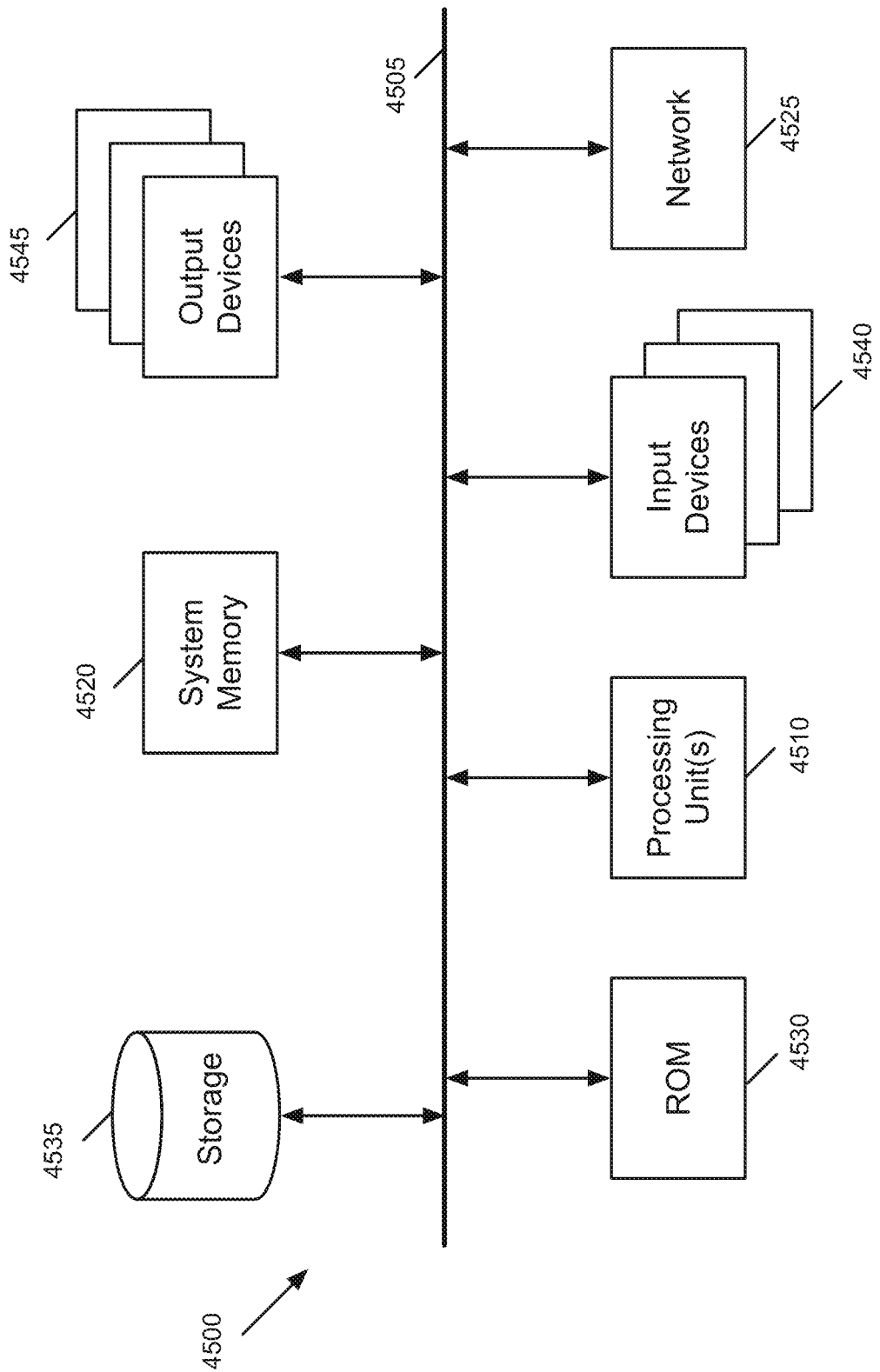
FIG. 45 is a functional block diagram illustrating an example electronic system, according to various aspects of the present disclosure.

FIG. 45 is a functional block diagram illustrating an example electronic system 4500, according to various aspects of the present disclosure. With reference to FIG. 45, some present embodiments, such as for example, and without limitations, the hosts, the servers, the computers, the desktops, the laptops, the mobile devices, the physical communication equipment, including, but not limited to the routers, the route servers, the gateways, etc., described above, may be implemented using the electronic system 4500. The electronic system 4500 may be used to execute any of the processes, methods, controls, or operating system applications described above. The electronic system 4500 may be a computer (e.g., a desktop computer, laptop computer, a personal computer, a tablet computer, a server computer, a mainframe, a blade computer etc.), a phone (e.g., a smartphone), a personal digital assistant (PDA), or any other sort of electronic device. Such an electronic system may include various types of computer readable media and interfaces for various other types of computer readable media. The electronic system 4500 may include a bus 4505, processing unit(s) 4510, a system memory 4520, a read-only memory (ROM) 4530, a permanent storage device 4535, input devices 4540, and output devices 4545.

The bus 4505 may collectively represent all system, peripheral, and chipset buses that communicatively connect the numerous internal devices of the electronic system 4500. For example, the bus 4505 may communicatively connect the processing unit(s) 4510 with the read-only memory 4530, the system memory 4520, and the permanent storage device 4535.

From these various memory units, the processing unit(s) 4510 may retrieve instructions to execute and data to process in order to execute the processes of the present embodiments. The processing unit(s) may be a single processor or a multi-core processor in different embodiments.

The read-only-memory 4530 may store static data and instructions that are needed by the processing unit(s) 4510 and other modules of the electronic system. The permanent storage device 4535, on the other hand, may be a read-and-write memory device. This device is a non-volatile memory unit that may store instructions and data even when the electronic system 4500 is off. Some present embodiments may use a mass-storage device (such as a magnetic or optical disk and its corresponding disk drive) as the permanent storage device 4535.

Other embodiments may use a removable storage device (such as a floppy disk, flash drive, etc.) as the permanent storage device. Like the permanent storage device 4535, the system memory 4520 may be a read-and-write memory device. However, unlike storage device 4535, the system memory may be a volatile read-and-write memory, such as random access memory. The system memory may store some of the instructions and data that the processor needs at runtime. In some embodiments, the processes may be stored in the system memory 4520, the permanent storage device 4535, and/or the read-only memory 4530. From these various memory units, the processing unit(s) 4510 may retrieve instructions to execute and data to process in order to execute the processes of some embodiments.

The bus 4505 may also connect to the input and output devices 4540 and 4545. The input devices may enable the user to communicate information and select commands to the electronic system. The input devices 4540 may include alphanumeric keyboards and pointing devices (also called "cursor control devices"). The output devices 4545 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 45, the bus 4505 may also couple the electronic system 4500 to a network 4525 through a network adapter (not shown). In this manner, the computer may be a part of a network of computers (such as a local area network ("LAN"), a wide area network ("WAN"), an Intranet, or a network of networks, such as the Internet. Any or all components of the electronic system 4500 may be used in conjunction with the present embodiments.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

In a first aspect, a method of providing security through route information in a network comprises the followings. At a physical host comprising a virtual service layer (VSL) protocol stack, receiving service semantic configuration for a set of services, wherein, for each service, the service semantic configuration comprises an identity Internet Protocol (IP) address for each of a set of application endpoints providing the service; a passphrase; and a set of transport identifications, each transport identification identifying one or more application endpoints as providers of the service and one or more application endpoints as consumers of the service. By a control plane of the VSL stack: generating a pair of public and private keys for each service using the passphrase of the service; receiving a control plane message from each provider application endpoint, the set of control plane messages comprising media access control (MAC) addresses associated with said identity IP of a provider application endpoint; extracting the MAC address from each control plane message; defining route information for the provider application endpoints. The route information for each provider application endpoint comprises the public key generated for the service that is provided by the provider application endpoint; the MAC address associated with the identity IP of the provider application endpoint the identity IP of the provider application endpoint; a locator IP address associated with an underlay network allocated to the VSL stack, the locator IP address different than the identity IP of the provider application endpoint; and a session key of the provider application endpoint; By a control plane of the VSL stack, emitting the route information of the provider application endpoints to the underlay network.

An embodiment of the first aspect further comprises encrypting the MAC address and the session key of each route information with the public key prior to emitting the route information.

Another embodiment of the first aspect further comprises storing the route information of each provider application endpoint for accepting network packets for the provider application endpoint.

In an embodiment of the first aspect, the physical host is a first physical host, the method further comprises, at a control plane of a VSL stack of a second physical host: receiving the route information of said provider application endpoints from the control plane of the VSL stack of the first physical host, wherein the VSL stack of the second physical host uses a same public and private key pair as the first physical host, wherein at least the MAC address and the session key in the received route information is encrypted with said public key; when the public key of the route information matches the public key of the first and second physical hosts, decrypting the session key and the MAC address from the route information using the private key; storing the route information comprising the decrypted session key and the decrypted MAC address, the stored route information for use by a set of consumer application endpoints of the second physical host to connect to the provider application endpoint associated with each route information.

Another embodiment of the first aspect further comprises, at the VSL stack of the second host: receiving a network control message from a consumer application endpoint to connect to a provider application endpoint, the network control message comprises the identity IP address of the provider application endpoint; determining whether the identity IP address of the provider application endpoint is present in a stored route information; replying to the network control message with a proxy MAC address of the VSL stack of the second physical host when the identity IP address of the provider application endpoint is present in a stored route information; and ignoring the network control message when the identity IP address of the provider application endpoint is not present in a stored route information.

In another embodiment of the first aspect, said network control message is one of an address resolution protocol (ARP) message, a gratuitous ARP (GARP) message, and a dynamic host configuration protocol (DHCP) message.

In another embodiment of the first aspect, the VSL protocol stack implements application deployment topologies using the locator IP addresses that are different than the identity IP addresses of the application endpoints.

In another embodiment of the first aspect, the VSL control plane does not emit route information for the consumer application endpoints, the method further comprises: at a data plane of the first physical host: receiving a packet sent to a provider application endpoint from a consumer application endpoint; determining that the packet is a first packet received from the consumer application endpoint; based on the determination, using a session key stored in the route information of the provider application endpoint to generate a hash value on an L2 header, an L3 header, an L4 header, and a payload of the received packet; comparing the generated hash value with a session integrity hash value of the received packet; when the generated hash value matches the session integrity hash value of the received packet, storing the locator IP address and the identity IP address of the consumer application endpoint; and when the generated hash value does not match the session integrity hash value of the received packet, ignoring the packet and any subsequent packets received from said consumer application endpoint.

In another embodiment of the first aspect, the application endpoints comprise one or more of: a user application running on a user space of the first physical host; a virtual machine (VM) running on the user space of the first physical host; a container running on the user space of the first physical host; a user application running in a VM on the user space of the first physical host; and a container running in a VM on the user space of the first physical host.

In another embodiment of the first aspect, the first physical host is a router located between said application endpoints and an IP router of the underlay network.

In another embodiment of the first aspect, wherein, for the consumer application endpoints, the service semantic configuration comprises a subnet IP address from which the application endpoint identity IP addresses are assigned, and wherein, for the provider application endpoints that communicate with other provider application endpoints, the service semantic configuration comprises a subnet IP address from which the application endpoint identity IP addresses are assigned.

In a second aspect, a method of providing load balancing through route information in a network, is provided. The method comprises the followings. At a physical host comprising a virtual service layer (VSL) protocol stack, receiving service semantic configuration for a set of services. For each service, the service semantic configuration comprises: an identity Internet Protocol (IP) address for each of a set of application endpoints providing the service; a set of transport identifications, each transport identification identifying one or more application endpoints as providers of the service and one or more application endpoints as consumers of the service; a capacity for each provider application endpoint, the capacity indicating a maximum number of requests per a time period that the provider application processes. By a control plane of the VSL stack: receiving a control plane message from each provider application endpoint, the set of control plane messages comprising media access control (MAC) addresses associated with said identity IP of a provider application endpoint; extracting the MAC address from each control plane message; defining route information for the provider application endpoints. The route information for each provider application endpoint comprises the MAC address associated with the identity IP of the provider application endpoint; the identity IP of the provider application endpoint; a locator IP address associated with an underlay network allocated to the VSL stack, the locator IP address different than the identity IP of the provider application endpoint; and the capacity of the provider application endpoint. By the control plane of the VSL stack emitting the route information of the provider application endpoints to the underlay network.

In an embodiment of the second aspect, the physical host is a first physical host, the method further comprises: at a control plane of a VSL stack of a second physical host: receiving the route information of said provider application endpoints from the control plane of the VSL stack of the first physical host; sending a request to the control plane of the first physical host to reverse at least a portion of the capacity of a provider application endpoint. At the control plane of the VSL stack of the first physical host: receiving the request from the control plane of the second physical host; determining if the requested capacity is available from the provider application; when the requested capacity is available, reserving the requested capacity of the provider application for the control plane of the second physical host; when a partial amount of the requested capacity is available, reserving the partial amount of the capacity of the provider application for the control plane of the second physical host; when no capacity is available, reserving no capacity of the provider application for the control plane of the second physical host; sending an acknowledgment message for said request to the control plane of the second physical host, the acknowledgment message indicating an amount of capacity of the provider application endpoint reserved for the control plane of the second physical host.

An embodiment of the second aspect further comprises at the control plane of the VSL stack of the second physical host storing the reserved capacity information of the provider application endpoint for the corresponding route information, wherein the stored capacity is used for the control plane of the second physical host as a maximum number of requests to be generated for the provider application endpoint.

In another embodiment of the second aspect, the first physical host is a router located between said application endpoints and an IP router of the underlay network.

In a third aspect, a method of providing connectivity to applications to communicate through the Internet is provided. The method comprises the followings. At a physical host comprising a virtual service layer (VSL) protocol stack, receiving service semantic configuration for a set of services, wherein, for each service. The service semantic configuration comprises an identity Internet protocol (IP) address for each of a set of application endpoints providing the service; a set of transport identifications, each transport identification identifying one or more application endpoints as providers of the service and one or more application endpoints as consumers of the service. By a control plane of the VSL stack: sending a session traversal utilities for network address translation (STUN) request to a STUN server on the Internet to discover a public IP address of the VSL stack of the first physical host; in response to the request, receiving the public IP address of the VSL stack of the first physical host from the STUN server; receiving a control plane message from each provider application endpoint, the set of control plane messages comprising media access control (MAC) addresses associated with said identity IP of a provider application endpoint; extracting the MAC address from each control plane message; defining route information for the provider application endpoints. The route information for each provider application endpoint comprises the MAC address associated with the identity IP of the provider application endpoint; the identity IP of the provider application endpoint; the public IP address of the VSL stack of the first physical host as a locator IP address of the VSL stack of the first physical host, wherein the locator address is different than the identity IP address of the provider application endpoint. By the control plane of the VSL stack: emitting the route information of the provider application endpoints to the underlay network.

In an embodiment of the third aspect, the physical host is a first physical host, at a control plane of a VSL stack of a second physical host: receiving the route information of said provider application endpoints from the control plane of the VSL stack of the first physical host; sending a request to the control plane of the first physical host to establish with a provider application endpoint. The request comprises a public IP address of the VSL stack of the second physical host. At the control plane of the VSL stack of the first physical host: receiving the request from the control plane of the second physical host; and sending a packet to the public IP address of the second physical host creating a communication channel at a network address translation (NAT) gateway of the first physical host.

An embodiment of the third aspect further comprises: from the control plane of the first physical host, sending an acknowledgment message for said request to the control plane of the second physical host, the acknowledgment message for establishing the communication channel to the provider application endpoint.

Another embodiment of the third aspect further comprises: from a consumer application endpoint in the second physical host, sending communication packets to said provider application endpoint of the first physical host through said communication channel using the public IP address of the VSL stack of the first physical host.

In an embodiment of the third aspect, for each service, the service semantic configuration comprises a passphrase. By the control plane of the VSL stack, generating a pair of public and private keys for each service using the passphrase of the service. The route information for each provider application endpoints comprises the public key generated for the service that is provided by the provider application endpoint and a session key of the provider application endpoint. By the control plane of the VSL stack, encrypting the MAC address and the session key of each route information with the public key prior to emitting the route information.

In another aspect of the third embodiment, the first physical host is a router located between said application endpoints and an IP router of the underlay network.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method of providing security through route information in a network, the method comprising:
at a physical host comprising a virtual service layer (VSL) protocol stack, receiving service semantic configuration for a set of services, wherein, for each service, the service semantic configuration comprises:
an identity Internet Protocol (IP) address for each of a set of application endpoints providing the service;
a passphrase; and
a set of transport identifications, each transport identification identifying one or more of the set of application endpoints as providers of the service and one or more of the set of application endpoints as consumers of the service;
by a control plane of the VSL protocol stack:
generating a pair of public and private keys for each service using the passphrase of the service;
receiving a control plane message from each provider application endpoint, each control plane message comprising a media access control (MAC) address associated with the identity IP address of a provider application endpoint;
extracting the MAC address from each control plane message;
defining route information for the provider application endpoints, the route information for each provider application endpoint comprising:
the public key generated for the service that is provided by the provider application endpoint;
the MAC address associated with the identity IP address of the provider application endpoint;
the identity IP address of the provider application endpoint;
a locator IP address associated with an underlay network allocated to the VSL protocol stack, the locator IP address different than the identity IP address of the provider application endpoint; and
a session key of the provider application endpoint; and
emitting the route information of the provider application endpoints to the underlay network.

2. The method of claim 1 further comprising encrypting the MAC address and the session key of each route information with the public key prior to emitting the route information.

3. The method of claim 1 further comprising, storing the route information of each provider application endpoint for accepting network packets for the provider application endpoint.

4. The method of claim 1, wherein the physical host is a first physical host, the method further comprising:

at a control plane of a VSL protocol stack of a second physical host:

receiving the route information of said provider application endpoints from the control plane of the VSL protocol stack of the first physical host, wherein the VSL protocol stack of the second physical host uses a same public and private key pair as the first physical host, wherein at least the MAC address and the session key in the received route information is encrypted with said public key;

when the public key of the route information matches the public key of the first and second physical hosts, decrypting the session key and the MAC address from the route information using the private key;

storing the route information comprising the decrypted session key and the decrypted MAC address, the stored route information for use by a set of consumer application endpoints of the second physical host to connect to the provider application endpoint associated with each route information.

5. The method of claim 4 further comprising:

at the VSL protocol stack of the second physical host:

receiving a network control message from a consumer application endpoint to connect to a provider application endpoint, the network control message comprising the identity IP address of the provider application endpoint;

determining whether the identity IP address of the provider application endpoint is present in a stored route information;

replying to the network control message with a proxy MAC address of the VSL protocol stack of the second physical host when the identity IP address of the provider application endpoint is present in a stored route information; and ignoring the network control message when the identity IP address of the provider application endpoint is not present in a stored route information.

6. The method of claim 5, wherein said network control message is one of an address resolution protocol (ARP) message, a gratuitous ARP (GARP) message, and a dynamic host configuration protocol (DHCP) message.

7. The method of claim 1, wherein the VSL protocol stack implements application deployment topologies using the locator IP addresses that are different than the identity IP addresses of the application endpoints.

8. The method of claim 1, wherein the VSL control plane does not emit route information for the consumer application endpoints, the method further comprising:

at a data plane of the physical host:

receiving a packet sent to a provider application endpoint from a consumer application endpoint;

determining that the packet is a first packet received from the consumer application endpoint;

based on the determination, using a session key stored in the route information of the provider application endpoint to generate a hash value on a Layer 2 (L2) header, a Layer 3 (L3) header, a Layer 4 (L4) header, and a payload of the received packet;

comparing the generated hash value with a session integrity hash value of the received packet;

when the generated hash value matches the session integrity hash value of the received packet, storing the locator IP address and the identity IP address of the consumer application endpoint; and when the generated hash value does not match the session integrity hash value of the received packet, ignoring the packet and any subsequent packets received from said consumer application endpoint.

9. The method of claim 1, wherein the application endpoints comprise one or more of:

a user application running on a user space of the physical host;

a virtual machine (VM) running on the user space of the physical host;

a container running on the user space of the physical host;

a user application running in a VM on the user space of the physical host; and a container running in a VM on the user space of the physical host.

10. The method of claim 1, wherein the physical host is a router located between said application endpoints and an IP router of the underlay network.

11. The method of claim 1, wherein, for the consumer application endpoints, the service semantic configuration comprises a subnet IP address from which the application endpoint identity IP addresses are assigned, and wherein, for the provider application endpoints that communicate with other provider application endpoints, the service semantic configuration comprises a subnet IP address from which the application endpoint identity IP addresses are assigned.

\* \* \* \* \*